United States Patent
Kuchibhotla et al.

(10) Patent No.: US 12,026,124 B2
(45) Date of Patent: *Jul. 2, 2024

(54) SYSTEM AND METHOD FOR PROVISIONING DATABASES IN A HYPERCONVERGED INFRASTRUCTURE SYSTEM

(71) Applicant: Nutanix, Inc., San Jose, CA (US)

(72) Inventors: Balasubrahmanyam Kuchibhotla, San Ramon, CA (US); Kamaldeep Khanuja, Dublin, CA (US); Jeremy Launier, San Jose, CA (US); Sujit Menon, San Jose, CA (US); Maneesh Rawat, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,837

(22) Filed: Oct. 18, 2023

(65) Prior Publication Data
US 2024/0045833 A1  Feb. 8, 2024

Related U.S. Application Data

(63) Continuation of application No. 18/113,528, filed on Feb. 23, 2023, now Pat. No. 11,860,818, which is a (Continued)

(51) Int. Cl.
*G06F 11/14* (2006.01)
*G06F 9/455* (2018.01)
*G06F 16/11* (2019.01)

(52) U.S. Cl.
CPC ........ *G06F 16/128* (2019.01); *G06F 9/45558* (2013.01); *G06F 11/1461* (2013.01); *G06F 2009/45562* (2013.01)

(58) Field of Classification Search
CPC .......................... G06F 16/128; G06F 9/45558
See application file for complete search history.

(56) References Cited

U.S. PATENT DOCUMENTS

| 625,315 A | 5/1899 | Bradford |
|---|---|---|
| 749,117 A | 1/1904 | Wagner |

(Continued)

FOREIGN PATENT DOCUMENTS

| CN | 104408071 A | 3/2015 |
|---|---|---|
| CN | 105446828 A | 3/2016 |

(Continued)

OTHER PUBLICATIONS

Aws. "Tagging Amazon RDS resources" Amazon Relational Database Service. Jan. 16, 2013. Retrieved from https://docs.aws.amazon.com/AmazonRDS/latest/UserGuide/USER_Tagging.html (accessed Dec. 7, 2023).

(Continued)

*Primary Examiner* — Eliyah S. Harper
(74) *Attorney, Agent, or Firm* — Foley & Lardner LLP

(57) ABSTRACT

A system and method include receiving, by a database engine of a database system associated with a virtual computing system, a user request via a dashboard for provisioning a source database with the database system, receiving, by the database engine via the dashboard, selection of a database engine type, and receiving, by the database engine via the dashboard, selection of a Service Level Agreement ("SLA") and a protection schedule. The system and method also include provisioning, by the database engine, the source database based upon the database engine type, creating, by the database engine, an instance of a database protection system based upon the SLA and the protection schedule, including associating the instance of the database protection (Continued)

system with the source database, and displaying, by the database engine, the source database within the dashboard.

39 Claims, 31 Drawing Sheets

Related U.S. Application Data continuation of application No. 17/237,599, filed on Apr. 22, 2021, now Pat. No. 11,604,762, which is a continuation of application No. 16/234,553, filed on Dec. 27, 2018, now Pat. No. 11,010,336.

(56) References Cited

U.S. PATENT DOCUMENTS

| | | |
|---|---|---|
| 5,594,859 A | 1/1997 | Palmer et al. |
| 6,064,975 A | 5/2000 | Moon et al. |
| 6,243,715 B1 | 6/2001 | Bogantz et al. |
| D508,248 S | 8/2005 | Ording |
| D521,521 S | 5/2006 | Jewitt et al. |
| 7,225,189 B1 | 5/2007 | McCormack et al. |
| 7,389,300 B1 | 6/2008 | Shah et al. |
| 7,725,671 B2 | 5/2010 | Prahlad et al. |
| D625,315 S | 10/2010 | Jewitt et al. |
| 7,814,057 B2 | 10/2010 | Kathuria et al. |
| 7,840,533 B2 | 11/2010 | Prahlad et al. |
| 7,953,764 B2 | 5/2011 | Baffier et al. |
| 8,117,165 B1 | 2/2012 | Winckelmann et al. |
| D656,948 S | 4/2012 | Kundsen et al. |
| 8,150,808 B2 | 4/2012 | Zha et al. |
| 8,250,033 B1 | 8/2012 | De Souter et al. |
| 8,291,409 B2 | 10/2012 | Winner et al. |
| 8,364,648 B1 | 1/2013 | Sim-Tang |
| 8,429,630 B2 | 4/2013 | Nickolov et al. |
| 8,447,728 B2 | 5/2013 | Prahlad et al. |
| 8,448,170 B2 | 5/2013 | Wipfel et al. |
| D684,160 S | 6/2013 | Truelove et al. |
| D684,161 S | 6/2013 | Truelove et al. |
| 8,468,174 B1 | 6/2013 | Yueh et al. |
| 8,549,518 B1 | 10/2013 | Aron et al. |
| 8,601,473 B1 | 12/2013 | Aron et al. |
| 8,612,396 B1 | 12/2013 | McAlister et al. |
| 8,635,421 B2 | 1/2014 | Gupta et al. |
| 8,677,085 B2 | 3/2014 | Vaghani et al. |
| 8,762,335 B2 | 6/2014 | Prahlad et al. |
| 8,769,537 B1 * | 7/2014 | Ruggiero ............... G06F 9/46 718/100 |
| 8,832,028 B2 | 9/2014 | Susairaj et al. |
| 8,849,850 B2 | 9/2014 | Baffier et al. |
| 8,850,130 B1 | 9/2014 | Aron et al. |
| 8,863,124 B1 | 10/2014 | Aron |
| 8,874,749 B1 | 10/2014 | Vittal et al. |
| 8,914,567 B2 | 12/2014 | Miroshnichenko et al. |
| 8,924,974 B1 * | 12/2014 | Ruggiero ............... G06F 9/466 718/101 |
| 8,972,347 B1 | 3/2015 | Sim-Tang |
| 9,009,106 B1 | 4/2015 | Aron et al. |
| 9,069,708 B2 | 6/2015 | Gill et al. |
| D733,745 S | 7/2015 | Huang |
| 9,116,737 B2 | 8/2015 | Aswathanarayana et al. |
| 9,116,803 B1 * | 8/2015 | Agrawal ............. G06F 11/0751 |
| 9,213,727 B1 | 12/2015 | Esposito |
| 9,244,717 B2 | 1/2016 | Pissay et al. |
| D749,117 S | 2/2016 | Huang |
| 9,256,383 B2 | 2/2016 | De Spiegeleer et al. |
| 9,270,521 B2 | 2/2016 | Tompkins |
| D753,135 S | 4/2016 | Vazquez |
| D753,140 S | 4/2016 | Kouvas et al. |
| 9,336,060 B2 | 5/2016 | Nori et al. |
| 9,336,132 B1 | 5/2016 | Aron et al. |
| 9,372,758 B2 | 6/2016 | Ashutosh et al. |
| D761,288 S | 7/2016 | Cianflone et al. |
| 9,384,254 B2 | 7/2016 | Tekade et al. |
| 9,389,962 B1 | 7/2016 | Yueh et al. |
| D763,890 S | 8/2016 | Pan |
| 9,413,810 B2 | 8/2016 | Rezvani et al. |
| 9,436,556 B2 | 9/2016 | Siden et al. |
| D771,102 S | 11/2016 | Protzman et al. |
| 9,495,435 B2 | 11/2016 | Zhang et al. |
| 9,507,579 B2 | 11/2016 | Gambardella et al. |
| 9,529,551 B2 | 12/2016 | Kesavan et al. |
| D777,747 S | 1/2017 | Derby et al. |
| D778,296 S | 2/2017 | Belkin et al. |
| D779,514 S | 2/2017 | Baris et al. |
| D781,887 S | 3/2017 | Dziuba et al. |
| 9,600,193 B2 | 3/2017 | Ahrens et al. |
| 9,639,429 B2 | 5/2017 | Stewart et al. |
| 9,652,265 B1 | 5/2017 | Narayanasamy et al. |
| 9,659,080 B1 | 5/2017 | Drobychev et al. |
| 9,665,437 B2 | 5/2017 | Bhargava et al. |
| D794,666 S | 8/2017 | Havaldar et al. |
| D794,667 S | 8/2017 | Havaldar et al. |
| 9,733,958 B2 | 8/2017 | Cui et al. |
| 9,740,472 B1 | 8/2017 | Sohi et al. |
| 9,740,723 B2 | 8/2017 | Prahlad et al. |
| 9,747,287 B1 | 8/2017 | Bhardwaj et al. |
| D797,116 S | 9/2017 | Chapman et al. |
| 9,753,713 B2 | 9/2017 | Mani et al. |
| 9,760,396 B2 | 9/2017 | Apte et al. |
| 9,772,866 B1 | 9/2017 | Aron et al. |
| 9,778,992 B1 | 10/2017 | Yueh et al. |
| D802,608 S | 11/2017 | Hicks et al. |
| D803,231 S | 11/2017 | Guinness et al. |
| D807,902 S | 1/2018 | Cong et al. |
| 9,858,155 B2 | 1/2018 | Ashutosh et al. |
| 9,881,168 B2 | 1/2018 | Chari et al. |
| D809,530 S | 2/2018 | Matheson et al. |
| D815,652 S | 4/2018 | Protzman et al. |
| D817,976 S | 5/2018 | Shilwant et al. |
| 9,960,963 B2 | 5/2018 | Selvaraj et al. |
| 10,013,313 B2 | 7/2018 | Zhang et al. |
| 10,033,833 B2 | 7/2018 | Fu et al. |
| 10,055,300 B2 | 8/2018 | Zhang et al. |
| 10,057,279 B1 | 8/2018 | Balduzzi et al. |
| 10,108,685 B2 | 10/2018 | Amdur et al. |
| 10,146,848 B2 | 12/2018 | Narayanan et al. |
| D838,288 S | 1/2019 | Sunshine et al. |
| 10,185,627 B2 | 1/2019 | Wong et al. |
| D839,913 S | 2/2019 | Chen et al. |
| 10,210,048 B2 | 2/2019 | Sancheti |
| 10,212,195 B2 | 2/2019 | Maskalik et al. |
| D843,388 S | 3/2019 | Protzman et al. |
| 10,248,657 B2 | 4/2019 | Prahlad et al. |
| 10,282,201 B2 | 5/2019 | Tekade et al. |
| 10,339,110 B2 | 7/2019 | Marinov et al. |
| 10,346,431 B1 | 7/2019 | Broda et al. |
| 10,372,329 B1 | 8/2019 | Ahrens et al. |
| 10,379,963 B2 | 8/2019 | Bhargava et al. |
| D862,512 S | 10/2019 | Schubart |
| 10,445,298 B2 | 10/2019 | Ramu et al. |
| 10,447,806 B1 | 10/2019 | Sahay et al. |
| 10,476,955 B2 | 11/2019 | Mutalik et al. |
| D870,762 S | 12/2019 | Mendoza Corominas et al. |
| 10,503,612 B1 | 12/2019 | Wang et al. |
| 10,509,798 B2 | 12/2019 | Chow et al. |
| D875,108 S | 2/2020 | Chitalia et al. |
| D877,753 S | 3/2020 | Chitalia et al. |
| 10,599,423 B2 | 3/2020 | Coleman et al. |
| 10,606,578 B2 | 3/2020 | Kruglikov et al. |
| 10,613,938 B2 | 4/2020 | Blumenau et al. |
| 10,637,914 B2 | 4/2020 | Basavaiah et al. |
| 10,700,991 B2 | 6/2020 | Khinvasara et al. |
| 10,719,407 B1 | 7/2020 | Chockalingam et al. |
| 10,725,866 B1 | 7/2020 | Palaiah et al. |
| 10,728,255 B2 | 7/2020 | Jindal et al. |
| 10,757,036 B2 | 8/2020 | Tung et al. |
| 10,776,329 B2 | 9/2020 | Ramohalli Gopala Rao et al. |
| 10,778,750 B2 | 9/2020 | Ringdahl |
| 10,785,029 B2 | 9/2020 | Gupta et al. |
| 10,785,255 B1 * | 9/2020 | Otvagin ............. H04L 63/145 |
| 10,812,582 B2 | 10/2020 | Spillane et al. |
| 10,817,157 B2 | 10/2020 | Kuchibhotla et al. |
| 10,824,956 B1 | 11/2020 | Natanzon et al. |

(56) References Cited

U.S. PATENT DOCUMENTS

| | | |
|---|---|---|
| D911,356 S | 2/2021 | Varghese et al. |
| 10,922,957 B2* | 2/2021 | Rhoads ............... G06V 10/945 |
| 10,938,924 B1 | 3/2021 | Jensen et al. |
| 10,951,496 B2 | 3/2021 | Baker et al. |
| 10,959,098 B2 | 3/2021 | Cidon et al. |
| 10,999,165 B2 | 5/2021 | Cidon et al. |
| 11,010,336 B2 | 5/2021 | Kuchibhotla et al. |
| 11,010,487 B2 | 5/2021 | Noe et al. |
| D926,200 S | 7/2021 | Murphy et al. |
| 11,055,352 B1* | 7/2021 | Beitchman ........ G06F 16/90335 |
| D927,507 S | 8/2021 | Norman |
| 11,108,629 B1 | 8/2021 | Cahyadi et al. |
| 11,126,426 B2 | 9/2021 | Zhu et al. |
| 11,243,971 B2 | 2/2022 | Geigel |
| D947,216 S | 3/2022 | Leininger |
| D947,239 S | 3/2022 | Rubin et al. |
| D947,240 S | 3/2022 | Rubin et al. |
| 11,275,573 B1 | 3/2022 | Javadekar |
| 11,308,114 B1* | 4/2022 | Moghe ................. G06F 16/254 |
| 11,372,820 B1 | 6/2022 | Harjono et al. |
| 11,386,058 B2 | 7/2022 | Hung et al. |
| 2001/0014867 A1 | 8/2001 | Conmy |
| 2002/0073089 A1 | 6/2002 | Schwartz et al. |
| 2002/0104376 A1 | 8/2002 | Danyluk et al. |
| 2002/0174098 A1 | 11/2002 | Wu et al. |
| 2003/0147309 A1 | 8/2003 | Weisberg |
| 2005/0149757 A1 | 7/2005 | Corbett et al. |
| 2006/0143412 A1 | 6/2006 | Armangau |
| 2006/0161444 A1 | 7/2006 | Lubrecht et al. |
| 2007/0022065 A1 | 1/2007 | Hatano et al. |
| 2007/0100793 A1 | 5/2007 | Brown et al. |
| 2007/0183224 A1 | 8/2007 | Erofeev |
| 2007/0185852 A1 | 8/2007 | Erofeev |
| 2007/0185922 A1 | 8/2007 | Kapoor et al. |
| 2007/0185937 A1 | 8/2007 | Prahlad et al. |
| 2007/0234115 A1 | 10/2007 | Saika |
| 2007/0300221 A1 | 12/2007 | Hartz et al. |
| 2008/0126945 A1 | 5/2008 | Munkvold et al. |
| 2008/0239985 A1* | 10/2008 | Karve ................. H04L 41/5054 |
| | | 370/254 |
| 2008/0256311 A1 | 10/2008 | Lee |
| 2009/0022285 A1 | 1/2009 | Swanburg et al. |
| 2009/0028082 A1 | 1/2009 | Wynn et al. |
| 2009/0037914 A1 | 2/2009 | Chagoly et al. |
| 2009/0112881 A1 | 4/2009 | Kodama |
| 2009/0125858 A1 | 5/2009 | Vishweshwara et al. |
| 2009/0132543 A1 | 5/2009 | Chatley et al. |
| 2009/0228669 A1 | 9/2009 | Slesarev et al. |
| 2010/0023564 A1* | 1/2010 | Yerneni ................ G06F 16/27 |
| | | 707/E17.007 |
| 2011/0004586 A1 | 1/2011 | Cherryholmes et al. |
| 2011/0022882 A1 | 1/2011 | Jaehde et al. |
| 2011/0071981 A1 | 3/2011 | Ghosh et al. |
| 2011/0093435 A1 | 4/2011 | Zha et al. |
| 2011/0252420 A1* | 10/2011 | Tung ................... G06F 9/5072 |
| | | 718/1 |
| 2012/0011378 A1 | 1/2012 | Dalton et al. |
| 2012/0123999 A1 | 5/2012 | Ashutosh et al. |
| 2012/0271797 A1 | 10/2012 | Patil |
| 2012/0290714 A1 | 11/2012 | Cohen |
| 2013/0019015 A1* | 1/2013 | Devarakonda ........ G06F 9/5072 |
| | | 709/226 |
| 2013/0091285 A1* | 4/2013 | Devarakonda ........ G06F 9/4856 |
| | | 709/226 |
| 2013/0117441 A1 | 5/2013 | Kuchibhotla et al. |
| 2013/0263119 A1 | 10/2013 | Pissay et al. |
| 2013/0290180 A1 | 10/2013 | Baffier et al. |
| 2014/0006350 A1 | 1/2014 | Fukui et al. |
| 2014/0059226 A1 | 2/2014 | Messerli et al. |
| 2014/0101117 A1 | 4/2014 | Uzzaman |
| 2014/0189685 A1 | 7/2014 | Kripalani |
| 2014/0201171 A1 | 7/2014 | Vijayan et al. |
| 2014/0229698 A1 | 8/2014 | Sivasubramanian et al. |
| 2014/0282256 A1 | 9/2014 | Fish et al. |
| 2014/0359058 A1 | 12/2014 | Karnawat et al. |
| 2015/0019495 A1 | 1/2015 | Siden et al. |
| 2015/0039837 A1 | 2/2015 | Quan et al. |
| 2015/0052108 A1 | 2/2015 | Volk et al. |
| 2015/0074054 A1 | 3/2015 | Antony |
| 2015/0121453 A1 | 4/2015 | Gupta |
| 2015/0142610 A1 | 5/2015 | Manoharan et al. |
| 2015/0143064 A1 | 5/2015 | Bhargava et al. |
| 2015/0195347 A1 | 7/2015 | Luft |
| 2015/0227435 A1 | 8/2015 | Ashutosh et al. |
| 2015/0227602 A1 | 8/2015 | Ramu et al. |
| 2015/0301814 A1 | 10/2015 | Chen et al. |
| 2015/0331923 A1 | 11/2015 | Kim |
| 2015/0347987 A1 | 12/2015 | Ali |
| 2015/0358417 A1 | 12/2015 | Patil et al. |
| 2015/0370641 A1 | 12/2015 | Susairaj et al. |
| 2016/0041997 A1 | 2/2016 | Gokhale et al. |
| 2016/0048408 A1 | 2/2016 | Madhu et al. |
| 2016/0077923 A1 | 3/2016 | Zhang et al. |
| 2016/0078104 A1 | 3/2016 | Clifford et al. |
| 2016/0092535 A1 | 3/2016 | Kuchibhotla et al. |
| 2016/0094401 A1* | 3/2016 | Anwar ................ G06F 11/3006 |
| | | 709/223 |
| 2016/0094410 A1* | 3/2016 | Anwar .................... H04L 67/10 |
| | | 709/223 |
| 2016/0125059 A1 | 5/2016 | Jain et al. |
| 2016/0127307 A1 | 5/2016 | Jain et al. |
| 2016/0162845 A1 | 6/2016 | Carroll et al. |
| 2016/0197835 A1 | 7/2016 | Luft |
| 2016/0224259 A1 | 8/2016 | Ahrens et al. |
| 2016/0267105 A1 | 9/2016 | Sun et al. |
| 2016/0274981 A1 | 9/2016 | Wilkinson |
| 2016/0292358 A1 | 10/2016 | Heger |
| 2016/0321339 A1 | 11/2016 | Tekade et al. |
| 2016/0335369 A1 | 11/2016 | Picard et al. |
| 2016/0337473 A1 | 11/2016 | Rao |
| 2016/0344582 A1* | 11/2016 | Shivanna ............. H04L 67/303 |
| 2016/0378622 A1 | 12/2016 | Ren et al. |
| 2016/0380809 A1 | 12/2016 | Hou et al. |
| 2017/0039236 A1* | 2/2017 | Li ........................... G06F 9/5044 |
| 2017/0060699 A1 | 3/2017 | Hohl et al. |
| 2017/0115978 A1 | 4/2017 | Modi et al. |
| 2017/0220777 A1 | 8/2017 | Wang et al. |
| 2017/0235758 A1 | 8/2017 | Gopalapura Venkatesh et al. |
| 2017/0235950 A1 | 8/2017 | Gopalapura Venkatesh et al. |
| 2017/0264684 A1 | 9/2017 | Spillane et al. |
| 2017/0286517 A1 | 10/2017 | Horowitz et al. |
| 2017/0286518 A1 | 10/2017 | Horowitz et al. |
| 2017/0351584 A1 | 12/2017 | Griffith et al. |
| 2017/0351716 A1 | 12/2017 | Higginson et al. |
| 2017/0374136 A1 | 12/2017 | Ringdahl |
| 2018/0025007 A1 | 1/2018 | Dai |
| 2018/0121494 A1 | 5/2018 | Antonopoulos et al. |
| 2018/0157561 A1 | 6/2018 | Venkatesh et al. |
| 2018/0181469 A1 | 6/2018 | Yueh et al. |
| 2018/0253676 A1 | 9/2018 | Sheth et al. |
| 2018/0275881 A1 | 9/2018 | Ashraf et al. |
| 2018/0285201 A1 | 10/2018 | Bangalore et al. |
| 2018/0307728 A1 | 10/2018 | Crupi et al. |
| 2019/0005407 A1 | 1/2019 | Harris et al. |
| 2019/0018738 A1 | 1/2019 | Chen |
| 2019/0034240 A1 | 1/2019 | Nabi et al. |
| 2019/0065322 A1 | 2/2019 | Chakankar et al. |
| 2019/0075031 A1 | 3/2019 | Skelton et al. |
| 2019/0087279 A1 | 3/2019 | Kumar et al. |
| 2019/0089597 A1 | 3/2019 | Pathak et al. |
| 2019/0102257 A1 | 4/2019 | Zhou et al. |
| 2019/0102411 A1 | 4/2019 | Hung et al. |
| 2019/0121671 A1* | 4/2019 | Guim Bernat .......... G06F 9/505 |
| 2019/0125828 A1 | 5/2019 | Bortz |
| 2019/0129799 A1 | 5/2019 | Kumarasamy |
| 2019/0138631 A1 | 5/2019 | Crane |
| 2019/0155699 A1 | 5/2019 | Luo et al. |
| 2019/0155936 A1 | 5/2019 | Du et al. |
| 2019/0158605 A1 | 5/2019 | Markuze et al. |
| 2019/0179711 A1* | 6/2019 | Luo ..................... G06F 11/1464 |
| 2019/0230156 A1 | 7/2019 | McLarty et al. |
| 2019/0235904 A1 | 8/2019 | Epping et al. |
| 2019/0238412 A1* | 8/2019 | Vohra ..................... H04L 41/12 |

(56) References Cited

U.S. PATENT DOCUMENTS

| | | | |
|---|---|---|---|
| 2019/0266268 A1 | 8/2019 | Polinati | |
| 2019/0310926 A1 | 10/2019 | Hashimoto et al. | |
| 2019/0324865 A1 | 10/2019 | Weissman et al. | |
| 2019/0332582 A1 | 10/2019 | Kumar et al. | |
| 2019/0339870 A1 | 11/2019 | Meiri et al. | |
| 2019/0340091 A1 | 11/2019 | Chandrasekaran et al. | |
| 2019/0362004 A1 | 11/2019 | Oks et al. | |
| 2019/0370146 A1* | 12/2019 | Babu | G06F 16/24545 |
| 2019/0384496 A1 | 12/2019 | Abdul Rasheed et al. | |
| 2019/0391880 A1 | 12/2019 | Wang et al. | |
| 2019/0394093 A1 | 12/2019 | Kulkarni et al. | |
| 2020/0034178 A1 | 1/2020 | Gupta et al. | |
| 2020/0034245 A1 | 1/2020 | Kohler | |
| 2020/0050522 A1 | 2/2020 | Coleman et al. | |
| 2020/0059411 A1 | 2/2020 | Olmsted-Thompson et al. | |
| 2020/0081704 A1 | 3/2020 | Bafna et al. | |
| 2020/0097177 A1 | 3/2020 | Ashokkumar et al. | |
| 2020/0099692 A1 | 3/2020 | Jindal et al. | |
| 2020/0104375 A1 | 4/2020 | Earnesty et al. | |
| 2020/0104376 A1 | 4/2020 | Earnesty et al. | |
| 2020/0104377 A1 | 4/2020 | Earnesty et al. | |
| 2020/0106737 A1 | 4/2020 | Beedu et al. | |
| 2020/0110675 A1 | 4/2020 | Wang et al. | |
| 2020/0137157 A1 | 4/2020 | Joseph et al. | |
| 2020/0193388 A1 | 6/2020 | Tran-Kiem et al. | |
| 2020/0201526 A1* | 6/2020 | Kuchibhotla | G06F 16/2358 |
| 2020/0210378 A1 | 7/2020 | Kuchibhotla et al. | |
| 2020/0210379 A1 | 7/2020 | Kuchibhotla et al. | |
| 2020/0250046 A1 | 8/2020 | Wong et al. | |
| 2020/0250059 A1 | 8/2020 | Bothello et al. | |
| 2020/0285608 A1 | 9/2020 | Chakankar et al. | |
| 2020/0285652 A1 | 9/2020 | Wang et al. | |
| 2020/0349018 A1 | 11/2020 | Meadowcroft et al. | |
| 2020/0379793 A1 | 12/2020 | Parihar et al. | |
| 2021/0064512 A1 | 3/2021 | Sirov et al. | |
| 2021/0117293 A1 | 4/2021 | Luo et al. | |
| 2021/0133031 A1 | 5/2021 | Moldvai et al. | |
| 2021/0144060 A1 | 5/2021 | Cencini et al. | |
| 2021/0200643 A1 | 7/2021 | Luo et al. | |
| 2021/0218598 A1 | 7/2021 | Ganapathy et al. | |
| 2021/0406717 A1 | 12/2021 | Tauheed et al. | |
| 2023/0095814 A1 | 3/2023 | Sarkar | |
| 2023/0096071 A1 | 3/2023 | Sarkar | |
| 2023/0185823 A1 | 6/2023 | Chu et al. | |
| 2023/0195529 A1 | 6/2023 | Luthra et al. | |

FOREIGN PATENT DOCUMENTS

| | | |
|---|---|---|
| CN | 108664660 A | 10/2018 |
| CN | 113010599 A | 6/2021 |
| EP | 1 654 683 B1 | 5/2006 |
| LU | 102236 B1 | 11/2020 |
| TW | 201600970 A1 | 1/2016 |
| WO | WO-2016/069029 A1 | 5/2016 |
| WO | WO-2020/072338 A1 | 4/2020 |
| WO | WO-2021/108075 A1 | 6/2021 |

OTHER PUBLICATIONS

Aws. "Working with backups" Amazon Relational Database Service. Jan. 16, 2013. Retrieved from https://docs.aws.amazon.com/AmazonRDS/latest/UserGuide/USER_WorkingWithAutomatedBackups.html (accessed Dec. 7, 2023).

Hussain, Sadequl. "Running SQL Server Databases in the Amazon Cloud—RDS Backup and Restore (Part 3)" MSSQL Tips. Jan. 22, 2016. Retrieved from https://www.mssqltips.com/sqlservertip/3290/running-sql-server-databases-in-the-amazon-cloud-rds-backup-and-restore-part-3/ (accessed Dec. 7, 2023).

Sommer, Chris. "Beware the automated backup window when running native SQL Server backups in RDS" SQL Server Central. Aug. 4, 2017. Retrieved from https://www.sqlservercentral.com/blogs/beware-the-automated-backup-window-when-running-native-sql-server-backups-in-rds (accessed Dec. 7, 2023).

Actifio Enablement Team, "https://Awww.youtube.com/watch?v=7mCcJTXxFM3|", "Oracle Advanced Data Protection and Workflows", May 15, 2018 ) (Year: 2018).

Amazon, "Amazon Aurora User Guide for Aurora: Overview of multi-master clusters" Amazon Aurora User Guide from https://docs.aws.amazon.com/AmazonRDS/latest/AuroraUserGuide/aurora-ug.pdf#aurora-multi-master (accessed Jun. 28, 2021).

Anjum, Maaz, "Database Provisioning in EM12c: Provision me a Database Now!" Slideshare, (Dec. 12, 2013) from https://www.slideshare.net/MaazAnjum/maaz-anjum-gouser-database-provisioning-in-em12c-provision-me-a-database-now (accessed Jun. 28, 2021).

Arslan, Erman, "Delphix—Notes vol. 1, my new toy for the upcoming months," Erman Arslan's Oracle Blog, published Aug. 8, 2016, retrieved on Jan. 2, 2023 from http://ermanarslan.blogspot.com/2016/08/delphix-notes-vol-1-my-new-toy-for.html.

Asanka, Dinesh, "Point in Time Recovery with SQL Server" SQL Shack, published Dec. 19, 2016, retrieved Feb. 11, 2022 from <https://www.sqlshack.com/point-in-time-recovery-with-sql-server/> (Year: 2016).

AWS Serverless SaaS Workshop—Lab4 : Isolating tenant data in a pooled model—Adding the missing code.

AWS Serverless SaaS Workshop—Lab4 : Isolating tenant data in a pooled model—Revisiting Authentication, Authorization, & Tenant Isolation.

AWS. "Amazon EC2 M5 Instances" Amazon DocumentDB. Amazon EC2. Nov. 2017. Retrieved from https://aws.amazon.com/ec2/instance-types/m5/ (accessed Apr. 6, 2023).

AWS. "Amazon Relational Database Service (RDS)" Amazon Relational Database Service. Dec. 24, 2017. Retrieved from https://web.archive.org/web/20171224182936/https://aws.amazon.com/rds/#features (accessed Sep. 6, 2023).

AWS. "AWS glossary" AWS General Reference Guide. Jan. 2013. Retrieved from https://docs.aws.amazon.com/general/latest/gr/glos-chap.html (accessed Apr. 6, 2023).

AWS. "Copy a snapshot" Amazon Elastic Compute Cloud. Dec. 2012. Retrieved from https://docs.aws.amazon.com/AWSEC2/latest/UserGuide/ebs-copy-snapshot.html#ebs-snapshot-copy (accessed Apr. 6, 2023).

AWS. "CopySnapshot" Amazon Elastic Compute Cloud. Dec. 2014. Retrieved from https://docs.aws.amazon.com/AWSEC2/latest/APIReference/API_CopySnapshot.html (accessed Apr. 6, 2023).

AWS. "Create a custom Windows AMI" Amazon Elastic Compute Cloud. Jan. 15, 2013. Retrieved from https://docs.aws.amazon.com/AWSEC2/latest/WindowsGuide/Creating_EBSbacked_WinAMI.html (accessed Aug. 30, 2023).

AWS. "Create a DB instance" Amazon Relational Database Service. Jan. 2016. Retrieved from https://docs.aws.amazon.com/AmazonRDS/latest/UserGuide/CHAP_Tutorials.WebServerDB.CreateDBInstance.html (accessed Jul. 26, 2023).

AWS. "CreateDBInstanceReadReplica" Amazon Relational Database Service. Jan. 16, 2013. Retrieved from https://docs.aws.amazon.com/AmazonRDS/latest/APIReference/API_CreateDBInstanceReadReplica.html (accessed Apr. 25, 2023).

AWS. "Creating a MySQL DB Instance and Connecting to a Database on a MySQL DB Instance" Amazon Relational Database Service. Dec. 22, 2017. Retrieved from https://web.archive.org/web/20171222204154/https://docs.aws.amazon.com/AmazonRDS/latest/UserGuide/CHAP_GettingStarted.CreatingConnecting.MySQL.html (accessed Sep. 6, 2023).

AWS. "Creating and connecting to a MySQL DB instance" Amazon Relational Database Service. May 2014. Retrieved from https://docs.aws.amazon.com/AmazonRDS/latest/UserGuide/CHAP_GettingStarted.CreatingConnecting.MySQL.html (accessed Jul. 26, 2023).

AWS. "Creating and connecting to an Oracle DB instance" Amazon Relational Database Service. Jun. 6, 2014. Retrieved from https://docs.aws.amazon.com/AmazonRDS/latest/UserGuide/CHAP_GettingStarted.CreatingConnecting.Oracle.html (accessed Aug. 30, 2023).

AWS. "Kubernetes on AWS" Amazon Web Services. Jun. 2018. Retrieved from https://aws.amazon.com/kubernetes/#:~:text=Kubernetes%20manages%20clusters%20of%20Amazon,premises%20and%20in%20the%20cloud (accessed Apr. 6, 2023).

(56) References Cited

OTHER PUBLICATIONS

AWS. "Maintaining a DB instance" Amazon Relational Database Service. Sep. 5, 2015. Retrieved from https://docs.aws.amazon.com/AmazonRDS/latest/UserGuide/USER_UpgradeDBInstance.Maintenance.html#OS_Updates (accessed Aug. 30, 2023).
AWS. "Regions and Availability Zones" Amazon Relational Database Service. Dec. 22, 2017. Retrieved from https://web.archive.org/web/20171222195304/http:/docs.aws.amazon.com/AmazonRDS/latest/UserGuide/Concepts.RegionsAndAvailabilityZones.html (accessed Sep. 6, 2023).
AWS. "Storage" Amazon Elastic Compute Cloud. Sep. 14, 2014. Retrieved from https://docs.aws.amazon.com/AWSEC2/latest/WindowsGuide/Storage.html (accessed Apr. 6, 2023).
AWS. "Working with DB instance read replicas" Amazon Relational Database Service. Jan. 18, 2013. Retrieved from https://docs.aws.amazon.com/AmazonRDS/latest/UserGuide/USER_ReadRepl.html (accessed Apr. 25, 2023).
BackupAssist, "https://backupassist.com/support/en/backupassist/manage/calendar.htm", Jul. 1, 2017 (Year: 2017).
Balasubramanian, Sudhir, "Virtual vols. for Database Backup and Recovery" VMware Virtualize Applications (Nov. 5, 2015) from https://blogs.vmware.com/apps/2015/11/virtual-volumes-for-database-backup-and-recovery-2.html (accessed Jun. 2, 2021).
Barr, Jeff. "Amazon EC2 Bare Metal Instances with Direct Access to Hardware" AWS News Blog. Nov. 28, 2017. Retrieved from https://aws.amazon.com/blogs/aws/new-amazon-ec2-bare-metal-instances-with-direct-access-to-hardware/ (accessed Apr. 6, 2023).
Barr, Jeff. "New—Cross-Account Copying of Encrypted EBS Snapshots" AWS News Blog. Jun. 21, 2016. Retrieved from https://aws.amazon.com/blogs/aws/new-cross-account-copying-of-encrypted-ebs-snapshots/ (accessed Apr. 6, 2023).
Bolton, Dean et al. "Database-as-a-Service (DBaaS) Reference Architecture with VMware and Tintri" VMware Tintri VLSS (2015) from https://blogs.vmware.com/apps/files/2015/10/vRA_DBAAS_VLSS_Tintri.pdf (Jun. 2, 2021).
Brummitt, Karis et al., "Database provisioning just got a lot easier—and a lot smarter" RealWire (Feb. 27, 2017) from https://www.realwire.com/releases/Database-provisioning-just-got-a-lot-easier-and-a-lot-smarter (accessed Jun. 28, 2021).
Cano, Ignacio, et al. "Curator: Self-Managing Storage for Enterprise Clusters" (Mar. 27, 2017), from https://www.usenix.org/conference/nsdi17/.
Cisco Public, "Cisco HyperFlex All-Flash Systems for Oracle Database Deployments" (Jun. 2017) from https://www.cisco.com/c/en/us/products/collateral/hyperconverged-infrastructure/hyperflex-hx-series/whitepaper_c11-739237.pdf (accessed Dec. 18, 2019).
Cisco Public, "Cisco HyperFlex HX Data Platform" (2018) from https://www.cisco.com/c/dam/en/US/products/collateral/hyperconverged-infrastructure/hyperflex-hx-series/white-paper-c11-736814.pdf (accessed Dec. 18, 2019).
CloudThat. "Virtualization in Amazon Web Services" CloudThat. Oct. 16, 2014. Retrieved from https://www.cloudthat.com/resources/blog/virtualization-in-amazon-web-services (accessed Aug. 30, 2023).
Cormac, "Virtual Volumes (VVols) and Replication/DR" cormachogan.com (Apr. 13, 2015) from https://cormachogan.com/2015/04/13/virtual-volumes-vvols-and-replicationdr/ (accessed Jun. 2, 2021).
Delphix "Backup and Recovery Strategies for the Delphix Engine" (published 2017) Delphix Corp., from https://docs.delphix.com/docs/data-backup-and-recovery-solutions/backup-and-recovery-strategies-for-the-delphix-engine (accessed Dec. 19, 2019).
Delphix "Database Provisioning Overview" (published 2017) Delphix Corp., from https://docs.delphix.com/docs/introduction/database-virtualization-with-delphix/database-provisioning-overview (accessed Dec. 19, 2019).
Delphix "Quick Start Guides" (published 2017) Delphix Corp., from https://docs.delphix.com/docs52/quick-start-guides (accessed Dec. 19, 2019).
Delphix "Replication" (Published 2017) Delphix Corp., from https://docs.delphix.com/docs52/data-backup-and-recovery-solutions/replication (accessed Dec. 19, 2019).
Delphix Corp., "Delphix Engine User Guide," Delphix, published Dec. 2017, retrieved Jan. 2, 2023 from https://docs.delphix.com/docs52/files/83053093/83053098/2/1512670775673/Delphix Engine User Guide.pdf.
Delphix Corp., "Delphix Engine User Guide," Delphix, published Nov. 2018, retrieved Jan. 2, 2023 from https://docs.delphix.com/docs531/files/98113199/98116076/2/1542301179433/User Guide.pdf.
Delphix Corp., "Delphix Engine User Guide," Delphix, published Oct. 2017, retrieved Jan. 2, 2023 from https://docs.delphix.com/docs-old/files/74711255/74715951/5/1509647013871/Delphix Engine User Guide.pdf.
Delphix Corp., "Linking to a Database," Database Linking Overview, published Dec. 2017, retrieved on Jan. 2, 2023 from https://docs.delphix.com/docs52/introduction/database-virtualization-with-delphix/database-linking-overview.
Delphix Corp., "Understanding Timelines," Understanding Timelines and How to Preserve Data in a Point in Time, published Jun. 2018, retrieved Jan. 2, 2023 from https://docs.delphix.com/docs526/delphix-self-service/delphix-self-service-data-user-guide/understanding-timelines-and-how-to-preserve-data-in-a-point-in-time.
Delphix Corp., "What Does the Delphix Engine Do?," Delphix Engine Overview, published Dec. 2017, retrieved on Jan. 2, 2023 from https://docs.delphix.com/docs52/introduction/database-virtualization-with-delphix/delphix-engine-overview.
Delphix Corp., "What's New Guide for 5.2," Delphix, published Dec. 2017, retrieved on Jan. 2, 2023 from https://docs.delphix.com/docs52/files/83053093/83056028/2/1513184739765/What%27s New Guide for 5.2.pdf.
Delphix, "Understanding SnapSync and LogSync for Oracle" (May 5, 2013) from https://www.delphix.com/blog/data-virtualization/understanding-snapsync-and-logsync-oracle (accessed Jan. 7, 2020).
Drake, Sam et al. "Architecture of Highly Available Databases" International Service Availability Symposium, pp. 1-16. Springer, Berlin, Heidelberg, 2004. (Year: 2004).
Ex Parte Quayle Action with Refs. on U.S. Appl. No. 29/733,571 Dtd Feb. 11, 2022.
Extended European Search Report re EP21192308.1 Dtd Jan. 24, 2022.
Extended European Search Report re EP21192379.2 Dtd Jan. 26, 2022.
Fenton, Tom, "How to Create VMware Virtual Volumes" Virtualization & Cloud Review (Feb. 26, 2015) from https://virtualizationreview.com/articles/2015/02/26/how-to-create-vmware-virtual-volumes.aspx (accessed Jun. 2, 2021).
Final Office Action on U.S. Appl. No. 16/234,547 Dtd May 11, 2023.
Final Office Action on U.S. Appl. No. 16/234,547 Dtd Sep. 9, 2022.
Final Office Action on U.S. Appl. No. 16/234,547 Dtd Oct. 5, 2021.
Final Office Action on U.S. Appl. No. 16/805,581 Dtd Jul. 6, 2022.
Final Office Action on U.S. Appl. No. 17/006,595 Dtd Oct. 14, 2021.
Final Office Action on U.S. Appl. No. 17/182,511 Dtd Dec. 6, 2022.
Final Office Action on U.S. Appl. No. 17/337,197 Dtd Dec. 15, 2022.
Flecha, Pete, "Whats New in Virtual Volumes (vVols) 2.0" VMware vSAN Virtual Blocks Blog (Oct. 18, 2016) from https://blogs.vmware.com/virtualblocks/2016/10/18/whats-new-in-virtual-volumes-2-0/ (accessed Jun. 2, 2021).
Flexera. "How can I copy an EBS snapshot between different EC2 regions?" Flexera CMP Docs. Dec. 19, 2015. Retrieved from https://docs.rightscale.com/faq/clouds/aws/How_can_I_copy_an_EBS_snapshot_between_different_EC2_regions.html (accessed Apr. 6, 2023).
Foreign Action other than Search Report on EP 21192308.1 Dtd Apr. 6, 2022.
Foreign Action other than Search Report on EP 21192308.1 Dtd Jun. 10, 2022.
Foreign Action other than Search Report on EP 21192379.2 Dtd Jun. 15, 2022.
Foreign Search Report on PCT Dtd Sep. 7, 2023.
Friedman, Vitaly, "Designing the Perfect Date and Time Picker." Smashing Magazine, published Jul. 2017 (Retrieved from the

(56) References Cited

OTHER PUBLICATIONS

Internet Apr. 7, 2020). Internet URL: <https://www.smashingmagazine.com/2017 /07 /designing-perfect-date-time-picker/> (Year: 2017).
Fritchey, Grant, "SQL Server Database Provisioning" Redgate, (Nov. 4, 2016) from https://www.red-gate.com/simple-talk/devops/database-devops/sql-server-database-provisioning/ (accessed Jun. 28, 2021).
Geek University, "VM snapshot files," VMware ESXi course, retrieved Sep. 11, 2022 from https://geek-university.com/vm-snapshot-files/.
Geier, Eric, "Using Static IP Addresses on Your Network" Cisco Press. Sep. 14, 2009. Received from https://www.ciscopress.com/articles/article.asp?p=1393495. (Year: 2009).
Google Cloud. "Creating Instances" Database Products. Sep. 18, 2018. Retrieved from https://web.archive.org/web/20180918103721/ https:/cloud.google.com/sql/docs/mysql/create-instance (accessed Sep. 6, 2023).
Gui, Huan et al. "Network A/B Testing: From Sampling to Estimation" Proceedings of the 24th International Conference on World Wide Web (WWWWW 15), pp. 399-409, May 18, 2015. DOI: 10.1145/2736277.2741081 (Year: 2015).
Havewala, Porus. "Back Up a Thousand Databases Using Enterprise Manager Cloud Control 12c" Technical Article. Jan. 2014. Retrieved from https://www.oracle.com/technical-resources/articles/enterprise-manager/havewala-rman-em12c.html (accessed Aug. 30, 2023).
Hosterman, Cody, "Introducing vSphere Virtual vols. on the FlashArray" Pure Storage (Jun. 13, 2017) from https://blog.purestorage.com/purely-technical/introducing-vsphere-virtual-volumes-on-the-flasharray/ (accessed Jun. 2, 2021).
Hosterman, Cody, "Introducing vSphere Virtual vols. on the FlashArray" PureStorage, (Jun. 13, 2017) from https://blog.purestorage.com/purely-technical/introducing-vsphere-virtual-volumes-on-the-flasharray/ (accessed Jun. 28, 2021).
Hosterman, Cody, "Virtual Volumes and Array Snapshots Part I: Managed Snapshots" codyhosterman.com (Jul. 30, 2018) from https://www.codyhosterman.com/2018/07/virtual-volumes-and-array-snapshots-part-i-managed-snapshots/ (accessed Jun. 2, 2021).
Hu et al. "Architecture of Highly Available Databases" Lecture Notes in Computer Science (LCNS). vol. 3335, pp. 1-16. May 2004. DOI: 10.1007/978-3-540-30225-4_1. (Year: 2004).
Jain, Viral. "How to Create SQL Database In AWS" C-Sharp Corner. May 4, 2018. Retrieved from https://www.c-sharpcorner.com/article/how-to-create-sql-database-in-aws/ (accessed Jul. 26, 2023).
Kohavi, Ron et al., "Online Controlled Experiments and A/B Testing" Encyclopedia of Machine Learning and Data Mining, vol. 7, No. 8, pp. 922-929. Jan. 2017. DOI: 10.1007/978-1-4899-7502-7 891-1 (Year: 2017).
Kolasa, Konrad, "Date Picker." Dribbble, published Feb. 28, 2017 (Retrieved from the Internet Apr. 7, 2020). Internet URL: <https://dribbble.com/shots/3326020-Date-Picker> (Year: 2017).
Kubernetes. "Authenticating" Kubernetes Documentation. Jul. 12, 2018. Retrieved from https://kubernetes.io/docs/reference/access-authn-authz/authentication/ (accessed Oct. 11, 2023).
Kubernetes. "Nodes" Kubernetes Documentation. Jul. 14, 2017. Retrieved from https://kubernetes.io/docs/concepts/architecture/nodes/ (accessed Oct. 11, 2023).
Kubernetes. "Operating etcd clusters for Kubernetes" Kubernetes Documentation. Sep. 27, 2018. Retrieved from https://kubernetes.io/docs/tasks/administer-cluster/configure-upgrade-etcd/ (accessed Oct. 11, 2023).
Lctree, "Lctree," Linked Clone Tree Visualizer for vCloud Director, published (Nov. 28, 2012).
M. A. Metawai et al. "Load balancing in distributed multi-agent computing systems" Ain Shams Engineering Journal. ASEJ. May 23, 2012. p. 237-249. (Year: 2012).
Matijaca, Ante, "Dashboard" Dribbble, published Dec. 21, 2015, retrieved Feb. 11, 2022 from <https://dribbble.com/shots/2417233-Dashboard> (Year: 2015).
Meadowcroft, Ben, "Virtual Volumes: First Year in Review" VMware vSAN Virtual Blocks Blog (Mar. 14, 2016) from https://blogs.vmware.com/virtualblocks/2016/03/14/virtual-volumes-first-year-in-review/ (accessed Jun. 28, 2021).
Mehta, Siddharth, "Analytics with Bower BI Desktop Dynamic Line References" MSSQL Tips, published Oct. 2, 2017, retrieved Feb. 11, 2022 from <https://www.mssqltips.com/sqlservertip/5084/analytics-with-power-bi-desktop-dynamic-line-references/? (Year: 2017).
Mellor, Chris "Delphix sends database virtualization sailing up the Amazon" (published Dec. 1, 2017) The Register, from https://www.theregister.co.uk/2017/12/01/delphix_database_virtualization_comes_to_aws/ (accessed Dec. 18, 2019).
Microsoft Docs, "Always On availability groups: a high-availability and disaster-recovery solution" Microsoft SQL Docs, Apr. 23, 2019 (2019), https://docs.microsoft.com/en-us/sql/database-engine/availability-groups/windows/always-on-availability-groups-sql-server?view=sql-server-ver15.
Microsoft Docs, "What is an Always On availability group?" Microsoft SQL Docs, Apr. 29, 2020 (2020) https://docs.microsoft.com/en-us/sql/database-engine/availability-groups/windows/overview-of-always-on-availability-groups-sql-server?view=sql-server-ver15.
Microsoft SQL, "Upgrading Always On Availability Group Replica Instances" Microsoft SQL Docs, Jan. 10, 2018, retrieved from https://docs.microsoft.com/en-us/sql/database-engine/availability-groups/windows/upgrading-always-on-availability-group-replica-instances?view=sql-server-ver15 (retrieved Feb. 15, 2021).
Microsoft, "Use a template to create an Access desktop database," Microsoft Office Support, retrieved Sep. 29, 2022 from https://support.microsoft.com/en-us/office/use-a-template-to-create-an-access-desktop-database-d9354d47-e4ce-4efb-878b-c48f3650fb73.
Mongodb. "mongodb" GitHub. Mar. 2015. Retrieved from https://github.com/mongodb/docs/blob/v4.2/source/core/replica-set-priority-0-member.txt (accessed Aug. 30, 2023).
Murugan, Palani, "Delphix Dynamic Data Platform on VMware vSAN," VMware Virtual Blocks Blog, published Nov. 20, 2017, retrieved on Jan. 2, 2023 from https://blogs.vmware.com/virtualblocks/2017/11/20/delphix-vsan/.
MySQL. "Creating a MySQL Server Deployment" Documentation. Mar. 13, 2017. Retrieved from https://web.archive.org/web/20170313043247/http:/docs.oracle.com/cloud/latest/mysql-cloud/UOMCS/GUID-D03FE523-AD8D-4C53-935C-D5D6513D2A24.htm#GUID-D03FE523-AD8D-4C53-935C-D5D6513D2A24 (accessed Sep. 6, 2023).
Net App Support, "Data replication from one destination to another in a series (cascading)" Net App. 2015. Received from https://library.netapp.com/ecmdocs/ECMP1635994/html/GUID-25C143ED-C369-4129-B055-C532FDB8AB79.html (Year: 2015).
Netapp Support, "Cloning databases using SnapManager" (Aug. 2013) from, https://library.netapp.com/ecmdocs/ECMP1217281/html/GUID-EAA4950A-C186-423D-9574-6EA12A92E53D.html (accessed Dec. 17, 2019).
Netapp Support, "Types of SnapManager restore operations" (Aug. 2013) from, https://library.netapp.com/ecmdocs/ECMP1217281/html/GUID-599DF5AE-C49F-4BF0-A96C-E6E71FAFF102.html (accessed Dec. 17, 2019).
Nizhegolenko, Alexey. "High-Availability MySQL cluster with load balancing using HAProxy and Heartbeat." Towards Data Science. Dec. 3, 2018. Retrieved from https://towardsdatascience.com/high-availability-mysql-cluster-with-load-balancing-using-haproxy-and-heartbeat-40a16e134691 (Year: 2018).
Non-Final Office Action on U.S. Appl. No. 16/228,728 Dtd Mar. 24, 2020.
Non-Final Office Action on U.S. Appl. No. 16/234,547 Dtd Feb. 22, 2022.
Non-Final Office Action on U.S. Appl. No. 16/234,547 Dtd Apr. 15, 2021.
Non-Final Office Action on U.S. Appl. No. 16/234,547 Dtd Nov. 7, 2022.
Non-Final Office Action on U.S. Appl. No. 16/234,553 Dtd Jan. 6, 2021.
Non-Final Office Action on U.S. Appl. No. 16/805,581 Dtd Jan. 14, 2022.

(56) References Cited

OTHER PUBLICATIONS

Non-Final Office Action on U.S. Appl. No. 16/805,581 Dtd Oct. 12, 2022.
Non-Final Office Action on U.S. Appl. No. 17/122,740 Dtd Aug. 19, 2022.
Non-Final Office Action on U.S. Appl. No. 17/181,586 Dtd Jul. 1, 2022.
Non-Final Office Action on U.S. Appl. No. 17/182,511 Dtd Jul. 21, 2022.
Non-Final Office Action on U.S. Appl. No. 17/237,599 Dtd Oct. 14, 2022.
Non-Final Office Action on U.S. Appl. No. 17/337,197 Dtd Jun. 6, 2023.
Non-Final Office Action on U.S. Appl. No. 17/337,197 Dtd Sep. 8, 2022.
Non-Final Office Action on U.S. Appl. No. 17/694,964 Dtd Aug. 9, 2023.
Non-Final Office Action on U.S. Appl. No. 17/951,632 Dtd Sep. 14, 2023.
Notion, "Database templates," Notion Help Center, retrieved Sep. 29, 2022 from https://www.notion.so/help/database-templates.
Nutanix "Nutanix announces Flow, Era and Beam and .NEXT 2018" (published May 9, 2018) Nutanix Youtube, from https://www.youtube.com/watch?v=w40asaGtrkU (accessed Dec. 19, 2019).
Nutanix, "Blueprints Usage," Nutanix Support and Insights, retrieved Sep. 29, 2022 from https://portal.nutanix.com/page/documents/details?targetId=Nutanix-Calm-Admin-Operations-Guide-v3_2_7:nuc-nucalm-blueprints-intro-c.html.
Nutanix, "Creating a Playbook," Nutanix Support and Insights, retrieved Sep. 29, 2022 from https://portal.nutanix.com/page/documents/details?targetId=Nutanix-Beam-User-Guide:bea-playbook-create-t.html.
Nutanix, "Creating a ServiceNow Template in Beam," Nutanix Support and Insights, retrieved Sep. 29, 2022 from https://portal.nutanix.com/page/documents/details?targetId=Nutanix-Beam-User-Guide:bea-servicenow-template-create-cg-t.html.
Nutanix, Inc. "Prism Central Guide", Acropolis 5.0, (Oct. 18, 2018), pp. 1-374.
Nutanix, Inc., "Acropolis Advance Administration Guide" Acropolis 5.0 Feb. 9, 2018, pp. 1-60.
Nutanix, Inc., "Acropolis Advanced Administration Guide" Acropolis 5.1, Jul. 11, 2018, pp. 1-63.
Nutanix, Inc., "Prism Central Guide", Acropolis 5.1, (Oct. 18, 2018), pp. 1-410.
Nyffenegger et al., "SQL Server Instance" 2017, from https://renenyffenegger.ch/notes/development/databases/SQL-Server/architecture/instance (retrieved Jan. 25, 2022).
Or, Andrew, "Understanding your Apache Spark Application Through Visualization" Data Bricks, published Jun. 22, 2015, retrieved Feb. 11, 2022 from <https://databricks.com/blog/2015/06/22/understanding-your-spark-application-through-visualization.html> (Year: 2015).
Oracle Communications, "Provisioning Database Interface User's Guide, Release 16.0" (Sep. 2014) Oracle, p. 1-174.
Oracle, "Creating Databases Using Database Template," Cloud Administration Guide, retrieved Sep. 29, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.
Oracle, "Creating Databases Using Database Template," Cloud Administration Guide, retrieved on Oct. 17, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.
Oracle, "Creating Databases Using Database Template," Enterprise Manager Cloud Administration Guide, retrieved Sep. 29, 2022 from https://docs.oracle.com/cd/E91266_01/EMCLO/GUID-BB3923BE-192D-40A2-9C5D-AAC5BA3326C0.htm#EMCLO2097.
Oracle, "Creating Databases Using Database Template," Enterprise Manager Cloud Administration Guide, retrieved on Oct. 17, 2022 from https://docs.oracle.com/cd/E91266_01/EMCLO/GUID-BB3923BE-192D-40A2-9C5D-AAC5BA3326C0.htm#EMCLO2097.
Oracle, "Introduction to Blueprints," Enterprise Manager Cloud Administration Guide, retrieved Sep. 29, 2022 from https://docs.oracle.com/cd/E63000_01/EMCLO/blueprint.htm#EMCLO1910.
Oracle, "Using the DBaaS Self Service Portal," Cloud Administration Guide, retrieved Sep. 29, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.
Oracle, "Part III: Database Provisioning" Enterprise Manager Lifecycle Management Administrator's Guide (2012) from https://docs.oracle.com/cd/E24628_01/em.121/e27046/part_db_prov.htm#CHDBHBCE (accessed Jun. 28, 2021).
Oracle, "Webinar: Automate your database provisioning to increase efficiency and standardization" (published Jul. 14, 2020) Oracle Youtube, from https://www.youtube.com/watch?v=nUMdekXyqr4 (accessed Jun. 28, 2021).
Oracle. "About Managed Targets" Enterprise Manager Cloud Control Extensibility Programmer's Guide. May 2014. Retrieved from https://docs.oracle.com/cd/E24628_01/doc.121/e25159/managed_targets.htm#EMPRG140 (accessed Aug. 30, 2023).
Oracle. "Managing Groups" Enterprise Manager Cloud Control Administrator's Guide. Feb. 2016. Retrieved from https://docs.oracle.com/cd/E24628_01/doc.121/e24473/group_management.htm#EMADM9216 (accessed Aug. 30, 2023).
Palmer, Brent, "Date Range." Dribbble, published Oct. 21, 2015 (Retrieved from the Internet Apr. 7, 2020). Internet URL: < https://dribbble.com/shots/2306949-Date-Range> (Year: 2015).
Patil, Manoj E. et al. "Design and Implementation of Graphical User Interface for Relational Database Management System" (2012), International Jounral of Computer Science and Information Technologies (IJCSIT), vol. 3 (3), p. 3871-3874.
PlanetScale. "PlanetScale is the world's most advanced serverless MySQL platform" PlanetScale. Retrieved from https://planetscale.com/ (accessed Apr. 6, 2023).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Principled Technologies, "VMware vCloud Automation Center DBaaS: Provision databases in minutes" A Principled Technologies Test Report (Aug. 2014) from https://www.principledtechnologies.com/vmware/vCAC_DBaaS_0914.pdf (accessed Jun. 2, 2021).
Progress. "Multi-tenant features" Progress Documentation. Apr. 12, 2017. Retrieved from https://docs.progress.com/bundle/openedge-database-management-117/page/Multi-tenant-features.html (accessed Sep. 28, 2023).
Progress. "Simple tenancy" Progress Documentation. Apr. 12, 2017. Retrieved from https://docs.progress.com/bundle/openedge-database-management-117/page/Simple-tenancy.html (accessed Sep. 28, 2023).
Progress. "Tenant ID" Progress Documentation. Apr. 12, 2017. Retrieved from https://docs.progress.com/bundle/openedge-database-multitenancy-117/page/Tenant-ID.html (accessed Sep. 28, 2023).
Progress. "Tenant-ID() method" Progress Documentation. Jun. 2011. Retrieved from https://docs.progress.com/bundle/abl-reference/page/TENANT-ID-method.html# (accessed Sep. 28, 2023).
Progress. "What is multi-tenancy?" Progress Documentation. Apr. 12, 2017. Retrieved from https://docs.progress.com/bundle/openedge-database-multitenancy-117/page/What-is-multi-tenancy.html (accessed Sep. 28, 2023).

(56) References Cited

OTHER PUBLICATIONS

Quest. "Creating custom User-defined Database Groups" Support. Aug. 16, 2017. Retrieved from https://support.quest.com/kb/4229519/creating-custom-user-defined-database-groups (accessed Aug. 30, 2023).

Raffic, Mohammed, "Creating Linked Clone Desktop Pools in VMware Horizon View 6.X," VMware Arena, published Mar. 15, 2017, retrieved Sep. 11, 2022 from http://www.vmwarearena.com/creating-linked-clone-desktop-pools-in-vmware-horizon-view-6-x/.

Reed, Kate "Nutanix Introduces Database Services with Era" (published May 9, 2018) Business Wire, from https://www.businesswire.com/news/home/20180509005397/en/ (accessed Dec. 18, 2019).

Reed, Kate "Nutanix Introduces Database Services with Era" (published May 9, 2018) Nutanix Press Releases, from https://ir.nutanix.com/company/press-releases/press-release-details/2018/Nutanix-Introdu/ (accessed Dec. 18, 2019).

Reinero, Bryan. "Your Ultimate Guide to Rolling Upgrades" MongoDB. May 1, 2018. Retrieved from https://www.mongodb.com/blog/post/your-ultimate-guide-to-rolling-upgrades (accessed Aug. 30, 2023).

Rocheleau, Jake, "30 Best Free Calendar & Datepicker jQuery Plugins." Vandelay Design, published Aug. 29, 2018 (Retrieved from the Internet Apr. 7, 2020). Internet URL: <https://www.vandelaydesign.com/30-best-free-jquery-plugins/> (Year: 2018).

Rubrik, "Exploring the Depth of Simplicity: Protecting Microsoft SQL Server with Rubrik," Technical White Paper, published Mar. 2017, retrieved on Jan. 2, 2023 from https://www.rubrik.com/content/dam/rubrik/en/resources/white-paper/Protecting-Microsoft-SQLServer-with-Rubrik.pdf.

Rubrik, "Hyperconverged Infrastructure with the Simplest Data Protection," published Jan. 2016, retrieved on Jan. 2, 2023 from https://web.archive.org/web/20210117100439/https://www.rubrik.com/wp-content/uploads/2015/12/Joint-Solution-Brief-Nutanix-and-Rubrik.pdf.

Sanglaji, Maryam et al. "Nutanix Era: Databases Made Simple" (published 2018) Nutanix, from https://www.nutanix.com/blog/nutanix-era-databases-made-simple (accessed Dec. 18, 2019).

Sanglaji, Maryam et al. "Nutanix Era: One-click Database Management (London)" (published 2018) .NEXT Conference 2018, from https://next.nutanix.com/next-conference-2018-54/nutanix-era-one-click-database-manag (accessed Dec. 18, 2019).

Sanglaji, Maryam et al. "Nutanix Era: One-click Database Management" (published 2018) .NEXT Conference 2018, from https://www.dropbox.com/s/tfhw1nb0rcvexg3/NEXTEURO2018%20-%20Nutanix%20Era-One%20click%20Database%20Management.pdf?dl=0 (accessed Dec. 18, 2019).

Savjani, Parikshit, "Automate your Azure Database for MySQL deployments using ARM templates," Microsoft Azure, published Nov. 1, 2018, retrieved Sep. 29, 2022 from https://azure.microsoft.com/en-us/blog/automate-your-azure-database-for-mysql-deployments-using-arm-templates/.

Sharif, Ashraf. "Making Your Database Components Highly Available (HA) via Load Balancers". Several Nines. Mar. 20, 2018. Retrieved from https://severalnines.com/blog/become-clustercontrol-dba-making-your-db-components-ha-load-balancers (Year: 2018).

Sharma, Madhurkant. "Cloud Computing Platforms and Technologies" Geeks for Geeks. Sep. 8, 2018. Retrieved from https://www.geeksforgeeks.org/cloud-computing-platforms-and-technologies/ (accessed Jul. 26, 2023).

Singh, Deepak. "Cluster Management with Amazon ECS" AWS Compute Blog. Feb. 6, 2015. Retrieved from https://aws.amazon.com/blogs/compute/cluster-management-with-amazon-ecs/ (accessed Apr. 6, 2023).

Steven Tom, Idaho National Laboratory, "Recommended Practice for Patch Management of Control Systems", Dec. 2008, Cybersecurity Infrastructure Security Agency (CISA), U.S. Department of Homeland Security. (Year: 2008).

Storti, Brian "A Primer on Database Replication" Brianstorti.com (May 23, 2017) from https://www.brianstorti.com/replication/ (accessed Jun. 28, 2021).

Tabbara, Bassam, et al. "Introducing Crossplane—An Open Source Multi-Cloud Control-Plane" Dec. 4, 2018. Retrieved from https://docs.google.com/document/d/1whncqdUeU2cATGEJhHvzXWC9xdK29Er45NJeoemxebo/mobilebasic (accessed Sep. 28, 2023).

Tang, "Multi-tenant access control for cloud services", Aug. 2014, The University of Texas at San Antonio College of Sciences.

Tarvo, Alexander et al., "CanaryAdvisor: a statistical-based tool for canary testing (demo)" Proceedings of the 2015 International Symposium on Software Testing and Analysis (ISSTA 2015), pp. 418-422, Jul. 13, 2015, DOI: 10.1145/2771783.2784770 (Year: 2015).

Ten Six. "How to Assign a Task Calendar in Microsoft Project" Ten Six Consulting. Feb. 27, 2018. Retrieved from https://tensix.com/how-to-assign-a-task-calendar-in-microsoft-project/ (accessed Sep. 28, 2023).

The Nutanix Bible; from https://nutanixbible.com/; accessed on Jan. 12, 2016.

The Nutanix Bible; from https://nutanixbible.com/; accessed on Jun. 25, 2018.

The Nutanix Bible; from https://nutanixbible.com/; accessed on Jan. 3, 2017.

The Nutanix Bible; from https://nutanixbible.com/; accessed on Jan. 3, 2018.

The Nutanix Bible; from https://nutanixbible.com/; accessed on Sep. 4, 2015.

The Nutanix Bible; from https://nutanixbible.com/; accessed on Jan. 8, 2019.

The Nutanix Bible; from https://nutanixbible.com/; accessed on Jun. 8, 2017.

The Nutanix Bible; from https://nutanixbible.com/; accessed on Jun. 9, 2016.

U.S. Office Action on U.S. Appl. No. 17/006,595 Dtd Aug. 27, 2021.

VMware "VMware vFabric Data Director Administrator and User Guide: Clone a Database" (2012) from https://pubs.vmware.com/datadirector/index.jsp?topic=%2Fcom.vmware.datadirector.admin.doc%2FGUID-426EEA1E-BF44-462F-B400-E2421F53144D.html (accessed Dec. 17, 2019).

VMware Tanzu, "Innovate and grow your business on any and many clouds-fast", 2022.

VMware, "Getting Started with Database Ingestion," VMware vFabric Data Director 2.0, retrieved Sep. 11, 2022 from https://www.vmware.com/pdf/vfabric-data-director-20-database-ingestion-guide.pdf.

VMware, "Horizon Cloud on Microsoft Azure Architcture", https://techzone.vmware.com/resource/horizon-cloud-on-microsoft-azure-architecture#introduction.

VMware, "VMware Horizon 7 Instant-Clone Desktops and RDSH Servers," VMware Horizon 7.x, published Jul. 2017, retrieved Sep. 11, 2022 from https://www.vmware.com/content/dam/digitalmarketing/vmware/en/pdf/techpaper/vmware-horizon-view-instant-clone-technology.pdf.

VMware, "VMware vFabric Data DirectorAdministrator and User Guide," vFabric Data Director 1.0, retrieved Sep. 11, 2022 from https://usermanual.wiki/vmware/vfabricdatadirector10ag.715740134/view.

Vmware, "VMware vStorage Virtual Machine File System," Vmware Technical White Paper Updated for VMware Vsphere 4 Version 2.0, retrieved Sep. 11, 2022 from https://www.vmware.com/content/dam/digitalmarketing/vmware/en/pdf/techpaper/vmware-vmfs-tech-overview-white-paper.pdf.

VMware, "Getting Started with Database-as-a-Service" VMware vFabric Data Director 2.0 (2012) from https://www.vmware.com/pdf/vfabric-data-director-20-database-as-a-service-guide.pdf (accessed Jun. 2, 2021).

VMware, "VMware vFabric Data Director 2.0: Getting Started with Database Provisioning" (2012) from https://www.vmware.com/pdf/vfabric-data-director-20-database-provision-guide.pdf (accessed Dec. 18, 2019).

VMware, "What's New: vSphere Virtual Volumes" VMware Storage Business Unit Documentation (Aug. 2015) from https://www.vmware.com/content/dam/digitalmarketing/vmware/en/pdf/products/virtualvolumes/vmware-whats-new-vsphere-virtual-volumes.pdf (accessed Jun. 2, 2021).

(56) References Cited

OTHER PUBLICATIONS

VMware, Create Network Profiles, https://vdc-repo.vmware.com/vmwb-repository/dcr-public/e07569a6-6154-45d7-acdf-595e0b089892/44bb2e01-dd74-44e8-98da-b16f257b9a8d/GUID-35DF1889-6E34-449E-915A-3BC5C4DA172C.html.

Vogels, Werner. "Under the Hood of Amazon EC2 Container Service" All Things Distributed. Jul. 20, 2015. Retrieved from https://www.allthingsdistributed.com/2015/07/under-the-hood-of-the-amazon-ec2-container-service.html (accessed Apr. 6, 2023).

Warner, Alex et al., "Chapter 16—Canarying Releases" (published 2018) Google Workbook published by O'Reilly Media, Inc., from https://sre.google/workbook/canarying-releases/ (accessed Sep. 14, 2021).

Warren, "Internet Archive Wayback Machine Introduces New Beta Version With Calendar View." warren's blog, published Jan. 23, 2011 (Retrieved from the Internet Apr. 7, 2020). Internet URL: <warrenduecker.blogspot.com/2011/01/internet-archive-wayback-machine.html> (Year: 2011).

WebDeveloper Juice, "7 Beatiful Web Based Timeline Using Javascript and CSS," WebDeveloper Juice, published Sep. 28, 2011, retrieved Feb. 11, 2022 from <https://www.webdeveloperjuice.com/2011/09/28/7-beautiful-web-based-timeline-using-javascript-and-css/> (Year: 2011).

YouTube Video for Delphix Corp., "How to Create Database Copies with Delphix," YouTube, Apr. 3, 2018, https://www.youtube.com/watch?v=1EjR-k4EJ68 [youtube.com].

YouTube Video for Rubrik, "Item-level Recovery with Rubrik SQL Server Live Mount," YouTube, Jul. 12, 2018, https://www.youtube.com/watch?app=desktop&v=Upp4Ume03P0&feature=youtu.be [youtube.com].

YouTube Video screenshots for Alibaba Cloud. "How-to | Launch a MySQL Instance on Alibaba Cloud ApsaraDB for Relational Database Service" YouTube. Feb. 27, 2017. https://youtube.com/watch?v=E5wGolVFBuU [youtube.com].

YouTube Video screenshots for Alibaba Cloud. "How-to | Set Up a Multi tier WordPress Site on Alibaba Cloud" YouTube. Jun. 25, 2018. https://youtu.be/yWXhibylW6M [youtube.com].

YouTube Video screenshots for Amazon Web Services. "Amazon ECS: Core Concepts" YouTube. Aug. 31, 2017. https://www.youtube.com/watch?app=desktop&v=eq4wL2MiNqo&feature=youtu.be [youtube.com].

YouTube Video screenshots for Progress User Assistance. "Creating tenants, domains, and users in a Progress OpenEdge multi tenant database" YouTube. May 23, 2016. Retrieved from https://youtu.be/3kGL2afVV_E [youtube.com] (accessed Sep. 28, 2023).

YouTube Video screenshots for Progress. "Data Management: Table Partitioning and Multi-tenancy" YouTube. Oct. 8, 2018. Retrieved from https://www.youtube.com/watch?v=NbEuNmSazh8 [youtube.com] (accessed Sep. 28, 2023).

Zhang, Junchi, "vFabric Data Director 2.7 customer deck," published May 17, 2013, retrieved Sep. 11, 2022 from https://www.slideshare.net/harryaya/vfabric-data-director-27-customer-deck.

* cited by examiner

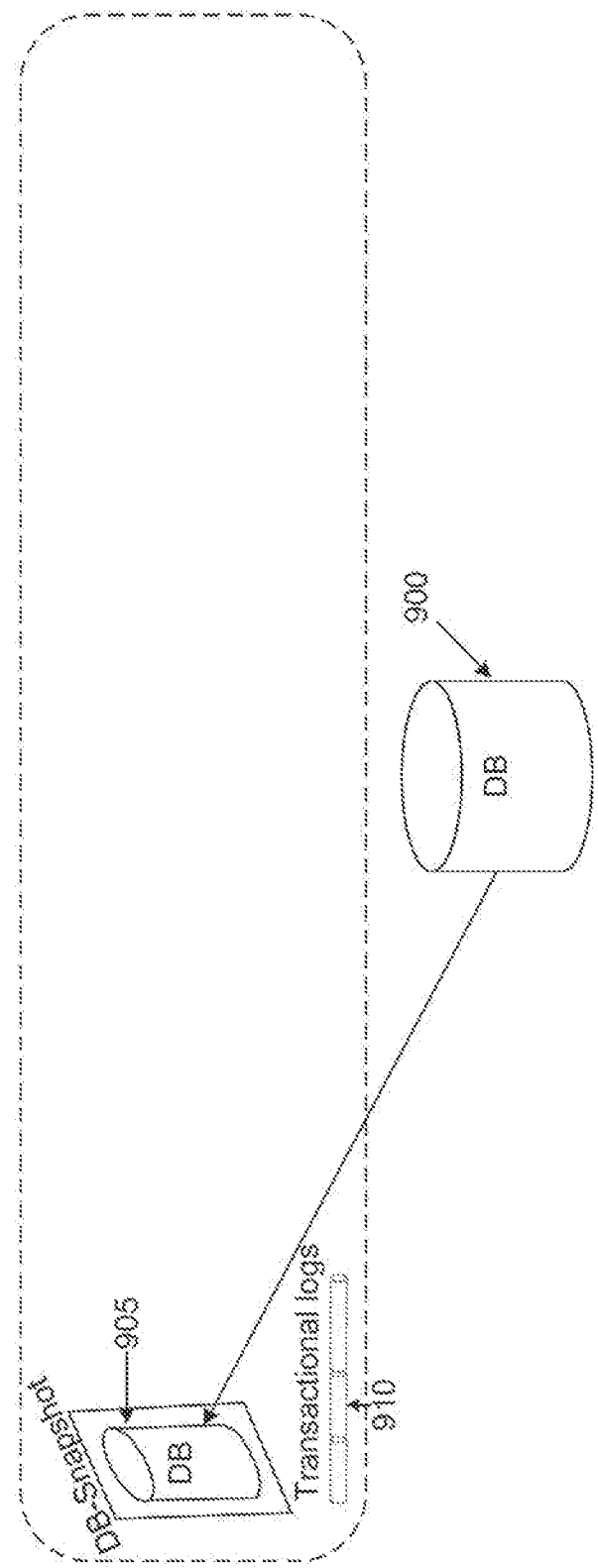

SYSTEM AND METHOD FOR PROVISIONING DATABASES IN A HYPERCONVERGED INFRASTRUCTURE SYSTEM

CROSS-REFERENCE TO RELATED PATENT APPLICATIONS

This application is a continuation of U.S. patent application Ser. No. 18/113,528, filed Feb. 23, 2023, which is a continuation of U.S. patent application Ser. No. 17/237,599 filed Apr. 22, 2021, now U.S. Pat. No. 11,604,762, which claims the benefit of U.S. patent application Ser. No. 16/234,553, filed Dec. 27, 2018, now U.S. Pat. No. 11,010,336, which are incorporated herein by reference in their entirety.

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present day virtual computing systems have limitations due to their configuration and the way they operate.

BACKGROUND

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present day virtual computing systems have limitations due to their configuration and the way they operate.

SUMMARY

In accordance with some aspects of the present disclosure, a method is disclosed. The method includes receiving, by a database engine of a database system associated with a virtual computing system, a user request via a dashboard for provisioning a source database with the database system, receiving, by the database engine via the dashboard, selection of a database engine type, and receiving, by the database engine via the dashboard, selection of a Service Level Agreement ("SLA") and a protection schedule. The method also includes provisioning, by the database engine, the source database based upon the database engine type, creating, by the database engine, an instance of a database protection system based upon the SLA and the protection schedule, including associating the instance of the database protection system with the source database, and displaying, by the database engine, the source database within the dashboard.

In accordance with some other aspects of the present disclosure, a system is disclosed. The system includes a dashboard, a database engine configured to receive input from and provide output to the dashboard, and a database storage system configured to store a source database upon provisioning. The database engine is configured to receive a user request via the dashboard for provisioning the source database, receive selection of a database engine type via the dashboard, receive selection of a Service Level Agreement ("SLA") and a protection schedule via the dashboard, and provision the source database based upon the database engine type and store the source database within the database storage system. The database engine is also configured to create an instance of a database protection system based upon the SLA and the protection schedule, including associating the instance of the database protection system with the source database and display the source database within the dashboard.

In accordance with yet other aspects of the present disclosure, a non-transitory computer readable media with computer-executable instructions embodied thereon is disclosed. The instructions when executed by a processor of a database engine associated with a database system of a virtual computing system cause the database engine to perform a process. The process includes receiving a user request via a dashboard for provisioning a source database with the database system, receiving, via the dashboard, selection of a database engine type, and receiving, via the dashboard, selection of a Service Level Agreement ("SLA") and a protection schedule. The process also includes provisioning the source database based upon the database engine type, creating an instance of a database protection system based upon the SLA and the protection schedule, including associating the instance of the database protection system with the source database, and displaying the source database within the dashboard.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIGS. 9A-9G are example screenshots showing how snapshots and transactional logs are stored within the database system, in accordance with some embodiments of the present disclosure.

Figure 1:
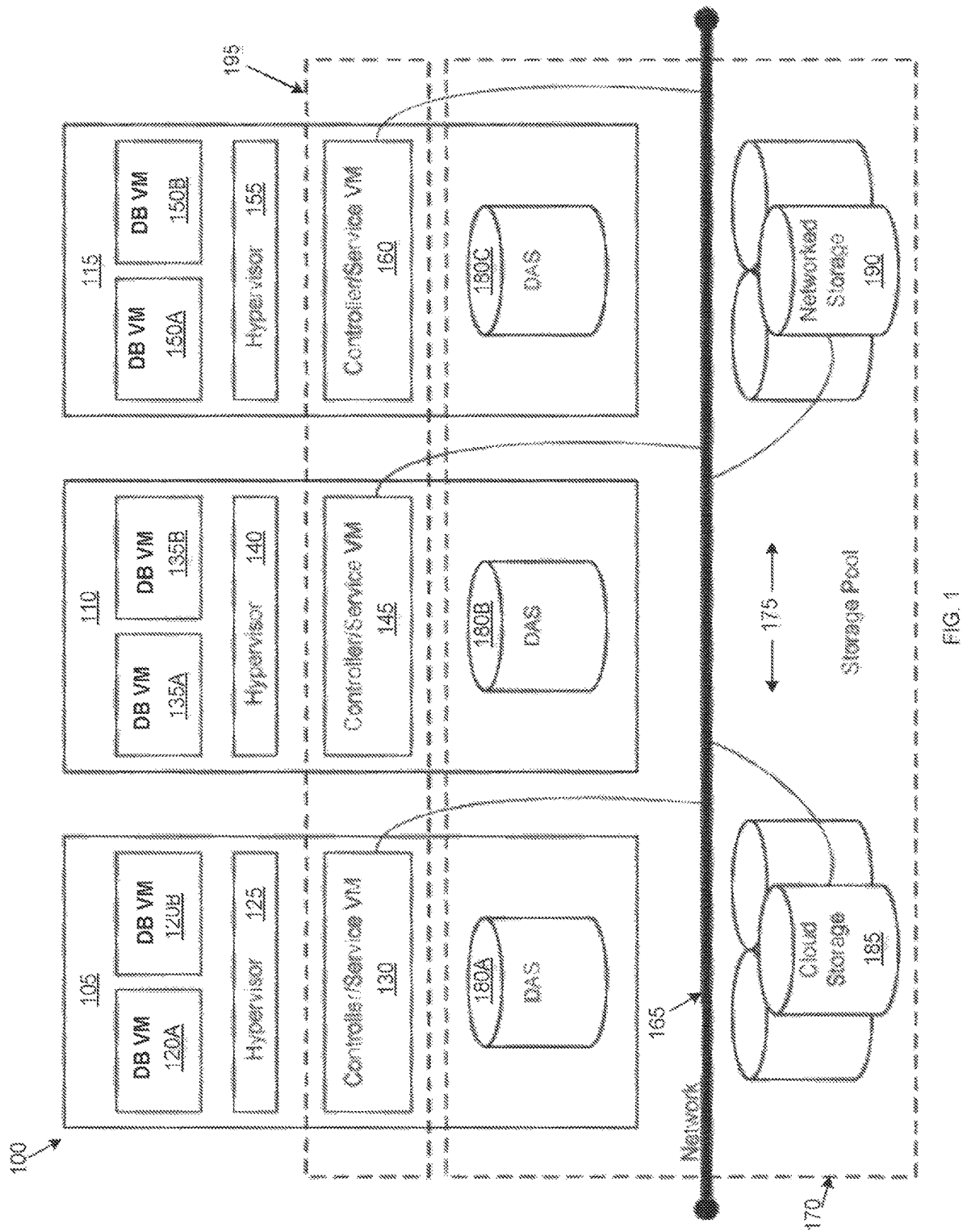
FIG. 1 is an example block diagram of a cluster of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is generally directed to a virtual computing system having a plurality of clusters, with each of the plurality of clusters having a plurality of nodes. Each of the plurality of nodes includes one or more virtual machines and other entities managed by an instance of a monitor such as a hypervisor. These and other components may be part of a datacenter, which may be managed by a user (e.g., an administrator or other authorized personnel). A distributed storage system, for providing storage and protection capabilities, is associated with the virtual computing system. The virtual computing system may be configured for providing database management services. For example, at least some of the one or more virtual machines within the virtual computing system may be configured as database virtual machines for storing one or more databases. These databases may be managed by a database system. The database system may provide a plurality of database services. For example, in some embodiments, the database system may provide database provisioning services and copy data management services.

Database provisioning services involve creating and/or associating databases with the database system for management and use. Creating a new database and associating the database with the database system may be a complex and long drawn process. A user desiring to create a new database with a provider of the database system may make a new database creation request with the database provider. The user request may pass through multiple entities (e.g., people, teams, etc.) of the database provider before a database satisfying the user request may be created. For example, the user may be required to work with a first entity of the database provider to specify the configuration (e.g., database engine type, number of storage disks needed, etc.) of the database that is desired. Upon receiving the database configuration, another entity of the database provider may configure a database virtual machine for hosting the database, while yet another entity may configure the networking settings to facilitate access to the database upon creation. Yet another entity of the database provider may configure database protection services to backup and protect the database. All of these tasks may take a few to several days. Thus, creating the database is a time intensive process and inconvenient for the user. The user may not have the time or desire to wait for the multiple days to create the database.

Further, creating the database using the above procedure requires the user to rely on the other entities. If these other entities become unavailable, the user may have no choice but to wait for those entities to become operational again. Additionally, the user may not be fully privy to or even understand the various configurational details of the desired database that the user may be asked to provide to the other entities for creating the database. The present disclosure provides technical solutions to the above problems. Specifically, the database system of the present disclosure greatly simplifies the database provisioning service. The database system of the present disclosure allows the user to quickly and conveniently create a new database and associate the database with the database system without the need for contacting and working with multiple entities. The entire process of creating and associating the database with the database system may be completed by the user within a span of a few minutes instead of the multiple days mentioned above.

The database system of the present disclosure provides a user friendly, intuitive user interface that solicits information from and conveniently walks the user through the various steps for creating a new database within minutes. The database system may include a catalog of standardized configurations, which the user may select from the user interface for creating the database. The user may modify the standardized configurations or create custom configurations to suit their needs. By virtue of providing standardized configurations, the present disclosure simplifies the database creation process for the user. The user interface also hides the complexity of creating the database from the user. For example, the user need not worry about creating, partitioning, or associating storage space (e.g., storage disk space) with the database that is being created. The user may simply specify a size of the database that is desired in the user interface and the database system automatically translates that size into storage space. Thus, based upon the needs of the user, the user is able to specifically tailor the database during creation and create the database easily and quickly using the user interface.

The database system also provides the ability to register an existing database with the database system. Such existing databases may have been created outside of the database system. Users having existing databases may desire to associate their databases with the database system for management. Similar to creating a new database in the database system, registering an existing database with the database system is easy, convenient, and may be completed within a span of a few minutes via the user interface. As with the creation of a new database, the user interface walks the user through the registration process, provides standardized configurations for the user to select from, ability to modify the standardized configurations, and create new configurations. Upon registering the database with the database system, the database may take advantage of other database management services offered by the database system.

Copy data management services involve protecting a database. Protecting a database means replicating a state of the database for creating a fully functional copy of the database. Replicating the state of the database may involve creating fully functional clones (e.g., back-ups) of the database. Since the clones are fully functional copies of the original or source database, a user may perform operations on the cloned copy that would otherwise be performed on the original database. For example, the user may perform reporting, auditing, testing, data analysis, etc. on the cloned copy of the original database. A cloned database may be created by periodically capturing snapshots of the source database. A snapshot stores the state of the source database at the point in time at which the snapshot is captured. The snapshot is thus a point in time image of the database. The snapshot may include a complete encapsulation of the virtual machine on which the database is created, including the configuration data of the virtual machine, the data stored within the database, and any metadata associated with the virtual machine. Any of a variety of snapshotting techniques may be used. For example, in some embodiments, copy-on-write, redirect-on-write, near-sync, or other snapshotting methods may be used to capture snapshots. From the snapshot, the source database may be recreated to the state at which the snapshot was captured.

However, the number of snapshots that are captured in a given day may be limited. Specifically, because capturing a snapshot requires quiescing (e.g., pausing) the source database and entering a safe mode in which user operations are halted, it is desirable to take only a minimum number of snapshots in a day. Thus, choices of state that may recreated from a snapshot may be limited. If a state is desired that falls between the capture of two snapshots, the user is generally out of luck. Thus, the desire to limit the number of snapshots in a day results in a significant technical problem that results in losing changes made to a database since the last snapshot capture or between two snapshot captures. The present disclosure provides technical solutions to this problem.

Specifically, the present disclosure automatically creates an instance of a database protection system for each database (e.g., source database) that is created within or registered with the database system. The database protection system instance may be configured to protect the source database by automatically capturing snapshots of the source database. Additionally, to avoid losing changes in state between two snapshot captures or since the last snapshot capture, the database system may capture transactional logs. A transactional log may be a text, image, disk, or other type of file that records every transaction or change that occurs on the source database since a last snapshot capture. Thus, by using the snapshots or a combination of snapshots and transactional logs, any state of the source database down to the last second (or even fractions of seconds or other time granularities) may be recreated. Specifically, states of the source database that fall between the capture of two snapshots may be recreated by using a combination of snapshots and transactional logs.

The frequency of capturing transactional logs may be higher than the frequency of capturing snapshots in a day. For example, in some embodiments, by default, a transactional log may be captured every 30 minutes. In other embodiments, the user may define the frequency of capturing transactional logs. Further, since the source database is not quiesced (paused) for capturing the transactional log, user operations may continue while the transactional logs are being captured. Further, since the transactional logs only capture the changes in the database since the last snapshot capture, the transactional logs do not consume a lot of space. Thus, clones of the source database can be created to a point in time by using a combination of transactional logs and snapshots (e.g., between two snapshot captures), or based upon available snapshots (e.g., at the point of snapshot capture).

Further, the frequency with which the snapshots and transactional logs are captured by the database system may depend upon the level of protection desired by the user. The database system may solicit a protection schedule and definition of a Service Level Agreement ("SLA") from the user. For convenience, the database system may include built-in defaults of the protections schedule and SLA levels that the user may select from. The user may modify the defaults or define new parameters for the protection schedule and SLA. Thus, the level of protection accorded to each database associated with the database system may be individually tailored based upon the requirements of the user. The protection schedule may allow the user to define the frequency of snapshots and transactional logs to be captured each day, and the time-period for capturing daily, weekly, monthly, and/or quarterly snapshots based upon the SLA.

Thus, the present disclosure provides an easy, convenient, cost effective, and user-friendly mechanism for creating and registering databases, as well as effectively protecting those databases.

Referring now to FIG. 1, a cluster 100 of a virtual computing system is shown, in accordance with some embodiments of the present disclosure. The cluster 100 includes a plurality of nodes, such as a first node 105, a second node 110, and a third node 115. Each of the first node 105, the second node 110, and the third node 115 may also be referred to as a "host" or "host machine." The first node 105 includes database virtual machines ("database VMs") 120A and 120B (collectively referred to herein as "database VMs 120"), a hypervisor 125 configured to create and run the database VMs, and a controller/service VM 130 configured to manage, route, and otherwise handle workflow requests between the various nodes of the cluster 100. Similarly, the second node 110 includes database VMs 135A and 135B (collectively referred to herein as "database VMs 135"), a hypervisor 140, and a controller/service VM 145, and the third node 115 includes database VMs 150A and 150B (collectively referred to herein as "database VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Further, although not shown, one or more of the first node 105, the second node 110, and the third node 115 may include one or more containers managed by a monitor (e.g., container engine).

The cluster 100 also includes and/or is associated with a storage pool 170 (also referred to herein as storage subsystem). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two database VMs (e.g., the database VMs 120, the database VMs 135, the database VMs 150) are shown on each of the first node 105, the second node 110, and the third node 115, in other embodiments, the number of the database VMs on each of the first, second, and third nodes may vary to include other numbers of database VMs. Further, the first node 105, the second node 110, and the third node 115 may have the same number of database VMs (e.g., the database VMs 120, the database VMs 135, the database VMs 150) or different number of database VMs.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. In some embodiments, the processing units may execute instructions without first copying the instructions to the RAM. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices that are suitable for a virtual computing system. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the database VMs 120, the database VMs 135, and the database VMs 150.

Each of the database VMs 120, the database VMs 135, the database VMs 150 is a software-based implementation of a computing machine. The database VMs 120, the database VMs 135, the database VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the database VMs 120, the database VMs 135, the database VMs 150 that may run its own operating system and applications on the underlying physical resources just like a real computer. By encapsulating an entire machine, including CPU, memory, operating system, storage devices, and network devices, the database VMs 120, the database VMs 135, the database VMs 150 are compatible with most standard operating systems (e.g. Windows, Linux, etc.), applications, and device drivers.

Thus, each of the hypervisor 125, the hypervisor 140, and the hypervisor 155 is a virtual machine monitor that allows a single physical server computer (e.g., the first node 105, the second node 110, third node 115) to run multiple instances of the database VMs 120, the database VMs 135, and the database VMs 150 with each VM sharing the resources of that one physical server computer, potentially across multiple environments. For example, each of the hypervisor 125, the hypervisor 140, and the hypervisor 155 may allocate memory and other resources to the underlying VMs (e.g., the database VMs 120, the database VMs 135, the database VM 150A, and the database VM 150B) from the storage pool 170 to perform one or more functions.

By running the database VMs 120, the database VMs 135, and the database VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new database VMs are created (e.g., installed) on the first node 105, the second node 110, and the third node 115, each of the new database VMs may be configured to be associated with certain hardware resources, software resources, storage resources, and other resources within the cluster 100 to allow those virtual VMs to operate as intended.

The database VMs 120, the database VMs 135, the database VMs 150, and any newly created instances of the database VMs may be controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the database VMs 120, the database VMs 135, and the database VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the database VMs 120, the database VMs 135, the database VM 150A, and the database VM 150B, respectively, and for managing the interactions between those VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications. The network 165 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 105, the second node 110, or the third node 115 may be configured as a leader node. The leader node may be configured to monitor and handle requests from other nodes in the cluster 100. For example, a particular database VM (e.g., the database VMs 120, the database VMs 135, or the database VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 100 to fulfil that request). Upon fulfilling the input/output request, the controller/service VM of the leader node may send a response back to the controller/service VM of the node from which the request was received, which in turn may pass the response to the database VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
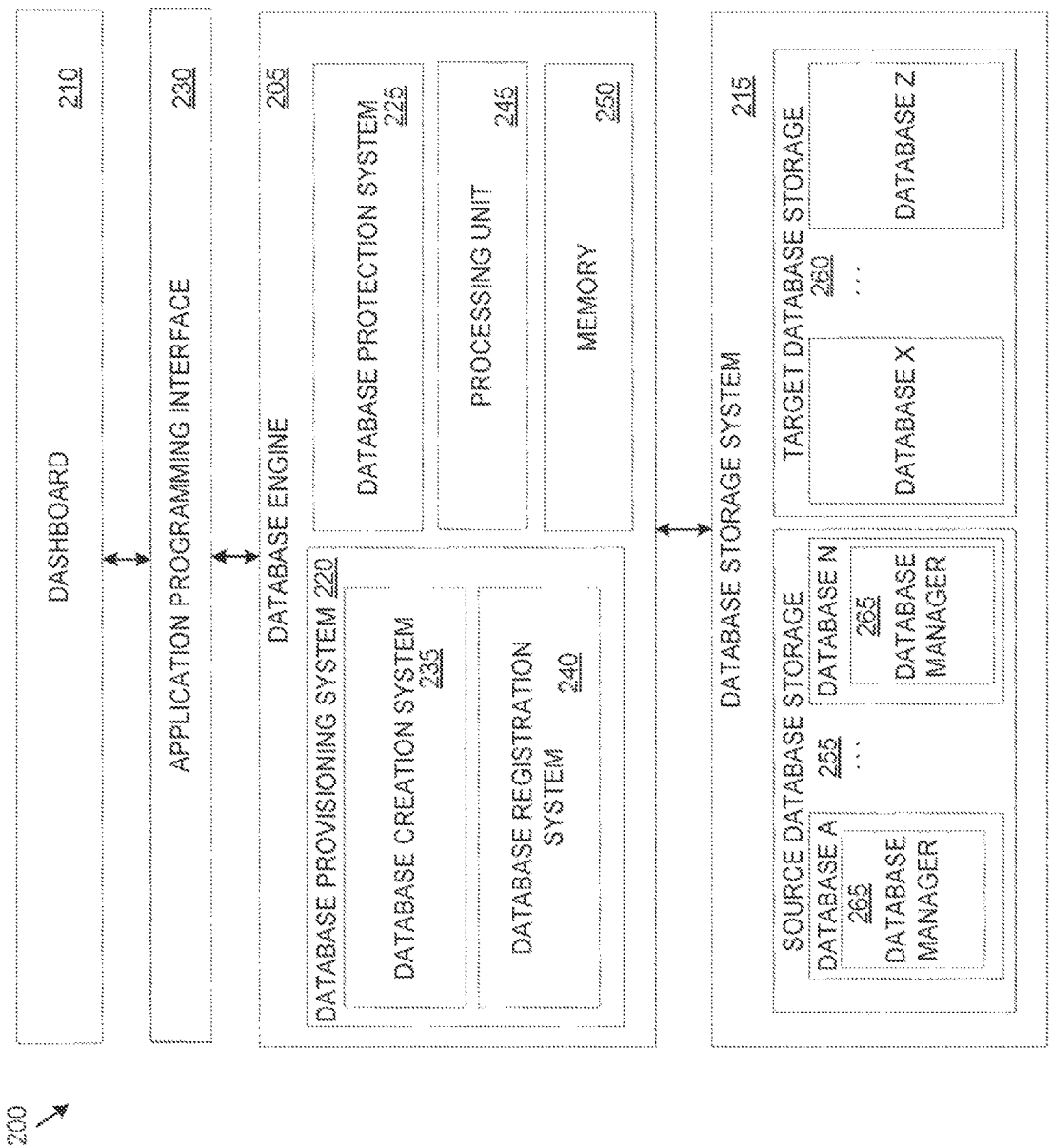
FIG. 2 is an example block diagram of a database system of the virtual computing system of FIG. 1, in accordance with some embodiments of the present disclosure.

Turning now to FIG. 2, an example block diagram of a database system 200 is shown, in accordance with some embodiments of the present disclosure. FIG. 2 is discussed in conjunction with FIG. 1. The database system 200 or portions thereof may be configured as utility software for creating and implementing database management services. The database system 200 is configured to facilitate creation/registration, querying, and/or administration of the databases associated therewith. Thus, the database system 200 includes a database engine 205 that is configured to receive input from and provide output to a user via a dashboard 210. The database engine 205 is also associated with a database storage system 215 that is configured to store one or more databases under management of the database system 200. In association with the dashboard 210 and the database storage system 215, the database engine 205 is configured to implement one or more database management services of the database system 200. For example, the database engine 205 is configured to provide database provisioning services to create new databases and register existing databases with the database system 200 using a database provisioning system 220. The database engine 205 is also configured to protect databases created or registered by the database provisioning system 220 via a database protection system 225. Although the database provisioning system 220. and the database protection system 225 are shown as separate components, in some embodiments, the database provisioning system and the database protection system may be combined and the combined component may perform the operations of the individual components. The database provisioning system 220 and the database protection system 225 are both discussed in greater detail below.

The database system 200 may be installed on a database VM (e.g., the database VMs 120, the database VMs 135, the database VMs 150 of FIG. 1). The database system 200 may be installed via the controller/service VM (e.g., the controller/service VM 130, the controller/service VM 145, the controller/service VM 160) of the node (e.g., the first node 105, the second node 110, and the third node 115) on which the database system is to be installed. For example, an administrator desiring to install the database system 200 may download a copy on write image file (e.g., qcow or qcow2 image file) on the controller/service VM to define the content and structure of a disk volume to be associated with the database system 200. In some embodiments, instead of a copy on write image file, another type of disk image file, depending upon the type of underlying hypervisor, may be installed. Further, the administrator may create or one or more new database VMs on which the database system 200 is to reside. As part of creating the database VMs, the administrator may allocate a particular number of virtual central processing units (vCPU) to each of the database VMs, define the number of cores that are desired in each vCPU, designate a specific amount of memory to each of the database VMs, and attach a database storage device (e.g., a virtual disk from the storage pool 170) with each of the database VMs. In some embodiments, at least a portion of the database storage device attached to the database system 200 may form the database storage system 215. The administrator may also create a new network interface (e.g., associate a virtual local area network (VLAN), assign an Internet Protocol ("IP") address to access the database system 200, etc.) with each of the database VMs. The administrator may perform additional and/or other actions to create the database VMs on which the database system 200 resides upon creation and installation of the disk image file.

In some embodiments, the database VMs on which the database system 200 resides may all be located on a single node (e.g., one of the first node 105, the second node 110, and the third node 115). In other embodiments, the database VMs on which the database system 200 resides may be spread across multiple nodes within a single cluster, or possibly amongst multiple clusters. When spread across multiple clusters, each of the associated multiple clusters may be configured to at least indirectly communicate with one another to facilitate operation of the database system 200. Upon installing the database system 200, a user (e.g., the administrator or other user authorized to access the database system) may access the dashboard 210. The dashboard 210, thus, forms the front end of the database system 200 and the database engine 205 and the database storage system 215 form the backend of the database system.

The database system 200 may be accessed via a computing device associated with the virtual computing system 100. In other embodiments, instead of or in addition to being accessible via a particular computing device, the database system 200 may be hosted on a cloud service and may be accessed via the cloud. In some embodiments, the database system 200 may additionally or alternatively be configured as a mobile application suitable for access from a mobile computing device (e.g., a mobile phone). In some embodiments, the database system 200 and particularly the dashboard 210 may be accessed via an Application Programming Interface ("API") 230. To access the dashboard 210 via the API 230, a user may use designated devices such as laptops, desktops, tablets, mobile devices, other handheld or portable devices, and/or other types of computing devices that are configured to access the API. These devices may be different from the computing device on which the database system 200 is installed.

In some embodiments and when the dashboard 210 is configured for access via the API 230, the user may access the dashboard via a web browser and upon entering a uniform resource locator ("URL") for the API such as the IP address of the database system 200 or other web address. Using the API 230 and the dashboard 210, the users may then send instructions to the database engine 205 and receive information back from the database engine. In some embodiments, the API 230 may be a representational state transfer ("REST") type of API. In other embodiments, the API 230 may be any other type of web or other type of API (e.g., ASP.NET) built using any of a variety of technologies, such as Java, .Net, etc., that is capable of accessing the database engine 205 and facilitating communication between the users and the database engine. In some embodiments, the API 230 may be configured to facilitate communication via a hypertext transfer protocol ("HTTP") or hypertext transfer protocol secure ("HTTPS") type request. The API 230 may receive an HTTP/HTTPS request and send an HTTP/HTTPS response back. In other embodiments, the API 230 may be configured to facilitate communication using other or additional types of communication protocols. In other embodiments, the database system 200 may be configured for access in other ways.

The dashboard 210 provides a user interface that facilitates human-computer interaction between the users and the database engine 205. The dashboard 210 is configured to receive user inputs from the users via a graphical user interface ("GUI") and transmit those user inputs to the database engine 205. The dashboard 210 is also configured to receive outputs/information from the database engine 205 and present those outputs/information to the users via the GUI of the management system. The GUI may present a variety of graphical icons, windows, visual indicators, menus, visual widgets, and other indicia to facilitate user interaction. In other embodiments, the dashboard 210 may be configured as other types of user interfaces, including for example, text-based user interfaces and other man-machine interfaces. Thus, the dashboard 210 may be configured in a variety of ways.

Further, the dashboard 210 may be configured to receive user inputs in a variety of ways. For example, the dashboard 210 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the database system 200. The dashboard 210 may also be configured to present outputs/information to the users in a variety of ways. For example, the dashboard 210 may be configured to present information to external systems such as users, memory, printers, speakers, etc. Therefore, although not shown, dashboard 210 may be associated with a variety of hardware, software, firmware components, or combinations thereof. Generally speaking, the dashboard 210 may be associated with any type of hardware, software, and/or firmware component that enables the database engine 205 to perform the functions described herein.

Thus, the dashboard receives a user request (e.g., an input) from the user and transmits that user request to the database engine 205. In some embodiments, the user request may be to request a database management service. For example, in some embodiments, the user request may be to request a database provisioning service. In response to the user request for a database provisioning service, the database engine 205 may activate the database provisioning system 220. The database provisioning system 220 includes a database creation system 235 for creating new databases within the database system 200 and a database registration system 240 for registering databases that were previously created outside of the database system with the database system. Although the database creation system 235 and the database registration system 240 are shown as separate components, in some embodiments, those components may be combined together and the combined component may perform the functions of the individual components. The database creation system 235 and the database registration system 240 are discussed in greater detail in FIGS. 3-5E below.

The database protection system 225 is configured to protect databases associated with the database system 200. Thus, the database protection system 225 implements a copy data management service of the database system 200. During creation or registration of a database, the database provisioning system 220 creates an instance of a database protection system 225 for protecting the associated database. Thus, upon the creation or registration of a database, that database may be protected by the associated instance of the database protection system 225 by capturing snapshots, transactional logs, and creating cloned databases. Each instance of the database protection system 225 may receive a variety of user defined constraints in accordance with which the associated database is protected. The database protection system 225 is discussed in greater detail in FIG. 6 below.

The database engine 205, including the database provisioning system 220 and the database protection system 225 may be configured as, and/or operate in association with, hardware, software, firmware, or a combination thereof. Specifically, the database engine 205 may include a processing unit 245 configured to execute instructions for implementing the database management services of the database system 200. In some embodiments, each of the database provisioning system 220 and the database protection system 225 may have their own separate instance of the processing unit 245. The processing unit 245 may be implemented in hardware, firmware, software, or any combination thereof. "Executing an instruction" means that the processing unit 245 performs the operations called for by that instruction. The processing unit 245 may retrieve a set of instructions from a memory for execution. For example, in some embodiments, the processing unit 245 may retrieve the instructions from a permanent memory device like a read only memory (ROM) device and copy the instructions in an executable form to a temporary memory device that is generally some form of random access memory (RAM). The ROM and RAM may both be part of the storage pool 170 and/or provisioned separately from the storage pool. In some embodiments, the processing unit 245 may be configured to execute instructions without first copying those instructions to the RAM. The processing unit 245 may be a special purpose computer, and include logic circuits, hardware circuits, etc. to carry out the instructions. The processing unit 245 may include a single stand-alone processing unit, or a plurality of processing units that use the same or different processing technology. The instructions may be written using one or more programming language, scripting language, assembly language, etc.

The database engine 205 may also include a memory 250. The memory 250 may be provisioned from or be associated with the storage pool 170. In some embodiments, the memory 250 may be separate from the storage pool 170. The memory 250 may be any of a variety of volatile and/or non-volatile memories that may be considered suitable for use with the database engine 205. In some embodiments, the memory 250 may be configured to store the instructions that are used by the processing unit 245. Further, although not shown, in some embodiments, the database provisioning system 220 and the database protection system 225 may each, additionally or alternatively, have their own dedicated memory.

Further, the database engine 205 may be configured to handle a variety of types of database engines. For example, in some embodiments, the database engine 205 may be configured to manage PostgreSQL, Oracle, Microsoft SQL server, and MySQL database engines. In other embodiments, the database engine 205 may be configured to manage other or additional database engines. Each database that is created within or registered with the database system 200 may be of a particular "database engine type." The database engine type may identify the type of database management system (e.g., Oracle, PostgreSQL, etc.) of a particular database. By virtue of creating or registering a database with a particular database engine type, that database is managed in accordance with the rules of that database engine type. Thus, the database engine 205 is configured to be operable with and manage databases associated with a variety of database engine types.

It is to be understood that only some components of the database engine 205 are shown and discussed herein. In other embodiments, the database engine 205 may also include other components that are considered necessary or desirable in implementing the various database management services discussed herein. Similarly, the database provisioning system 220 and the database protection system 225 may have components that are considered necessary or desirable in implementing the various database management services discussed herein.

Referring still to FIG. 2, the database storage system 215 is configured to store one or more databases that are either created within the database system 200 or registered with the database system. The database storage system 215 may include a source database storage 255 and a target database storage 260. The source database storage 255 is configured to store the original instances of the databases (also referred to herein as source databases) that are created within or registered with the database system 200. The target database storage 260 is configured to store the clones of the source databases (also referred to herein as cloned databases). In some embodiments, the source database storage 255 and the target database storage 260 may be provisioned from the storage pool 170 and may include virtual disk storage that is associated with the database VMs (e.g., the database VMs 120, the database VMs 135, the database VMs 150) on which the database system 200, the source databases, and the cloned databases reside. For example, in some embodiments, the source database storage 255 may be associated with one or more database VMs (referred to herein as source database VMs) and the source databases stored within the source database storage may be stored within the virtual disks associated with the source database VMs. Similarly, in some embodiments, the target database storage 260 may be associated with one or more database VMs (referred to herein as target database VMs) and the databases stored within the target database storage may be stored within the virtual disks associated with the target database VMs. In some embodiments, each source database VM may be configured to store one or more source databases and each target database VM may be configured to store one or more target databases. In other embodiments, the source database storage 255 and the target database storage 260 may additionally or alternatively be provisioned from other types of storage associated with the database system 200.

Further, depending upon the size of a particular database and the size of the virtual disk associated with a particular source database VM, a source database may be stored in its entirety on a single source database VM or may span multiple source database VMs. Further, as the size of that source database increases, the source database may be moved to another source database VM, may be stored onto multiple source database VMs, and/or additional storage may be provisioned to the source database VMs to house the increased size of the source database. Similarly, depending upon the size of a cloned database and the size of the virtual disk associated with a particular target database VM, the cloned database may be stored on a single or multiple target database VMs. Further, as the size of the cloned database increases (e.g., by virtue of updating the cloned database to incorporate any changes in the source database), the cloned database may be moved to another target database VM of appropriate size, may be divided amongst multiple target database VMs, and/or additional virtual disk space may be provisioned to the target database VM. Thus, the database storage system 215 is structured with the flexibility to expand and adapt to accommodate databases of various sizes.

The database storage system 215 also includes a database manager 265. In some embodiments, each instance of the source database within the source database storage 255 may include an instance of the database manager 265. In other embodiments, a single instance of the database manager 265 may manage multiple or all source databases. The database manager 265 is configured to work with the database protection system 225 to protect the source databases stored within the source database storage 255. The database manager 265 is discussed in greater detail in FIG. 6 below. Although not shown, the database manager 265 may include a processing unit (e.g., similar to the processing unit 245), a memory (e.g., similar to the memory 250), and other hardware, software, and/or firmware components that are necessary or considered desirable for performing the functions described herein. Further, although the cloned databases in the target database storage 260 are shown as having a database manager, in some embodiments, each cloned database may be associated with a database manager for managing the cloned databases.

Figure 3:
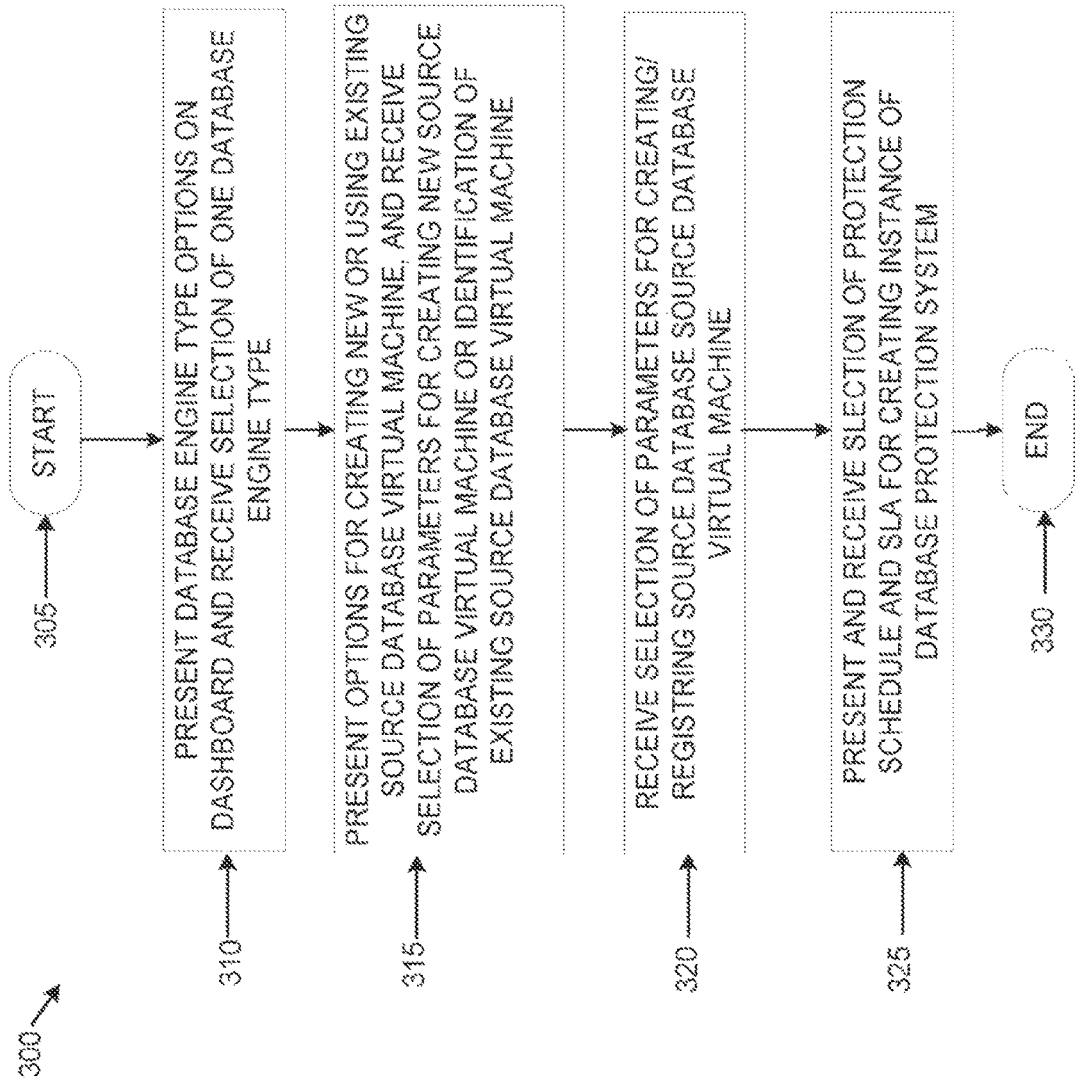
FIG. 3 is an example flowchart outlining operations for provisioning databases by the database system of FIG. 2, in accordance with some embodiments of the present disclosure.

Turning now to FIG. 3, an example flow chart outlining operations of a process 300 is shown, in accordance with some embodiments of the present disclosure. The process 300 may include additional, fewer, or different operations, depending on the particular embodiment. The process 300 may be used to implement the database provisioning service. Thus, the process 300 may be used to create a new database or register an existing database. The process 300 is discussed in conjunction with FIGS. 1 and 2 and is implemented by the database provisioning system 220 of the database engine 205 in conjunction with the dashboard 210. Specifically, the database provisioning system 220 receives inputs from the user via the dashboard 210 and performs operations in response to those inputs for creating a new database or registering an existing database. Thus, the process 300 starts at operation 305 with the database provisioning system 220 receiving a user request via the dashboard 210 for either creating a new database or registering an existing database. Specifically, once the database system 200 is installed and the user is able to access the dashboard 210, the dashboard may present an option to create a new database or register an existing database. If the user desires to create a new database, the user may select the database creation option from the dashboard 210 and activate the database creation system 235 of the database provisioning system 220. If the user desires to register an existing database, the user may select the database registration option and activate the database registration system 240 of the database provisioning system 220.

Upon activation, the database creation system 235 or the database registration system 240 may present one or more user interfaces to the user for soliciting parameters for creating a new database or registering an existing database, respectively. For example, at operation 310, the activated one of the database creation system 235 or the database registration system 240 presents, via the dashboard 210, a user interface for requesting the database engine type of the database to be created or registered. The dashboard 210 may present a selection of the database engine types that are supported by the database engine 205. The user may select one of the various database engine types presented on the dashboard 210. As noted above, the database engine type defines the database management system of the database being created or registered. For example, if the user desires to create a database with the database engine type Oracle, and if Oracle is presented as an option on the dashboard at the operation 310, the user may select Oracle on the dashboard. As another example, if the user desires to register an existing database that has been configured with the database engine type Oracle, the user may select Oracle from the dashboards at the operation 310.

The database creation system 235 or the database registration system 240 receives the user's selection of the database engine type at the operation 310. Additionally, the database creation system 235 or the database registration system 240 configures the remaining user interfaces that are presented to the user on the dashboard 210 based on the database engine type selected by the user at the operation 310. For example, if the user selected Oracle as the database engine type at the operation 315, the database creation system 235 or the database registration system 240 may configure the remaining database creation process or the database registration process in accordance with requirements for Oracle. Thus, at operation 315, the database creation system 235 or the database registration system 240 presents one or more user interfaces to the user, via the dashboard 210, for requesting a selection of parameters for defining the configuration for and creating a new source database VM on which the database being created or registered will ultimately reside.

For example, in some embodiments, the activated one of the database creation system 235 or the database registration system 240 may request parameters for defining a software profile, a network profile, a compute profile, and a database parameter profile to be associated with the new source database VM. In other embodiments, the database provisioning system 220 may request other or additional types of parameters from the user for creating the source database VM based upon the database engine type selected at the operation 310. The user interface may present one or more standardized profiles for one or more of the software profile, network profile, compute profile, and database parameter profile. The user may select from the standardized profiles in some embodiments. In some embodiments, the database creation system 235 or the database registration system 240 may also allow the user to modify a standardized profile and/or create new profiles from scratch based upon the user's preferences. Each of the profiles is based upon the database engine type selected at the operation 310. Thus, the standardized profiles that are presented to the user are in compliance with the database engine type. Similarly, the database creation system 235 or the database registration system 240 only allow those changes to the standardized profiles or creation of new profiles that comply with the database engine type.

The software profile defines the software and operating system parameters for the database engine type that is selected at the operation 310. For example, if at the operation 310, the database engine type is selected as PostgreSQL, the software profile may include one or more software and operations system image profiles associated with PostgreSQL. Each software profile may define the rules that are to be applied in managing the database being created or registered. In some embodiments, one or more sample software profiles may be available for the user to select. In other embodiments, the user may create their own custom software profile or modify an existing software profile to suit their needs. When creating their own custom software profile or modifying an existing software profile, in some embodiments, the user may be required to create/modify the software profile before starting the process 300, while in other embodiments, the user may be able to create the custom software profile as part of the operation 315.

The network profile identifies the network location of the database being created or registered to facilitate access to the database after creation or registration. In some embodiments, the network profile may be the same profile that is created during installation of the database system 200. In other embodiments, a different network profile may be used. Similar to the software profile, the database creation system 235 or the database registration system 240 may make a sample network profile available for the user to select. Alternatively, the user may create a new network profile or modify an existing network profile either before starting the process 300 or during the operation 315. The compute profile defines the size/configuration of the source database VM. For example, the compute profile may define the number of vCPUs, number of cores per vCPU, and memory capacity to be associated with the source database VM. In other embodiments, the compute profile may define other or additional configurational parameters. At the operation 315, the database creation system 235 or the database registration system 240 may also request the database parameter profile from the user. The database parameter profile defines the custom parameters that are applied to the database being created or registered. Again, the database creation system 235 or the database registration system 240 may make sample compute profiles and/or a sample database parameter profiles available for the user to select in some embodiments. Alternatively, the user may create custom compute and/or database parameter profiles or modify existing compute and/or database parameter profiles, either before starting the process 300 or during the operation 315.

In some embodiments, the database creation system 235 or the database registration system 240 may pre-select a default option for the user for one or more of the software profile, compute profile, network profile, and the database parameter profile. The database creation system 235 or the database registration system 240 may allow the user to change the default options by selecting another standardized option, modifying a standardized option, or creating a new profile. Thus, at the operation 315, the database creation system 235 or the database registration system 240 receives selection of the various parameters for creating a new source database VM.

In some embodiments, based upon the parameters received from the user, the database creation system 235 or the database registration system 240 may create a new source database VM at the operation 315. In other embodiments, the database creation system 235 or the database registration system 240 may wait until other remaining parameters are received before creating the source database VM. In some embodiments, instead of creating a new source VM, the database creation system 235 or the database registration system 240 may allow the user to use a previously created source database VM. Thus, at the operation 315, the database creation system 235 or the database registration system 240 may first request the user to select one option from either creating a new source database VM or using an existing (e.g., previously created) source database VM. Based on the user's selection, the database creation system 235 or the database registration system 240 may request the various profiles discussed above or request the user to identify the existing source database VM to use. In some embodiments, the database creation system 235 or the database registration system 240 may present a list of existing source database VMs created previously for the database engine type selected at the operation 310 and that have space available to receive the database being created or registered. The user may select one source database VM from the list. The database creation system 235 or the database registration system 240 may facilitate the user selection of an existing source database VM in other manners (e.g., by allowing the user to browse to a location, etc.).

Upon receiving selection of the various profiles for creating a new source database VM or receiving selection of an existing source database VM, at operation 320, the database creation system 235 or the database registration system 240 presents one or more user interfaces, via the dashboard 210, for requesting parameters (e.g., configurational details) for the database being created/registered. For example, the database creation system 235 or the database registration system 240 may request a database name and a description of the database being created or registered to distinguish that database from other databases within the database system 200. The database creation system 235 or the database registration system 240 may also request a database password to restrict access to the database to only authorized users, a database size to determine how much storage space is needed for storing that base, and/or any additional or other parameters that may be considered necessary or desirable in creating/registering the database. Further, the parameters that are requested may vary based upon whether a database is being created or whether an existing database is being registered. For example, if an existing database is being registered, the database registration system 240 may automatically determine the size of the database. In some embodiments, certain default values may be pre-selected for the user and the user may be allowed to change those values. Thus, at the operation 320, the database creation system 235 or the database registration system 240 receives selection of parameters from the user, via the dashboard 210, for either creating a new database or registering an existing database.

At operation 325, the database creation system 235 or the database registration system 240 presents one or more user interfaces, via the dashboard 210, to request selection of parameters for creating an instance of a database protection system (e.g., the database protection system 225) for the database being created or registered by the process 300. The instance of the database protection system is configured to protect the database being created or registered by the process 300. To create the instance of the database protection system, the database creation system 235 or the database registration system 240 may request a name and description for the instance of the database protection system 225, a level of a Service Level Agreement ("SLA"), and a protection schedule to define rules based on which the instance of the database protection system 225 operates.

An SLA is an agreement between a service provider (e.g., the owner of the database system 200) and the user (e.g., the owner of the database) that outlines, among other things, the protection scope of the database. The protection scope defines for how long data from the database being created or registered is retained. Thus, the protection scope defines the database retention policy. In some embodiments, the SLA may define various protection parameters such as continuous, daily, weekly, monthly, quarterly, or yearly protection parameters for determining the protection scope of the database being created/registered. In other embodiments, the SLA may define other or additional protection parameters.

Each database for which an instance of the database protection system 225 is created may be protected by capturing snapshots and/or transactional logs. The number of snapshots and transactional logs to be captured on each day may be defined by the user in the protection schedule. As used herein, a "day" may be any 24-hour period (e.g., from midnight to Noon). In some embodiments, the protection schedule may define default values to define the frequency of capturing snapshots and transactional logs, which the user may modify. Thus, based upon the frequency of capturing snapshots and transactional logs defined in the protection schedule, the instance of the database protection system 225 may be configured to capture one or more snapshots and one or more transactional logs each day. Generally speaking, the number of transactional logs that are captured each day may be higher than the number of snapshots that are captured on that day. Since it is impractical and expensive to indefinitely store the captured snapshots and the transactional logs, the protection parameters in the SLA define the duration for how long those snapshots and transactional logs are stored.

For example, the continuous protection parameter within the SLA defines the duration in days for which all captured snapshots and transactional logs are retained. For example, if the continuous protection parameter is defined as 30 days, the instance of the database protection system 225 is configured to retain all snapshots and transactional logs that are captured within the last 30 days. By retaining all snapshots and the transactional logs, the user may replicate any or substantially any state of the database (down to a second or even a fraction of a second).

The SLA may also define a daily protection parameter, which defines the duration in days for which a daily snapshot is stored. For example, if the daily protection parameter is 90 days, the instance of the database protection system 225 is configured to store a daily snapshot for 90 days. The protection schedule may define the time of day to identify the snapshot that is designated as the daily snapshot. For example, if the user specifies that the snapshot captured at 11:00 AM every day is the daily snapshot and the SLA defines the daily protection parameter for 90 days, the instance of the database protection system 225 may be configured to store a daily snapshot that was captured at or closest to 11:00 AM and store the daily snapshot for 90 days.

Similarly, the SLA may define weekly, monthly, and quarterly protection parameters. A weekly protection parameter in the SLA may define the duration in weeks for which a weekly snapshot is stored. The protection schedule may define the day of the week to identify which snapshot is designated as the weekly snapshot. For example, if the user defines in the protection schedule that the snapshot captured on Monday is to be designated as the weekly snapshot, and the weekly protection parameter in the SLA specifies a duration of 8 weeks, the instance of the database protection system 225 may store the snapshot captured every week on Monday for 8 weeks. If multiple snapshots are captured each day, the protection schedule may also define which snapshot captured on the designated day of the week (e.g., Monday) serves as the weekly snapshot. In some embodiments, the time defined in the protection schedule for capturing a daily snapshot may be used. For example, if the protection schedule defines that the snapshot captured at 11:00 AM is the daily snapshot, and the weekly snapshot is to be captured on Monday, the instance of the database protection system 225 may store the snapshot captured at or closest to 11:00 AM every Monday as the weekly snapshot. In other embodiments, another time period may be used.

Likewise, a monthly protection parameter in the SLA may define a duration in months for which a monthly snapshot is to be stored. The user may specify the date within the protection schedule for identifying which snapshot corresponds to the monthly snapshot. For example, the user may specify storing the snapshot captured on the $20^{th}$ of every month as the monthly snapshot in the protection schedule, and the monthly protection parameter may specify a duration of 12 months for storing the monthly snapshot. Thus, the instance of the database protection system 225 stores a monthly snapshot captured on the $20^{th}$ of every month and stores that monthly snapshot for 12 months. A quarterly protection parameter in the SLA may define a duration in quarters for which a quarterly snapshot is to be stored and the user may specify in the protection schedule which months correspond to the various quarters. For example, the user may specify January, April, July, and October as the quarters and the quarterly protection parameter may specify storing the quarterly snapshots for 20 quarters. Thus, the instance of the database protection system 225 may designate a snapshot captured on the first day of January, April, July, and October (e.g., January 1, April 1, July 1, and October 1) as the quarterly snapshot and store the quarterly snapshot for 20 quarters.

Thus, for each protection parameter that is defined in the SLA, a corresponding value may be requested from the user in the protection schedule to identify which snapshot corresponds to that protection parameter. It is to be understood that the various protection parameters and their respective schedules mentioned above are only examples and may vary from one embodiment to another as desired. Further, when the duration specified by a protection parameter expires, any snapshots or transactional logs that are expired (e.g., past their duration) may be deleted. As an example, if a snapshot is to be stored for 30 days, on the 31$^{st}$ day, that snapshot may be deleted. Thus, each snapshot and transactional log is managed based on the SLA and protection schedule independent from other snapshots and transactional logs.

Additionally, to simplify user selection, in some embodiments, various levels of SLA may be pre-defined within the database provisioning system 220. Each level of the SLA may have default values of the various protection parameters. For example, in some embodiments, the various levels of SLA may be GOLD, SILVER, BRONZE and the various protection parameters for these levels may be as follows:

| Name | Continuous | Daily | Weekly | Monthly | Quarterly |
|---|---|---|---|---|---|
| GOLD | 30 Days | 90 Days | 16 Weeks | 12 Months | 75 Quarters |
| SILVER | 14 Days | 60 Days | 12 Weeks | 12 Months | 0 Quarters |
| BRONZE | 7 Days | 30 Days | 8 Weeks | 6 Months | 0 Quarters |

It is to be understood that the nomenclature of the GOLD, SILVER, BRONZE levels of the SLA is only an example and the levels may be given different names in other embodiments. Further, although three levels of the SLA are described herein, in other embodiments, greater or fewer than three SLA levels may be used. Additionally, the values of the protection parameters in each level of the SLA may vary from one embodiment to another. The database creation system 235 or the database registration system 240 may present the various pre-defined SLA levels to the user at the operation 325 to select from. In some embodiments, the database creation system 235 or the database registration system 240 may allow the user to modify the values of one or more protection parameters in the pre-defined SLA levels. For example, if the user desires to select the GOLD level, but would like continuous protection for 45 days instead of the default value of 30 days shown in the table above, the user may modify the continuous protection parameter of the GOLD level. Thus, the pre-defined SLA levels provide the convenience and flexibility of tailoring the various protection parameters to suit the user's needs. Alternatively, the database creation system 235 or the database registration system 240 may allow the user to create a new SLA at the operation 325.

To create a new SLA, upon receiving input from the user at the operation 325 indicating creation of a new SLA, the database creation system 235 or the database registration system 240 may present one or more user interfaces to the user requesting certain information. For example, the database creation system 235 or the database registration system 240 may request an SLA name, description, and values for the continuous, daily, weekly, monthly, and quarterly protection parameters. The database creation system 235 or the database registration system 240 may request other or additional details as well. Upon receiving the various inputs from the user for creating the new SLA, the database creation system 235 or the database registration system 240 may create the new SLA and allow the user to select that SLA at the operation 325.

Therefore, at the operation 325, the database creation system 235 or the database registration system 240 receives selection of the SLA and the protection schedule for creating an instance of the database protection system 225 for the database being created/registered. At operation 330, upon receiving the various user selections at the operations 310-325, the database creation system 235 or the database registration system 240 creates a new database or registers the existing database with the database system 200. To create/register the database, the database creation system 235 or the database registration system 240 initiates a series of operations. For example, the database creation system 235 or the database registration system 240 may create a source database VM (or designate an existing source database VM), convert the database size into a number of virtual disks that are needed to house the database, create a database profile having a database name, description, network information, etc., attach the software and parameters of the database engine type with the database, create an instance of the database protection system, associate the SLA and schedule with the database protection system, designate storage for storing snapshots and transactional logs, etc. Once the database is created/registered, database management services may be applied to the database.

In some embodiments, the database creation system 235 or the database registration system 240 may request other or additional information for creating/registering the database. For example, the database creation system 235 or the database registration system 240 may request which cluster or clusters the user desires to create/register the database, which node or nodes on a cluster the user desires to create the source database VM, etc. Thus, the database system 200 provides an easy, convenient, and flexible mechanism to create a new database or register an existing database using a user friendly and intuitive user interface. Instead of requiring multiple days to create/register a database, using the user interface of the present disclosure, the database may be created/registered within minutes. Once created/registered, additional database management services may be implemented on those databases.

Turning now to FIGS. 4A-5E, example user interfaces for creating and registering a database are shown, in accordance with some embodiments of the present disclosure. FIGS. 4A-4G show example user interfaces for creating a database, while FIGS. 5A-5E show example user interfaces for registering a database. FIGS. 4A-5E are discussed in conjunction with FIGS. 1-3. Referring to FIGS. 4A-4G, FIG. 4A shows an example dashboard 400. The dashboard 400 is similar to the dashboard 210. The dashboard 400 becomes accessible to the user upon installing the database system 200 and allows the user to manage and monitor activities across multiple databases that are created/registered within the database system. In some embodiments, the user may be required to be authenticated before being able to access the dashboard 400.

The dashboard 400 may include a toolbar 405 and a body 410. The toolbar 405 is configured to switch between various control functions of the database system 200. In some embodiments, the toolbar 410 includes a main menu 415, an alerts menu 420, and a user view menu 425. The main menu 415 may be configured as a drop-down list that enables the user selected within the user view menu 425 to select and activate a control function. For example, when the control function "dashboard" is selected in the main menu 415, the dashboard 400 may be configured to display a "home page" 430 in the body 410 of the dashboard. As the control function selected in the main menu 415 is changed, the page (or at least portions thereof) that is displayed in the body 410 of the dashboard 400 may change to reflect the control function that is activated. The alerts menu 420 allows the user to view and monitor any alerts that are occurring within the database system. An "alert" may be indicative of an error or issue in the database system that needs user attention. In some embodiments, alerts may be color coded to identify the criticality of the alert. The user view menu 425 determines which features are accessible to a particular user. For example, if the user selected in the user view menu 425 is an administrator, certain features that are generally not available to a non-administrator user may be activated. It is to be understood that the toolbar 405 is only an example and may vary from one embodiment to another.

The homepage 430 displayed within the body 410 provides a summary or a "quick-glance" view of all the databases (e.g., source databases) that are managed by the database system 200. The homepage 430 may be divided into one or more components or cells. For example, the homepage 430 may include a database list cell 435A that lists all of the source databases stored in the source database VMs of the database system 200 and provides a summary of each of those source databases (e.g., name of the source database, database engine type, size of the database, name of the instance of the database protection system, number of cloned databases created from the source database, etc.). A summary cell 435B lists the total number of source databases created or registered on the source database VMs combined (e.g., the total number of databases listed in the database list cell 435A), the total number of cloned databases created from those total number of source databases, data usage values of the source and/or the cloned databases, etc. A clone cell 435C provides history on the cloning of the databases (e.g., number of clones created in a given time period, whether the cloning was successful or not, etc.). A version cell 435D provides information on the cluster on which the source databases resides and the version of the software implemented by the database system. An alerts cell 435E provides additional details on the various alerts being generated by the databases listed within the database list cell 4335A.

Figure 4A:
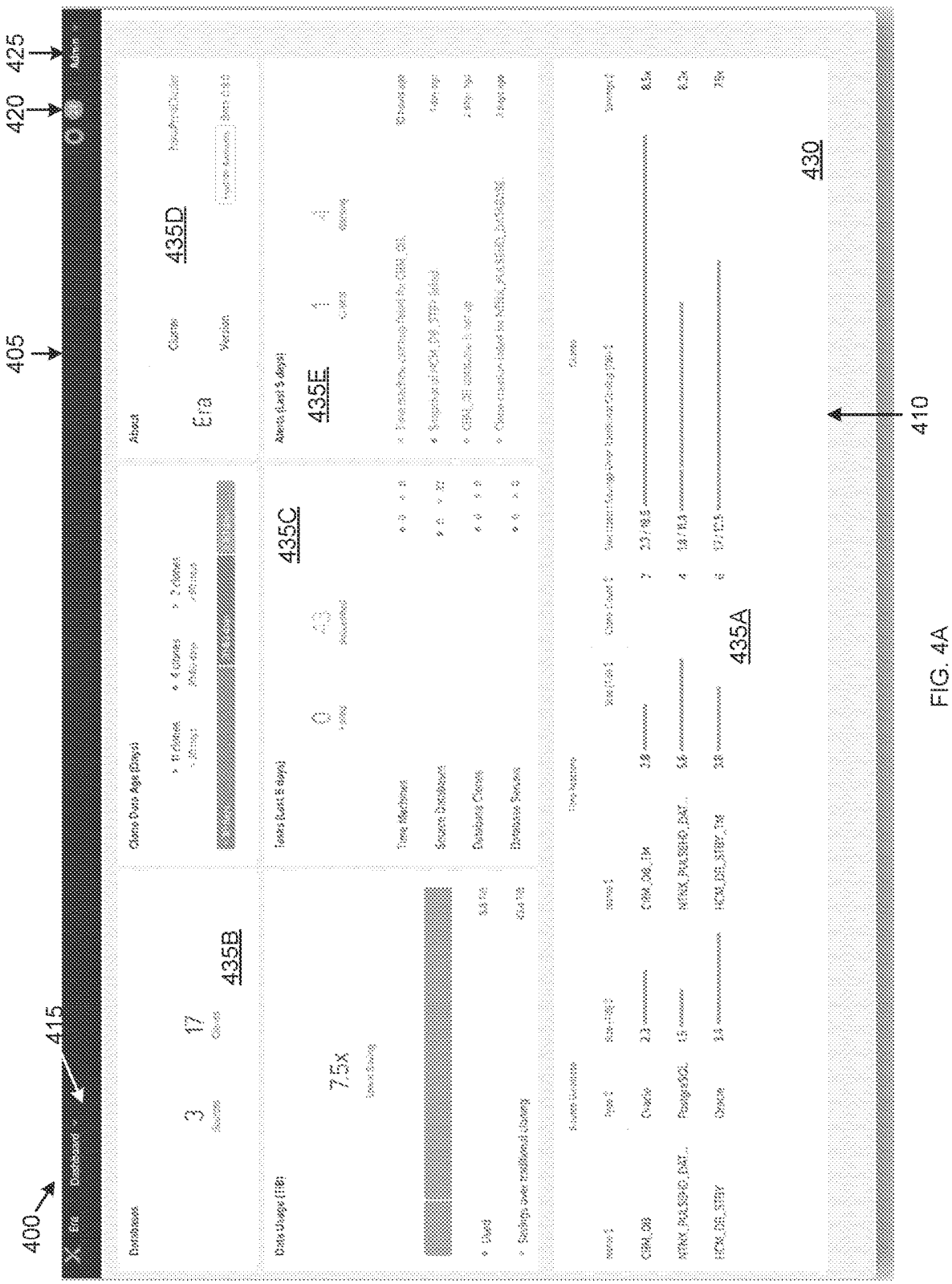
FIGS. 4A-4G are example screenshots showing the operations of FIG. 3 for creating a new database, in accordance with some embodiments of the present disclosure.

It is to be understood that the various components or cells of the homepage 430 shown in FIG. 4A are examples and features thereof may vary from one embodiment to another. For example, the number of components or cells that are shown on the homepage 430 may vary from one embodiment to another. Likewise, the details that are displayed within each component or cell may vary from one embodiment to another. The orientation, placement, size, and other design aspects of each component or cell may vary from one embodiment to another. In some embodiments, the configuration of the homepage 430 and/or the configuration of each component/cell may be defined by the user by using a settings menu option of the dashboard 400. By virtue of the dashboard 400, the user may get a quick glance summary of the various source databases that are managed by the database system 200, as well as a quick summary of the configuration and specifics of each source database. Via the dashboard 400, the user may also decide to perform various database management services on the source databases.

Figure 4B:
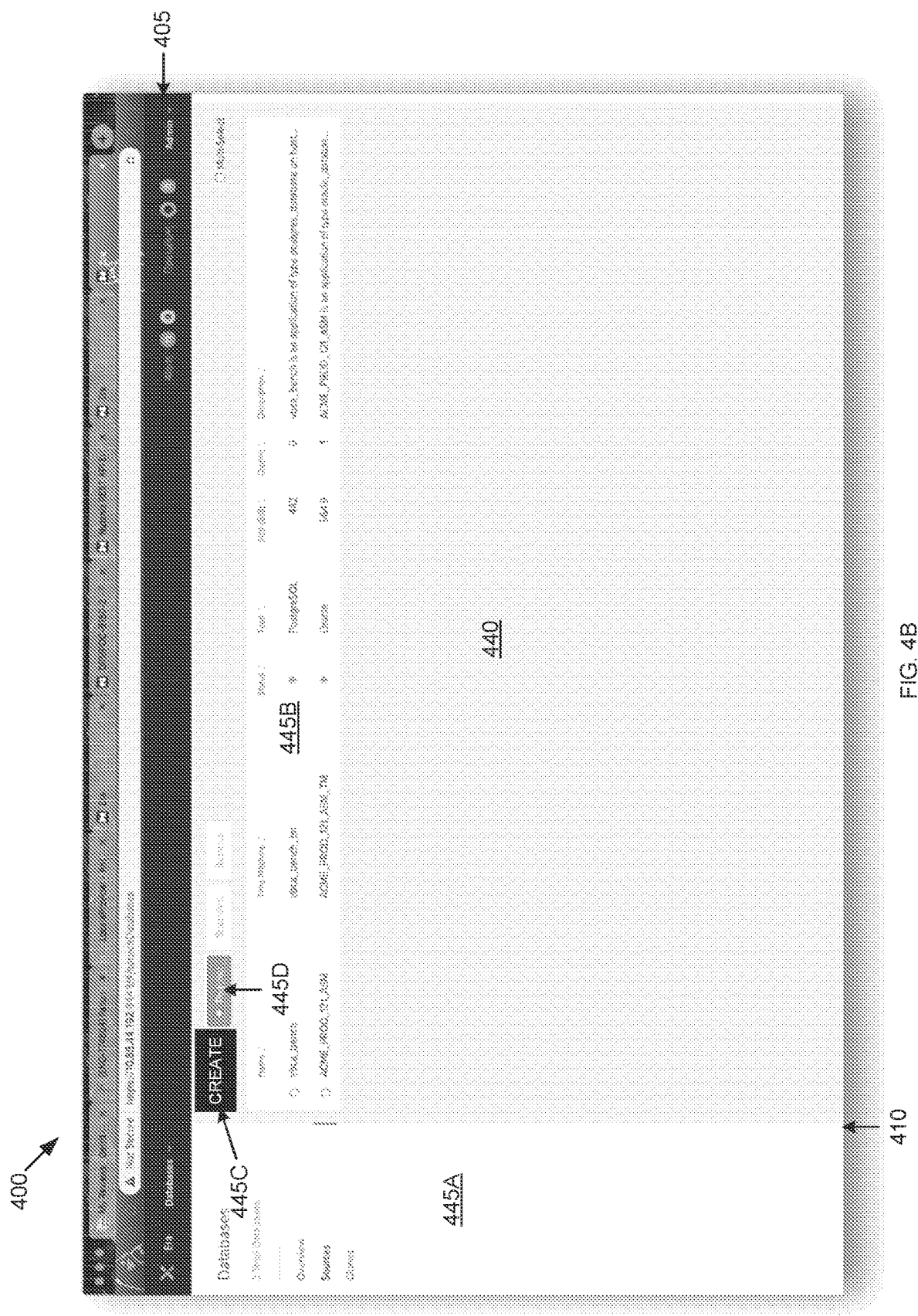

For example, to initiate a database provisioning service, the user authorized to request the database provisioning service may select a "databases" option from the main menu 415 to display a database page 440 (shown in FIG. 4B) in the body 410 of the dashboard. If the user selected in the user view menu 425 is not permitted to request the database provisioning service, the "databases" option may be inactivated or not shown in the main menu 415. The database information and/or perform additional operations. The database page 440 may also include a database detail component 445B to display additional details corresponding to the option selected from the database menu 445A. For example, as shown in FIG. 4B. upon selecting the "Sources" option from the database menu 445, a list of the source databases associated with the database system 200 may be displayed within the database detail component 445B. The user may select any one of the source databases to view additional details of that source database and/or perform permitted operations on that source database.

The database page 440 may also allow the user to create a new database or register an existing database. For example, the user may select a create button 445C on the database page 440 to send a user request to the database engine 205 to start the process 300 for creating a new database. Likewise, the user may select a register button 445D to initiate a registration process and sending a user request to the database engine 205.

Figure 4C:
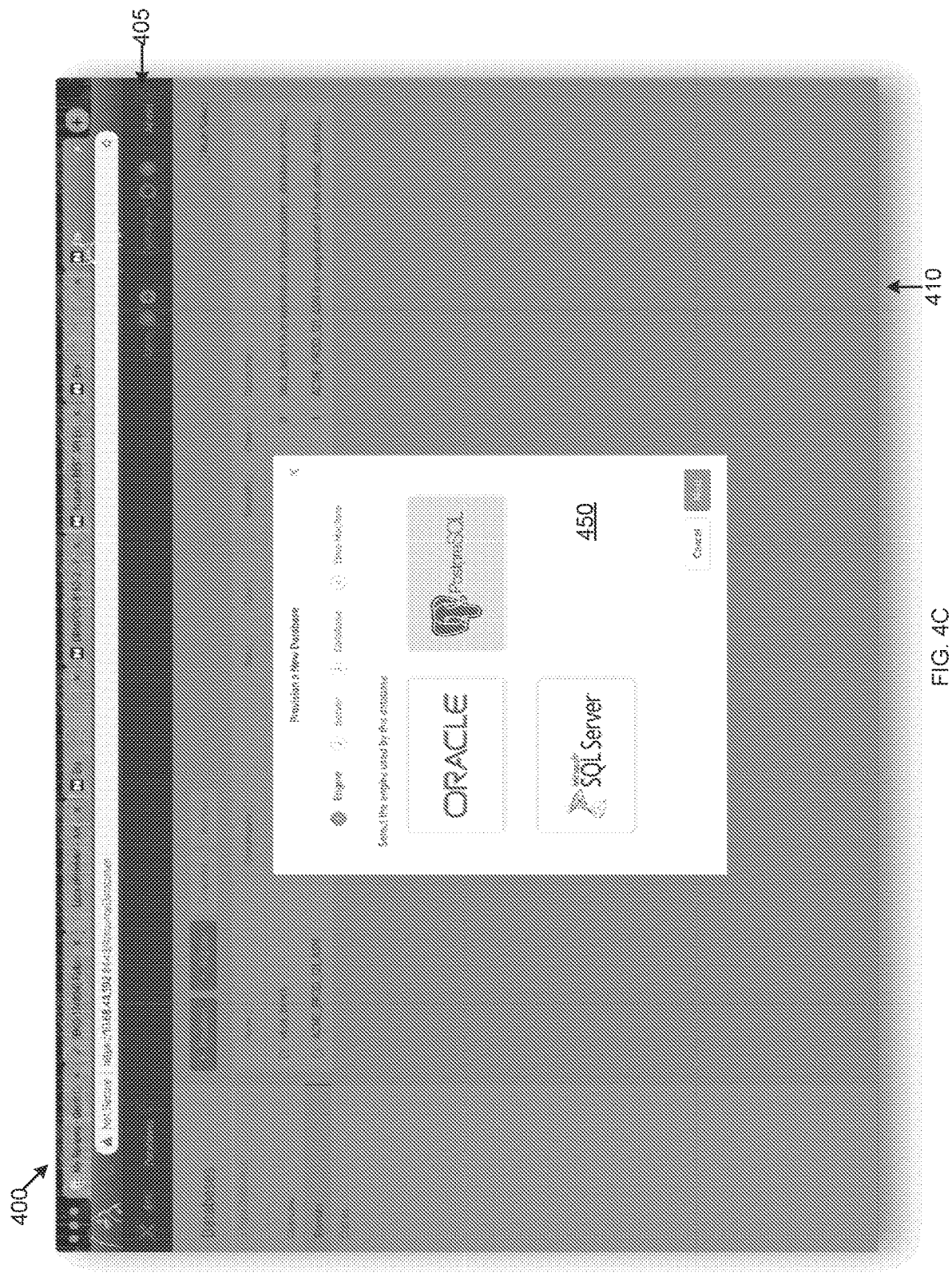
Figure 4D:
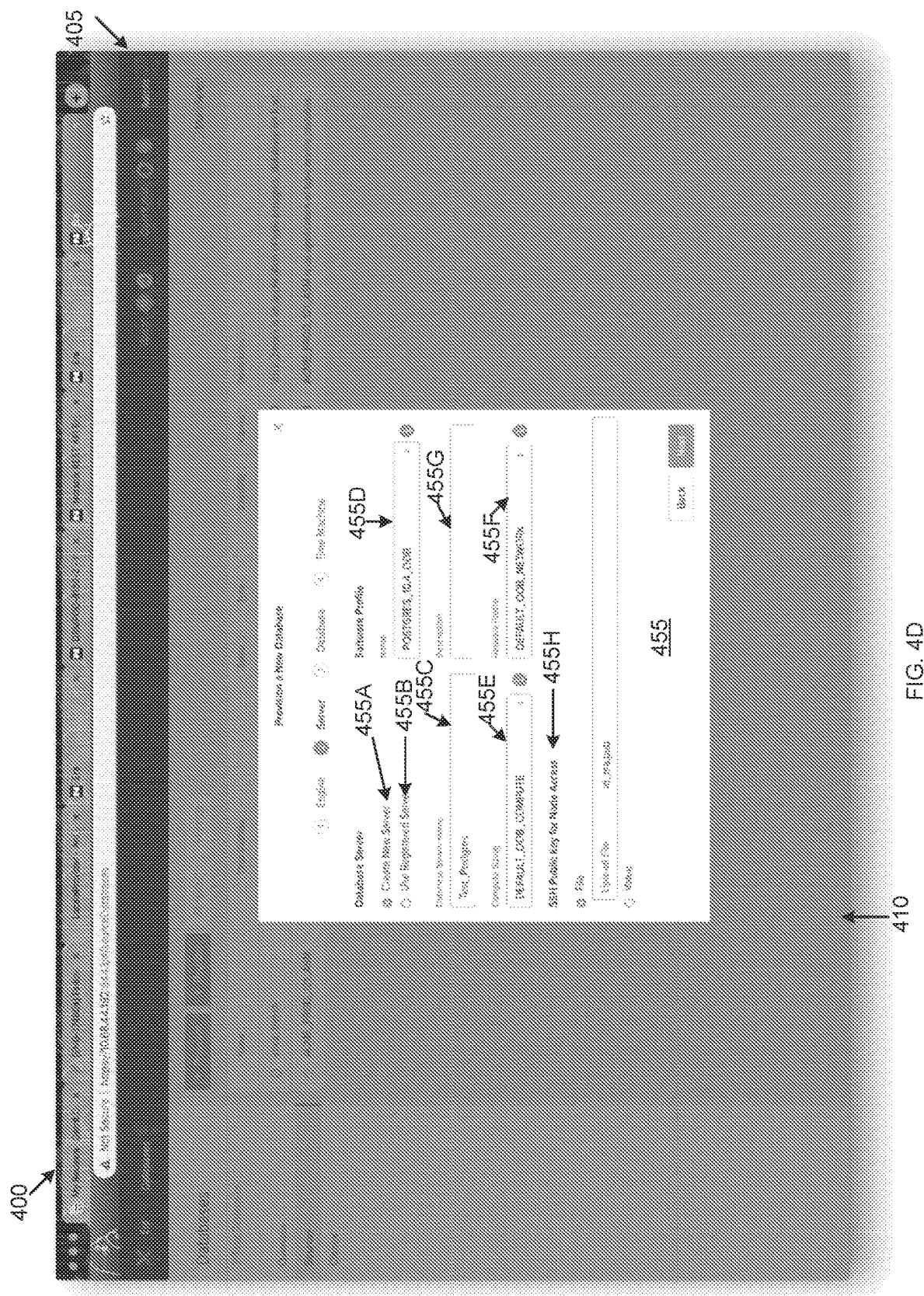
Figure 4E:
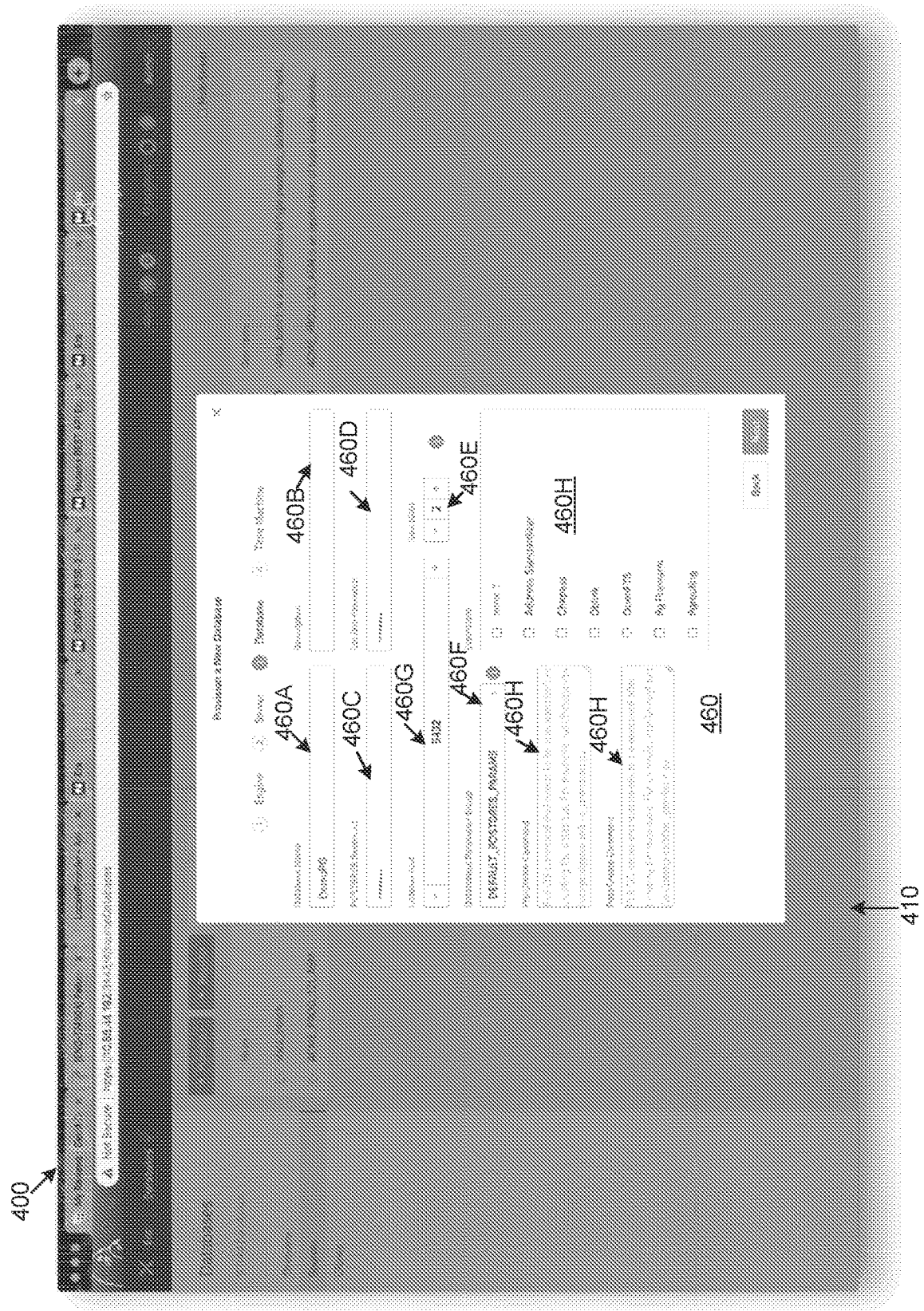
Figure 4F:
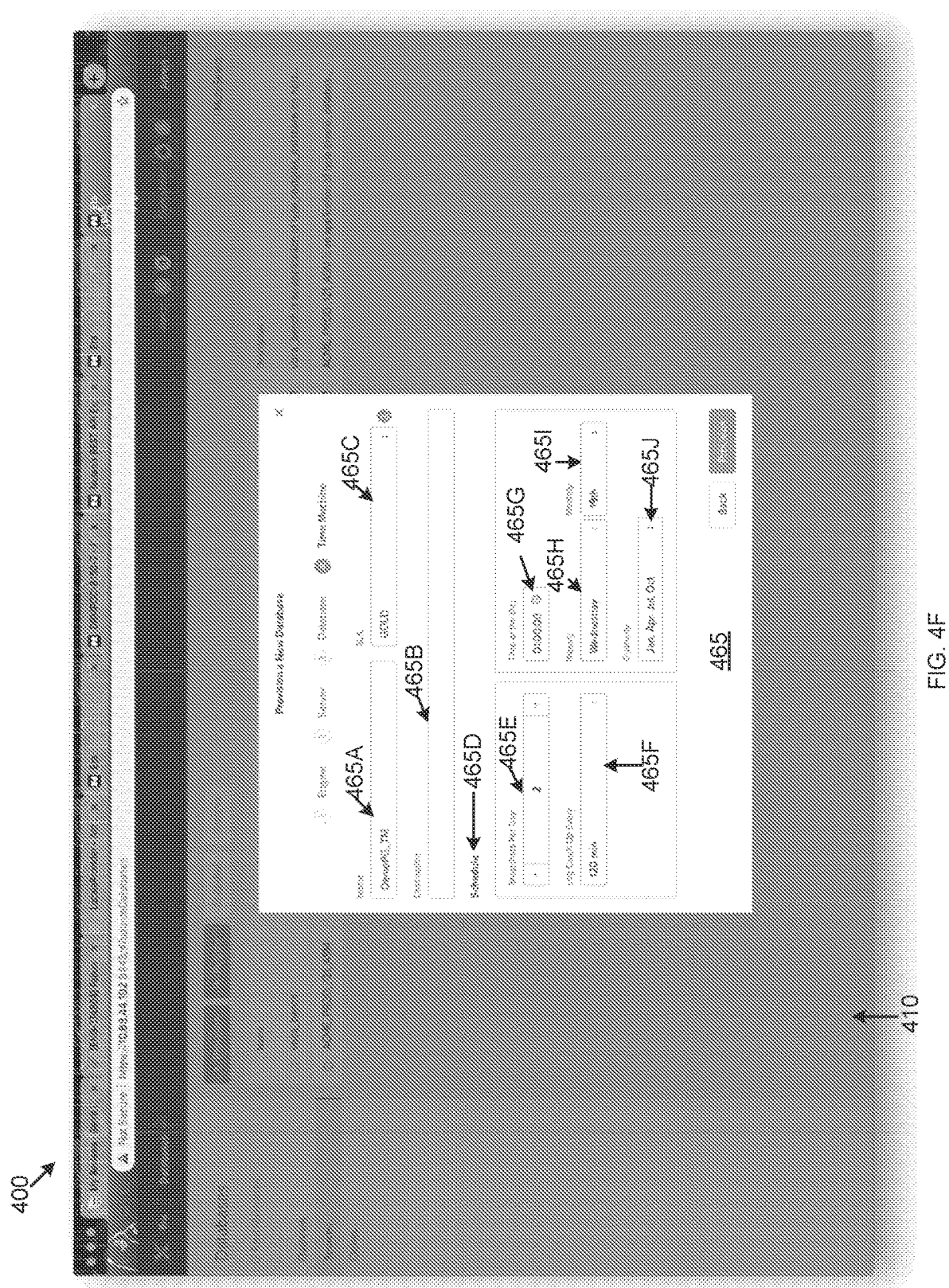
Figure 4G:
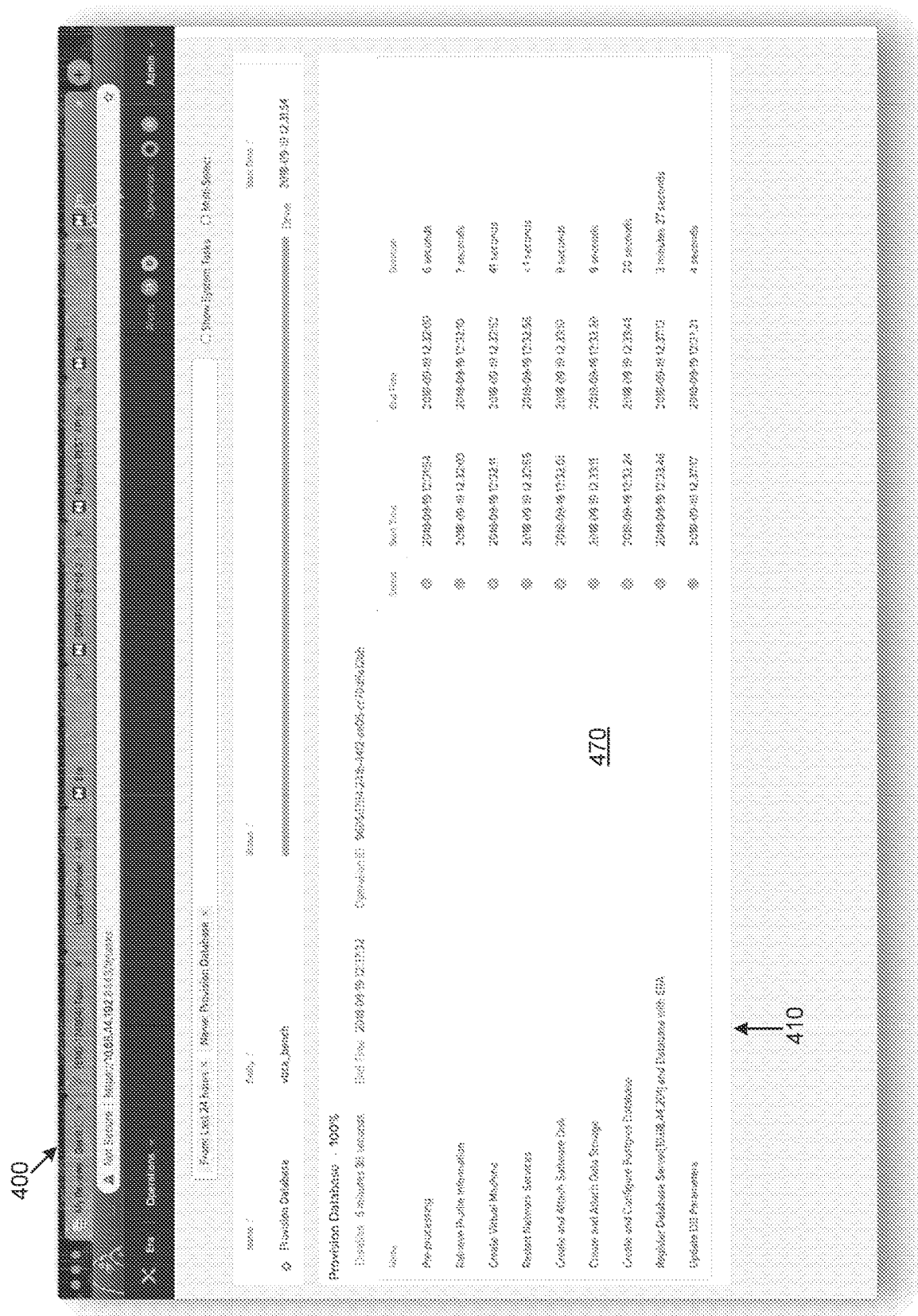
Figure 5A:
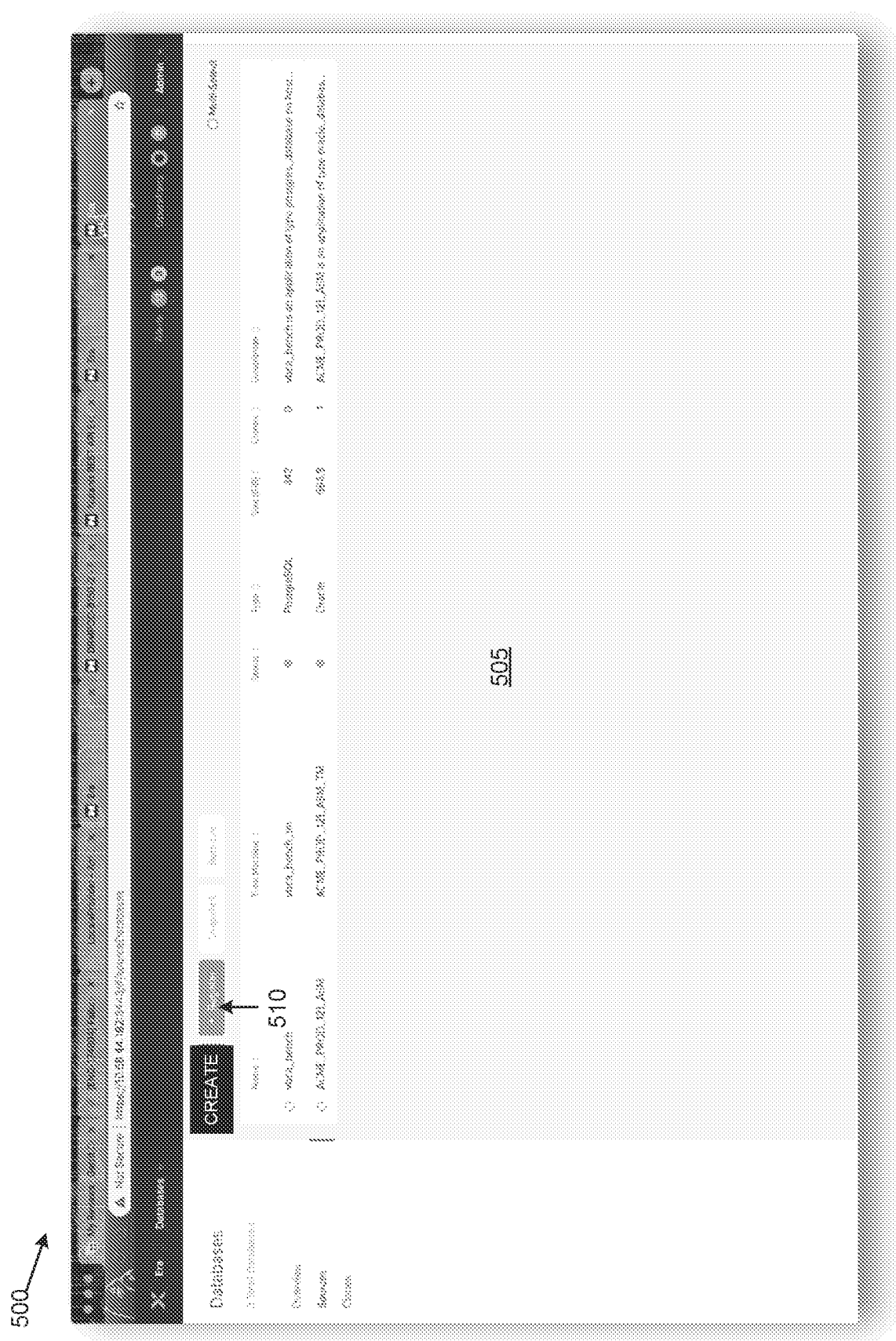
FIGS. 5A-5E are example screenshots showing the operations of FIG. 3 for registering an existing database, in accordance with some embodiments of the present disclosure.
Figure 5B:
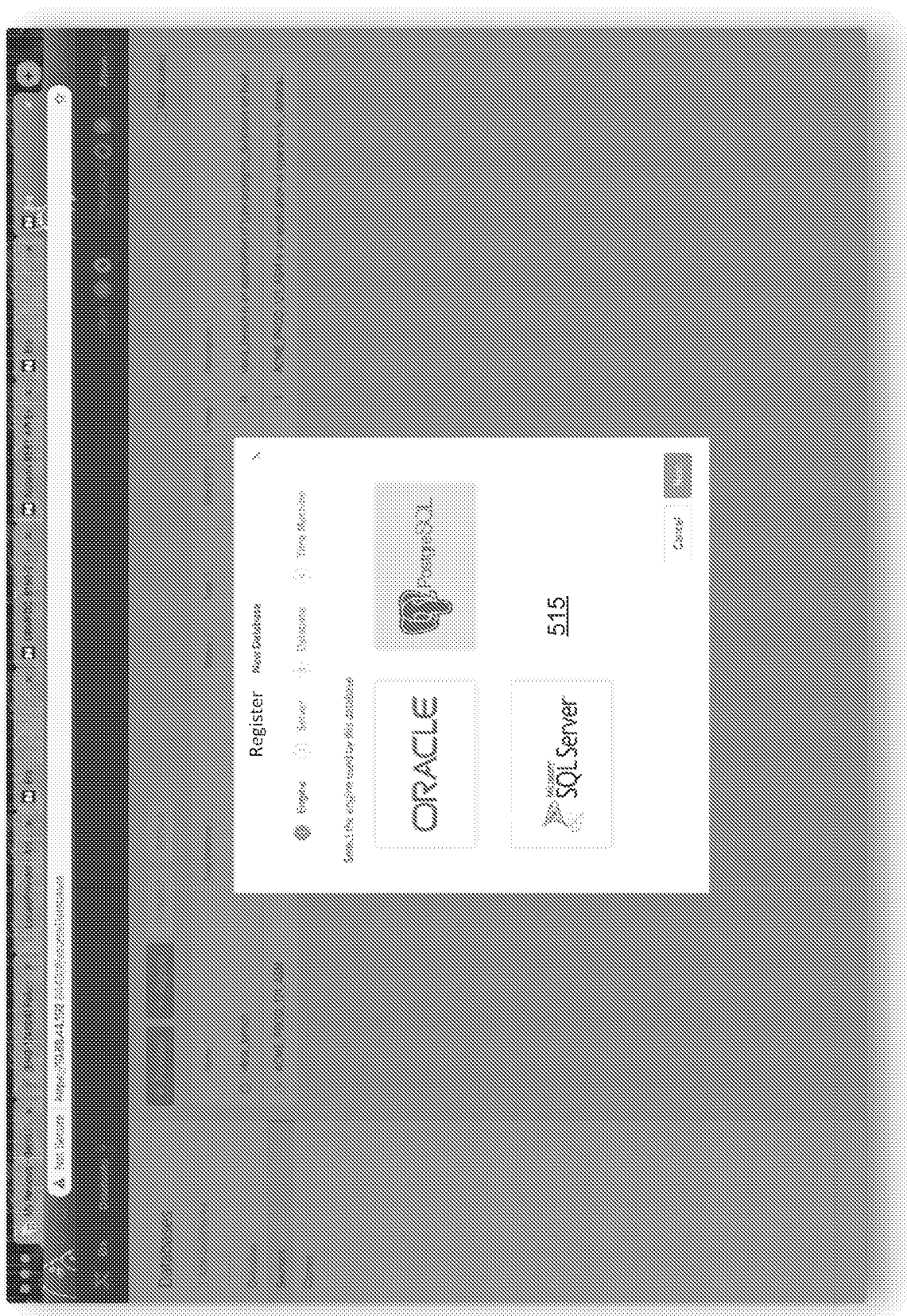
Figure 5C:
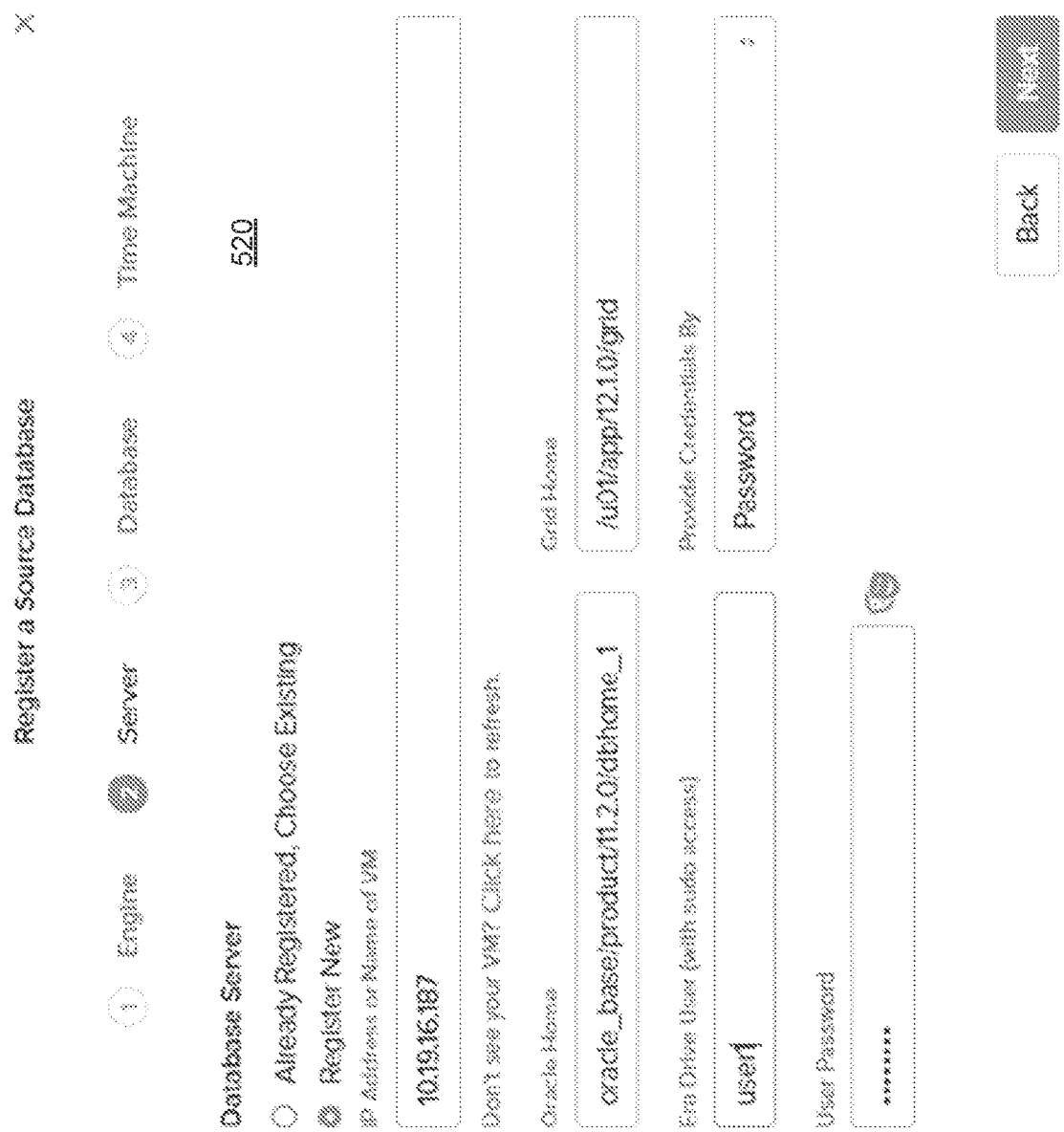
Figure 5D:
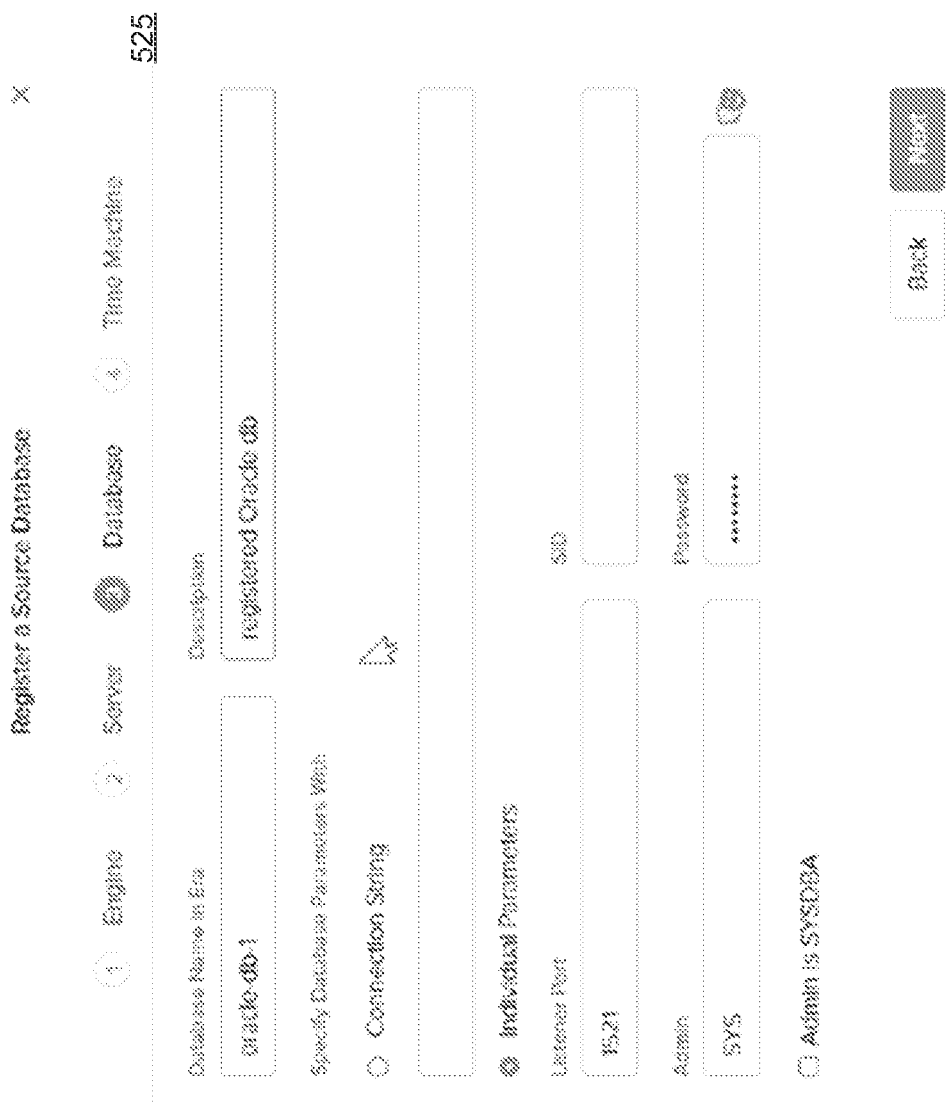
Figure 5E:
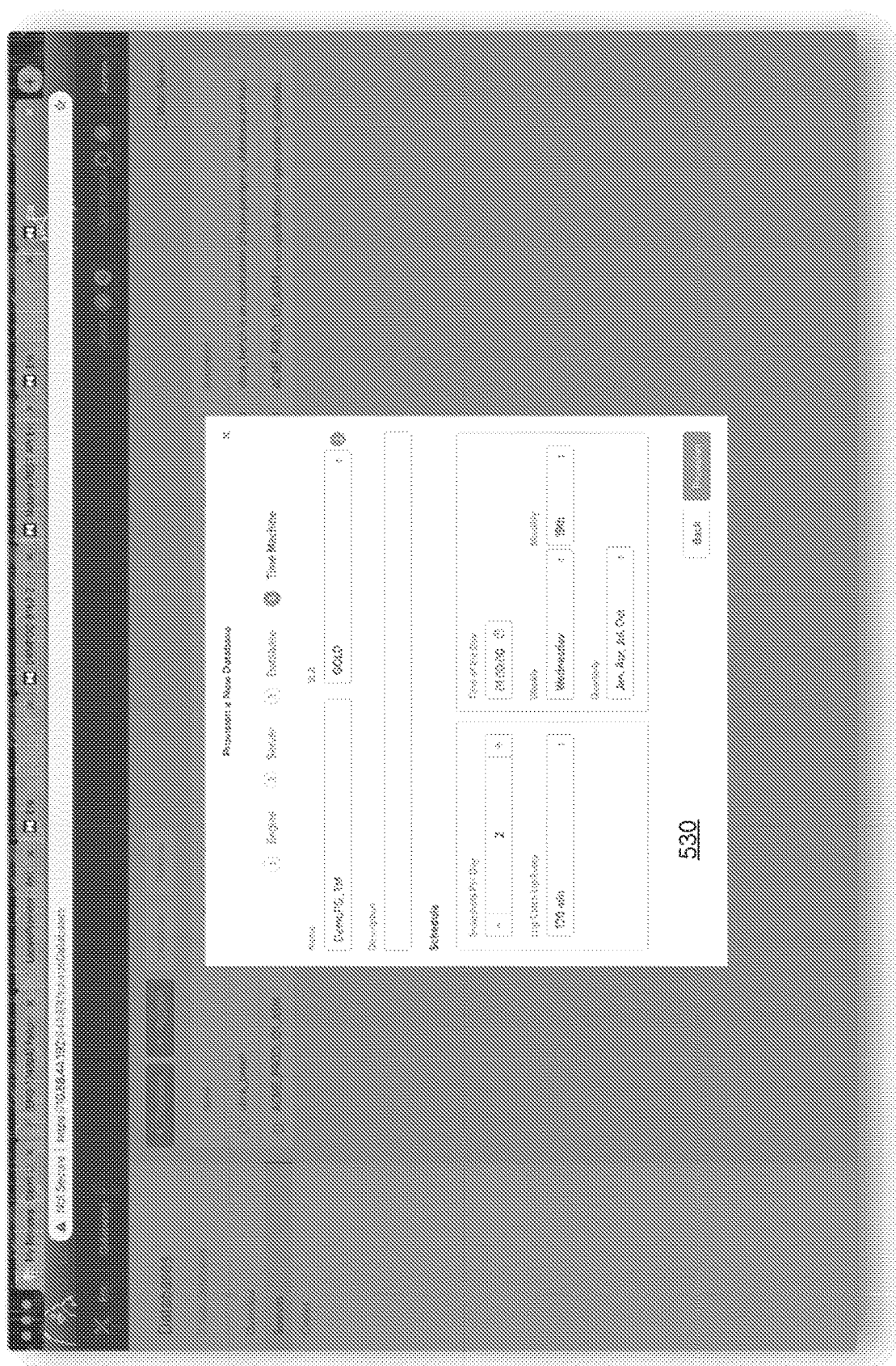

Upon selecting the create button 445C, the database engine 205, and particularly the database creation system 235 of the database engine may present a user interface 450, shown in FIG. 4C. The user interface 450 identifies the various steps of creating the new database and highlights the current step. For example, the user interface 450 has the "Engine" step highlighted. By virtue of identifying the various steps of creating the new database, the dashboard 400 keeps the user informed as to which step the database creation process is on and which steps are coming up next. The user interface 450 may also present one or more database engine types that are supported by the database system 200. The user may select one of the database engine types to highlight the selection. For example, the PostgreSQL database engine type is shown selected in the user interface 450. The user may select the "Next" button to send the selected database engine type selection to the database creation system 235, which in response, presents a user interface 455 of FIG. 4D.

The user interface 455 identifies that the database creation process is at the "Server" step for creating a new source database VM or identifying an existing source database VM. The user interface 455 may, thus, allow a user to select an option 455A to create a new source database VM or an option 455B to use an existing source database VM. In the user interface 455 of FIG. 4D, the option 455A for creating a new source database VM is shown selected. Thus, the user interface 455 requests user selection of one or more profiles for creating a new source database VM. For example, the user interface 455 may request a name 455C for the source database VM, a software profile 455D, a compute profile 455E, a network profile 455F, a description 455G for the source database VM, and security options 455H for the source database VM. The user interface 455 may also request a parameter profile for the source database VM. In other embodiments, the user interface 455 may request additional or other information for creating a new source database VM.

Although not shown, if the user selects the option 455B for using an existing source database VM, the user interface 455 may display options for allowing the user to identify an existing source database VM. Upon selecting the "Next" button, the various user selections of the user interface 455 are sent to the database creation system 235, which then presents a user interface 460 of FIG. 4E to the user on the dashboard 400.

The user interface 460 identifies that the database creation process is at the "Database" step at which various parameters for creating a database on the source database VM are received from the user. The user interface 460 also requests the user to provide a name 460A and description 460B for the database being created, a password 460C and 460D to restrict access to the database, a size 460E of the database to be created, a database parameter profile 460F to be applied to the database and the source database VM, a listener port 460G for the database engine type selected in the user interface 450, and any other details (e.g., details 460H) that may be needed or considered desirable to have in creating the database. When the user is satisfied with the selections on the user interface 460, the user may select a "Next" button to send the selections to the database creation system 235. The database creation system 235 may then present a user interface 465 of FIG. 4F.

The user interface 465 identifies that the database creation process is at the last step of creating the "Time Machine." The user interface 465 is configured to request selection of SLA and protection schedule from the user for creating an instance of the database protection system 225. The user interface 465, thus, requests a name 465A and description for the instance of the database protection system 225, an SLA level 465C, and a protection schedule 465D. Within the protection schedule 465D, the user interface 465 requests the user to provide a number of snapshots 465E desired each day, a number of transactional logs 465F desired each day, and time periods 465G for identifying which snapshot to designate as the daily snapshot, 465H for identifying which snapshot to designate as the weekly snapshot, 465I for identifying which snapshot to designate as the monthly snapshot, and 465J for identifying which snapshot to designate as the quarterly snapshot. Upon providing the various parameters in the user interface 465, the user may select a "Next" button to send the selections to the database creation system 235 and start the database creation. The database creation system 235 may display a status of the database creation in a user interface 470 of FIG. 4G.

Upon creating the database, the newly created database may be displayed within the database list cell 435A, within the database page 440, and anywhere else where source databases are listed. The database creation system 235 may also update the various calculations and numbers in the dashboard 400 that provide some statistic of the source databases (e.g., the summary cell 435B). It is to be understood that the configurations of the various user interfaces of FIGS. 4A-4G may vary from one embodiment to another. For example, the various selections may be displayed as drop-lists, as radio buttons, or in other ways. Similarly, some fields may be pre-filled with default values and allowed to be changed by the user if desired. The placement of the various fields, the size, orientation, and other design aspects of those fields may be varied as well. Additionally, some fields may be considered mandatory, while other fields may be designated as mandatory to be filled in by the user. The dashboard 400 thus provides an easy mechanism for creating a new database in a simple, user friendly, and intuitive user interface.

Turning now to FIGS. 5A-5E, example user interfaces for registering an existing database are shown, in accordance with some embodiments of the present disclosure. Similar to the database creation process, the database registration process is initiated from a dashboard 500. The dashboard 500 is similar to the dashboards 210 and 400. The dashboard 500 includes a database page 505, which is similar to the database page 440. To register an existing database, the user may select a register button 510 and select "Next." Upon selecting "Next," the database registration system 240 may be activated, which starts the database registration process by displaying a user interface 515 of FIG. 5B. From the user interface 515, the user may select the desired database engine type and select "Next." Upon selecting "Next," the user's selection of the database engine type is sent to the database registration system 240, which then displays a user interface 520 of FIG. 5C.

By way of the user interface 520, the database registration system 240 requests the user for creating a new source database VM or selecting an existing source database VM. Likewise, by way of user interface 525 of FIG. 5D, the database registration system 240 requests the user for providing various parameters of the existing database, and by way of user interface 530, the database registration system 240 requests the user to define the SLA and protection schedule. Upon receiving all of the parameters from the user, the database registration system 240 registers the database. Similar to the user interface 470, the database registration system may display the registration status in a user interface. Upon registration, the database becomes a source database that resides on a source database VM and on which other database management services may be applied.

Figure 6:
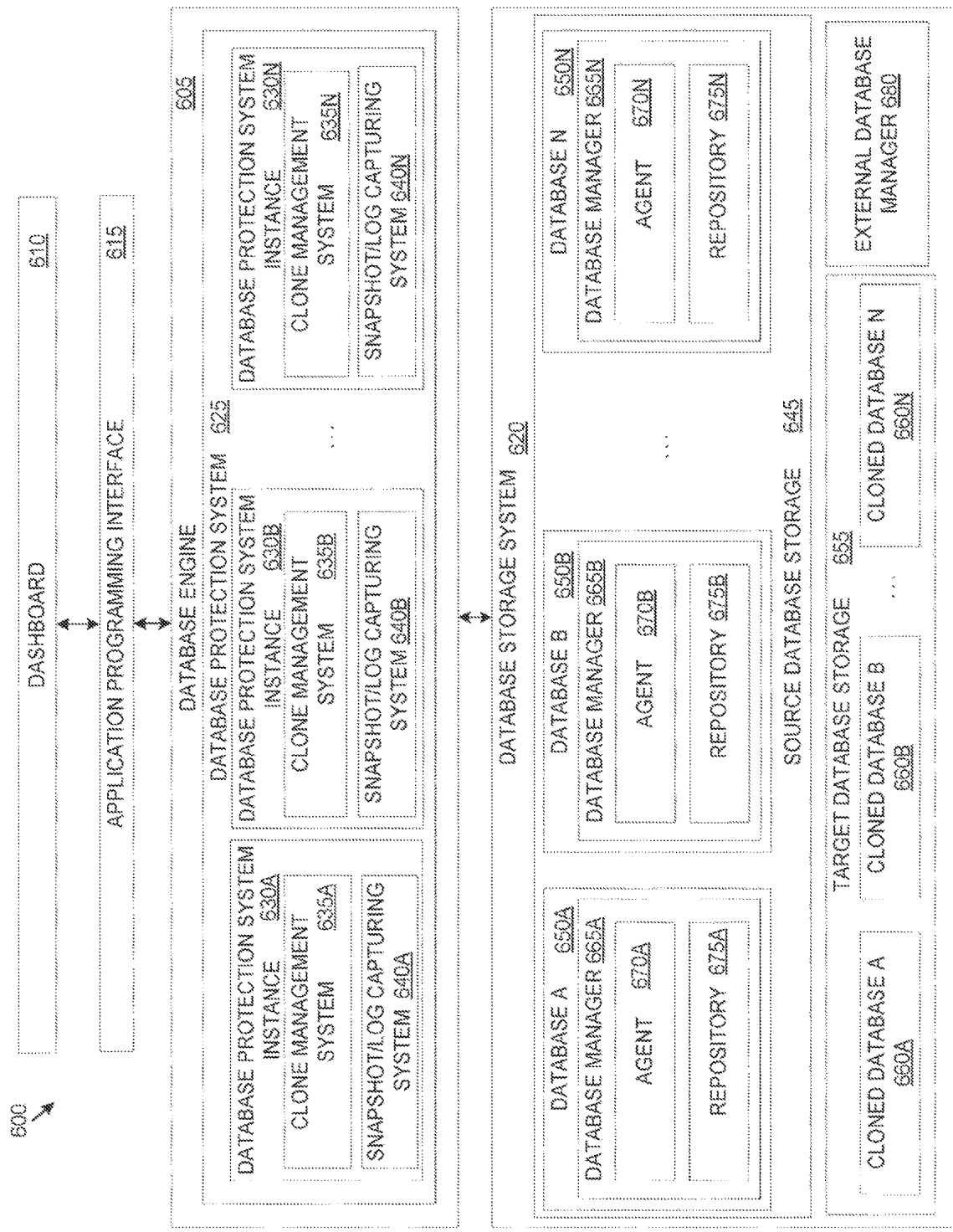
FIG. 6 is an example block diagram showing a database protection system of the database system of FIG. 2, in accordance with some embodiments of the present disclosure.

Referring now to FIG. 6, an example block diagram of a database system 600 is shown, in accordance with some embodiments of the present disclosure. The database system 600 is similar to the database system 200. Therefore, the components of the database system 600 that are already discussed with respect to the database system 200 are not discussed again. The database system 600 includes a database engine 605 that is associated with a dashboard 610 via an API 615. The database engine 605 is also associated with a database storage system 620 for storing one or more databases managed by the database system 600. The database engine 605 is similar to the database engine 205, the dashboard 610 is similar to the dashboard 210, the API 615 is similar to the API 230, and the database storage system 620 is similar to the database storage system 215. The database engine 605 includes a database protection system 625 that is configured to protect databases that are associated with the database system 600. The database protection system 625 is similar to the database protection system 225. Although not shown, the database engine 605 also includes a database provisioning system similar to the database provisioning system 220.

As discussed above, an instance of the database protection system 625 may be created for each source database when that source database is created or registered within the database system 600. Thus, the database protection system 625 may include multiple instances of the database protection system—one for each source database. For example, the database protection system 625 may include database protection system instance 630A-630N (collectively referred to herein as database protection system instances 630). In other embodiments, each instance of the database protection system (e.g., the database protection system instances 630A-630N) may be configured to protect more than one source database. Each of the database protection system instances 630A-6930N may respectively include a clone management system 635A-635N (collectively referred to herein as clone management systems 635) and a snapshot/log capturing system 640A-640N (collectively referred to herein as snapshot/log capturing systems 640).

Each of the database protection system instances 630 may be associated with a source database stored within a source database storage 645. The source database storage 645 is similar to the source database storage 255. Thus for example, the database protection system instance 630A may be associated with a source database 650A stored within the source database storage 645, the database protection system instance 630B may be associated with a source database 650B of the source database storage, the database protection system instance 630N may be associated with a source database 650N, and so on. Thus, the clone management system 635A and the snapshot/log capturing system 640A of the database protection system instance 630A may be configured to protect the source database 650A, the clone management system 635B and the snapshot/log capturing system 640B may be configured to protect the source database 650B, the clone management system 635N and the snapshot/log capturing system 640N may be configured to protect the source database 650N, and so on. By virtue of having the database protection system instances 630 for each of the source databases 650A-650N (collectively referred to herein as the source databases 650), the protection of each of those databases may be customized and tailored to suit the user's needs.

To protect the source databases 650, the database protection system instances 630 may create a clone of those source databases. The clones of the source databases 650 (e.g., cloned databases) may be stored within a target database storage 655. The target database storage 655 is similar to the target database storage 260. For each source database (e.g., the source databases 650) that is stored within the source database storage 645, one or more clones of that source database may be created and stored within the target database storage 655. For example, when a clone of the source database 650A is created, a cloned database 660A is created and stored within the target database storage 655. Similarly, clones of the source databases 650B and 650N may be created as cloned databases 660B and 660N, respectively, and stored within the target database storage 655. The cloned databases 660A-660N are collectively referred to herein as the cloned databases 660. Although each of the source databases 650 in the source database storage 645 has been shown as having a corresponding instance of the cloned databases 660 in the target database storage 655, it is to be understood that in some embodiments, clones of only some of the source databases stored in the source database storage may be made. The source databases 650 that have not been cloned may not have a cloned database within the target database storage 655.

Further, similar to the source databases 650, which reside on a database VM (e.g., the source database VMs), the cloned databases 660 also reside on a database VM. The database VMs on which the cloned databases 660 reside are referred to herein as target database VM. Each of the cloned databases 660 may reside entirely on one target database VM or may span across multiple target database VMs. In some embodiments, the source database VMs and the target database VMs may be created on the same node or different nodes of the same cluster or across multiple clusters.

Thus, the database protection system instances 630, and particularly the clone management systems 635 of the database protection system instances creates the cloned databases 660 from the source databases 650 stored within the source database storage 645, and stores the cloned databases within the target database storage 655. The cloned databases 660 may be of a variety of types. As discussed above, each of the source databases 650 are created or registered on a source database VM. Thus, each of the cloned databases 660 may include a clone of the source database VM only (e.g., to create the target database VM) or may include the clone of the source database VM plus the database that resides on that source database VM. For example, the cloned database 660A of the source database 650A may include a clone of the source database VM on which the source database 650A resides or a clone of that source database VM plus the database 650A. When both the source database VM and the source database 650A are cloned, the cloned database 660A may include a target database VM created on the target database storage 655 with a similar or different configuration as the source database VM and the clone of the source database stored on the target database VM. When only the source database VM is cloned, a target database VM is created for that source database VM and stored on the target database storage 655. The target database VM may be used at a later point to store the clone of the source database that resides on the associated source database VM. Thus, the cloned databases 660 may include the source database VM only, the source database VM plus the source database, or the source database only (which is to be stored on a previously created target database VM).

The cloned databases 660 may be considered operationally same (or substantially similar) to the source databases 650. Each of the cloned databases 660 may be refreshed/updated to incorporate any changes that may have occurred in the source databases 650 since the cloned databases were created. In some embodiments, the operations that are performed on the source databases 650 may be performed on the cloned databases 660 as well. Thus, in some embodiments, instead of using the source databases 650, the cloned databases 660 may be used for performing operations (e.g., analyzing data). The cloned databases 660 may be created from snapshots and transactional logs captured from the source databases 650. The cloned databases 660 are generally created upon receiving a user request. The user may request to clone a particular one of the source databases 650 to a point in time or to a specific snapshot. For example, the user may request a cloned database of a particular one of the source databases 650 as that source database existed at 11:00 AM on a particular date. Alternatively, the user may specifically identify a snapshot and request a cloned database of the source databases 650 based on that snapshot. Creating a cloned database (e.g., the cloned databases 600) involves replicating a state of the source databases 650. The "state" of the source databases 650 may include the configuration of the source database, the user data stored within the source database, metadata stored within the source database, and any other information associated with the source database. In other words, a cloned database may be an exact or substantially exact copy of the source database.

Thus, upon receiving a user request to create a cloned database (e.g., the cloned database 660A) from a source database (e.g., the source database 650A), the clone management system (e.g., the clone management system 635A) associated with the source database may retrieve snapshots and transactional logs of the source database from a repository where the snapshots and transactional logs are stored. If the user request is to clone the source database to a point in time, the clone management system (e.g., the clone management system 635A) may retrieve all snapshots and transactional logs captured of the source database at that point in time and create a cloned database (e.g., the cloned database 660A) from those snapshots and transactional logs. The cloned database (e.g., the cloned database 660A) represents the state of the source database at the requested point in time. If the user request is to clone the source database based on a particular available snapshot, the clone management system (e.g., the clone management system 635A) may retrieve that particular snapshot and create a cloned database (e.g., the cloned database 660A) from that particular snapshot. The cloned database (e.g., the cloned database 660A) represents the state of the source database (e.g., the source database 650A) at the time the requested snapshot was captured. Thus, the clone management systems 635 are configured to create the cloned databases 660. The clone management systems 635 are also configured to refresh the cloned databases 660, as well as manage/perform any operations performed on the cloned databases.

Referring now to FIGS. 7A-7F in conjunction with FIGS. 6 and 4A, example user screenshots illustrating the cloning of a source database are shown, in accordance with some embodiments of the present disclosure. To clone a source database, the user may start from dashboard 700 of FIG. 7A. The dashboard 700 is similar to the dashboard 400. To create a clone of a source database, the user may select the option "time machines" from main menu 705. Upon selecting the option "time machines" from the main menu 705, the user may select a particular source database to be cloned. Alternatively, in some embodiments, the user may first select the source database to be cloned and then select the option "time machines" from the main menu 705. Upon selecting the source database to be cloned, the database protection system instance associated with the source database is activated. Further, the database protection system instance displays, in a body 710 of the dashboard 700, a summary section 715. The summary section 715 may display one or more configurational features of the source database such as the database engine type (e.g., type in FIG. 7A), how long ago was the source database created (e.g., age), the last time the source database was updated (e.g., last update), the next period for capturing a transactional log (e.g., next log catch up), name of the source database (e.g., name), the number of clones previously made of the source database (e.g., clones), the SLA level of the source database (e.g., SLA), and the protection schedule (e.g., schedule). In other embodiments, other or additional details may be provided in the summary section 715.

Figure 7A:
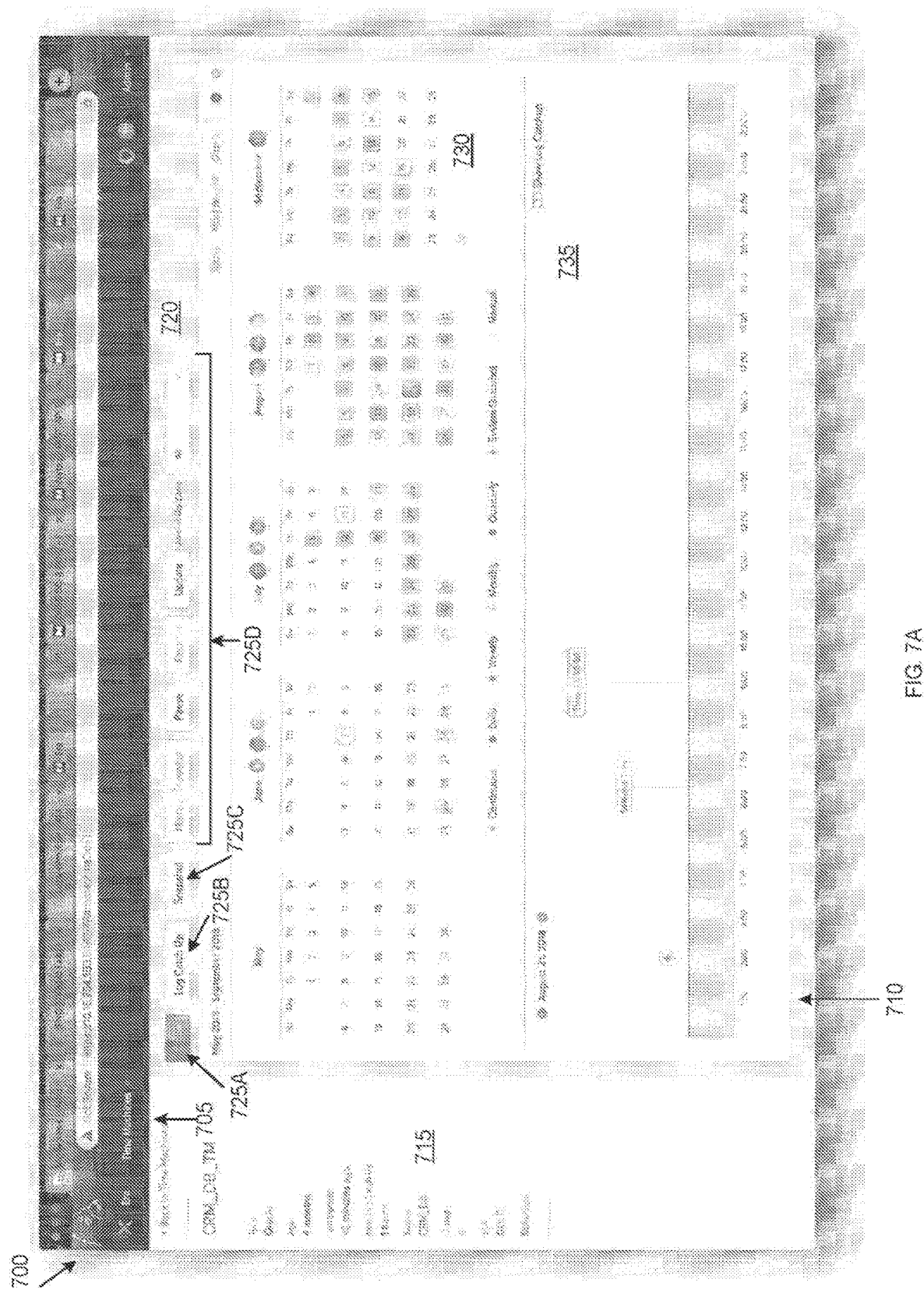
FIGS. 7A-7F are example screenshots showing creating cloned databases from source databases, in accordance with some embodiments of the present disclosure.

The database protection system instance may also display within the body 410 a menu section 720 that provides options of operations that the user may perform on the source database. For example, the user may select a clone option 725A to create a new clone of the source database. The user may elect to manually capture transactional logs or snapshots by interacting with log catch up option 725B and snapshot option 725C, respectively. Similarly, the user may perform other operations by selecting another one of options 725D. Depending upon the options that the user is authorized to make, some of the options 725A-725D may be inactivated. Further, although specific options are shown in FIG. 7A, the number and types of options may vary from one embodiment to another. The database protection system instance may also display a calendar 730 visually representing the SLA associated with the source database. For example, the calendar 730 may include a color coded legend to represent the duration for the continuous, daily, weekly, monthly, and quarterly protection parameters for a selected number of months. For example, the calendar 730 of FIG. 7A shows five months (May-September) with dates highlighted based upon the protection parameter that applies to that date.

For example, by looking at the calendar 730, the user may quickly determine that August 20-September 19 fall under the continuous protection parameter, July 21-August 19 fall under the daily protection parameter, and July 5, 12, and 19 are days when the weekly protection parameter applies. The calendar 730 may also show the dates when manual snapshots and/or transactional logs were captured of the source database (e.g., on June 7, July 13, August 19). Further, upon selecting a particular date, the user may view additional details of available snapshots and transactional logs for that date from which a clone may be created. For example, in FIG. 7A, August 21 is shown as selected. Thus, in a display portion 735, a time scale shows the available snapshots/transactional logs. Since August 21 falls under the continuous protection parameter, the user may select any time on the time scale to create a clone of the source database. If for example July 25 is selected by the user, the display portion 735 may highlight the time on the time scale at which the daily snapshot was captured (as identified from the protection schedule) and which the user may be able to select to create a clone from. Thus, the body 710 of the dashboard 700 provides a user friendly, visual, and intuitive interface for easily and quickly determining how the source database is protected and the level of protection that is available to that source database on any given day.

To clone the source database, the user may select the clone option 725A. Upon selecting the clone option 725A, the database protection system instance and particularly the clone management system of the source database initiates the cloning process. The cloning process may include three distinct operations: a time operation to identify whether the user desires to create the clone based on an available snapshot or to a point in time, a server operation to either create a new target database VM to house the clone of the source database or select a previously created target database VM, and a database operation to create the clone of the source database on the target database VM. Selecting the clone option 725A triggers the time operation by displaying a user interface 740 shown in FIG. 7B.

The user interface 740 solicits a clone name 740A, a date from a calendar 740B from which the clone is desired, and one of a point in time option 740C or snapshot option 740D. If the user desires to clone the source database to a point in time, the user may select the point in time option 740C and if the user desires to create the clone from an available snapshot, the user may select the snapshot option 740D. Upon providing the information requested in the user interface 740, the user may interact with (e.g., click on) a next button 740E, which opens user interface 745 of FIG. 7C. The dialog box 745 is shown for a point in time selection. Thus, the user interface 745 may solicit the exact time from which the clone is to be created. The user interface 745 may display the times that are available for the user to select for the point in time option. Specifically, the user interface 745 may display a time scale 745A, which may include an activated slot from which the user may pick a time and an inactivated slot that is unavailable to the user. For example, the time scale 745A shows an activated slot 745B and an inactivated slot 745C. The user may pick (e.g., by interacting with the time scale 745A or by entering the time in box 745D) a time from the activated slot 745B for creating the clone. For example, if the user selects 5:00 from the activated slot 745B, the corresponding clone management system is configured to create a clone based on the state of the source database at 5:00.

It is to be understood that the activated slot 745B corresponds to the protection parameter of the SLA and the protection schedule. For example, if the date that the user selected on the calendar 740B falls under the daily protection parameter and the protection schedule indicates that the daily snapshot is captured at 11:00 AM, in some embodiments, the user may be able to only select 11:00 AM for the clone. In other embodiments, the user may still be allowed to select times other than 11:00 AM as well. However, since only a daily snapshot is available for that date, the clone may be based on the daily snapshot of 11:00 AM.

Figure 7B:
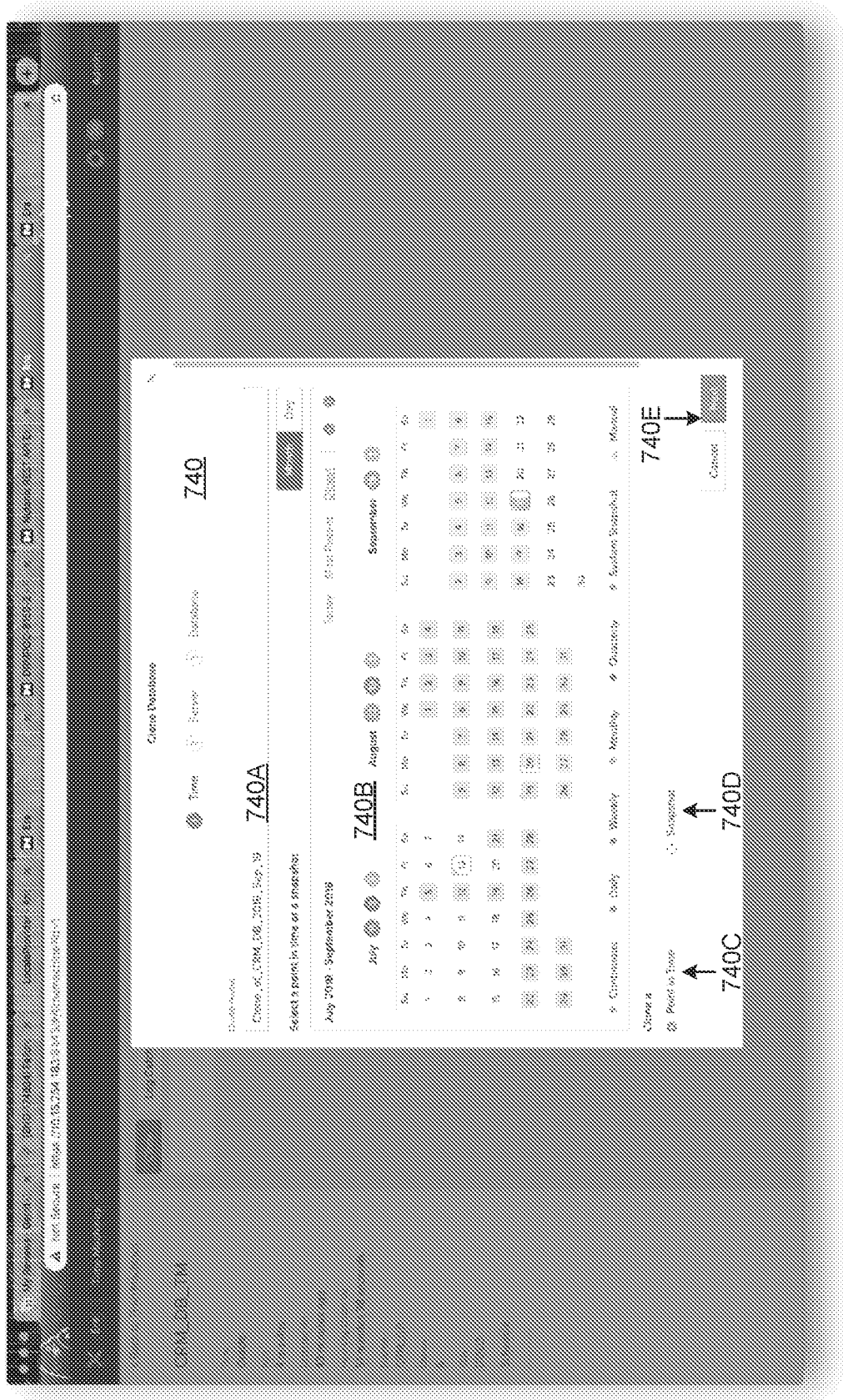
Figure 7C:
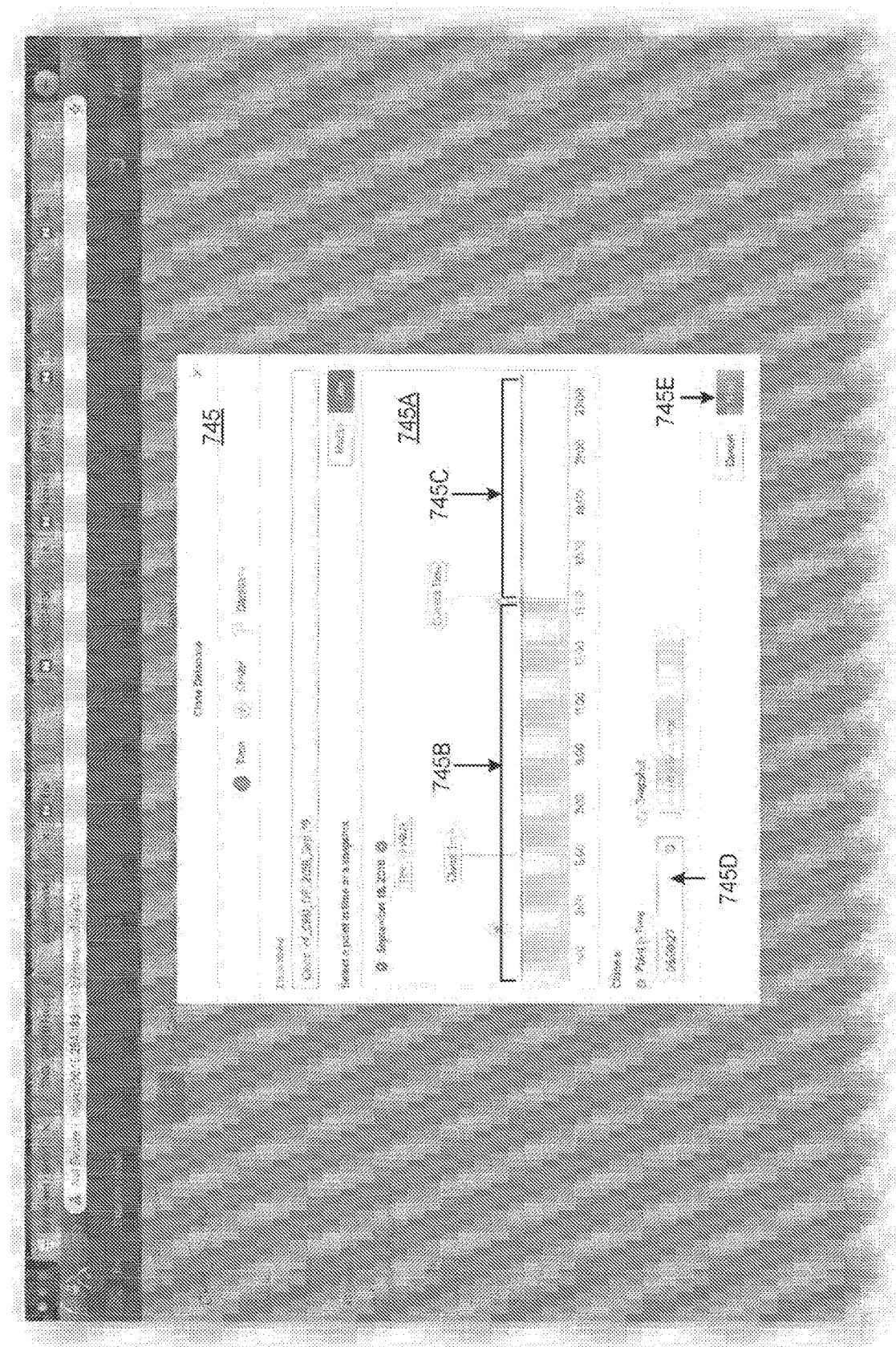
Figure 7D:
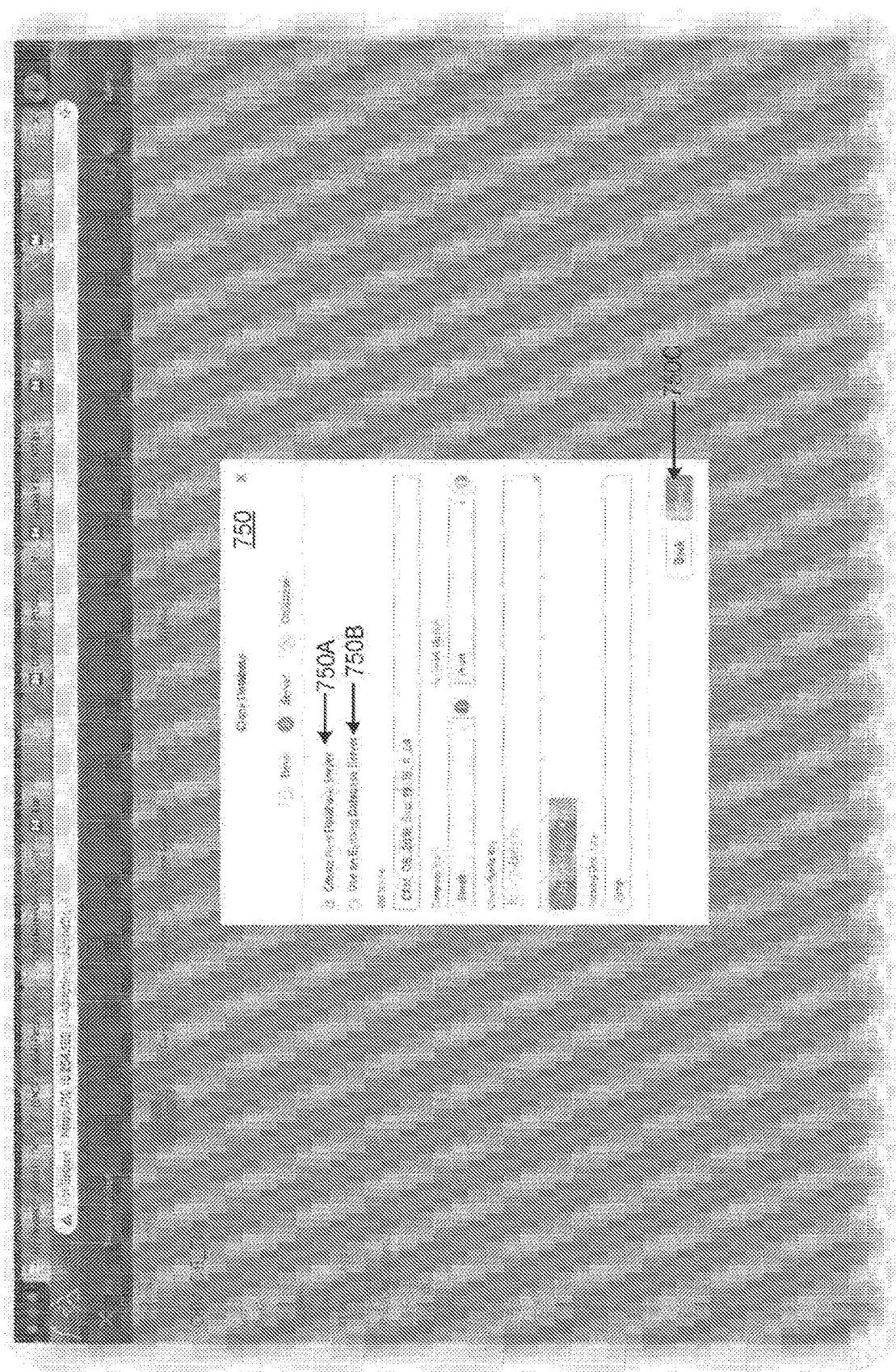
Figure 7E:
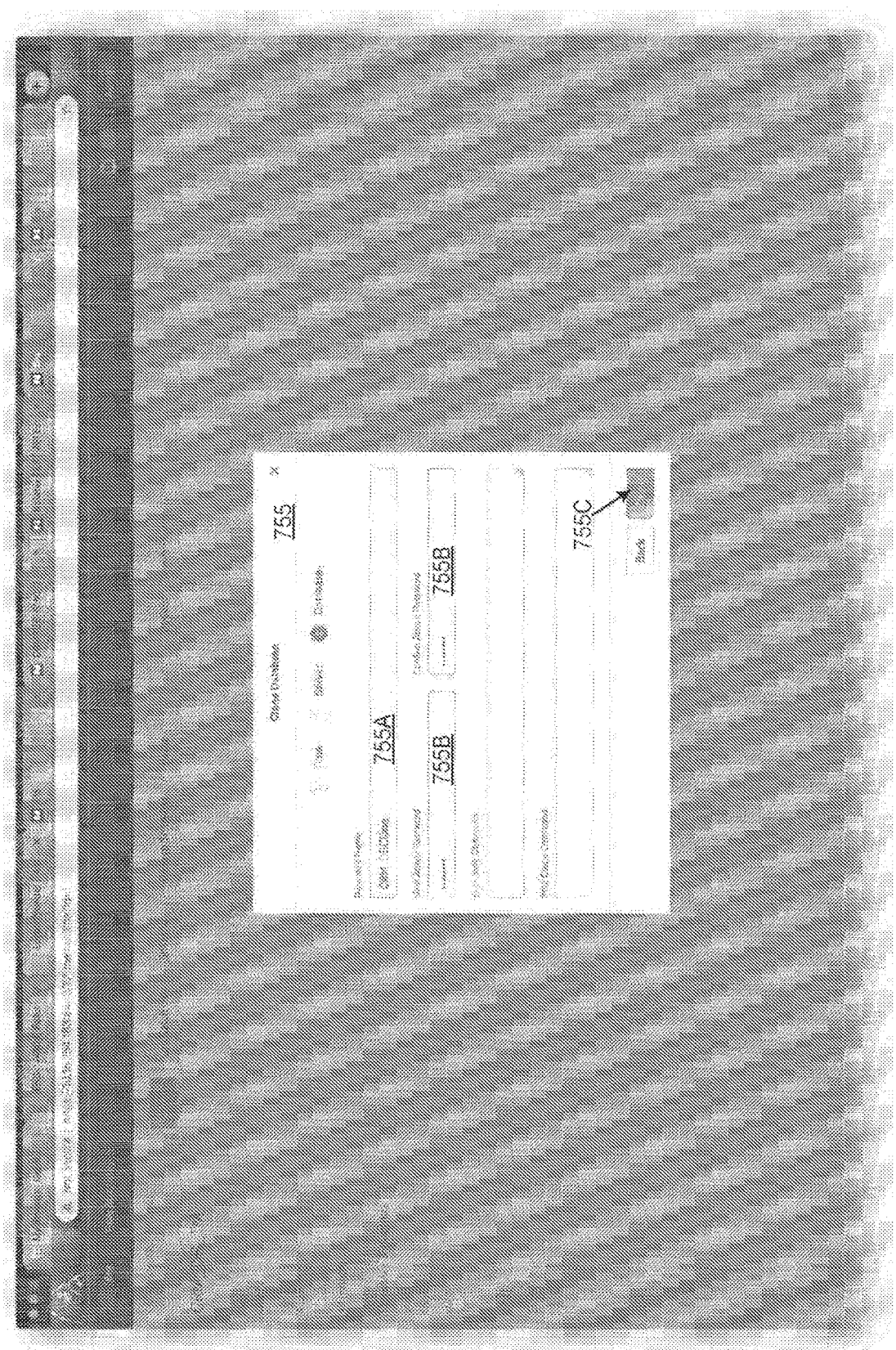
Figure 7F:
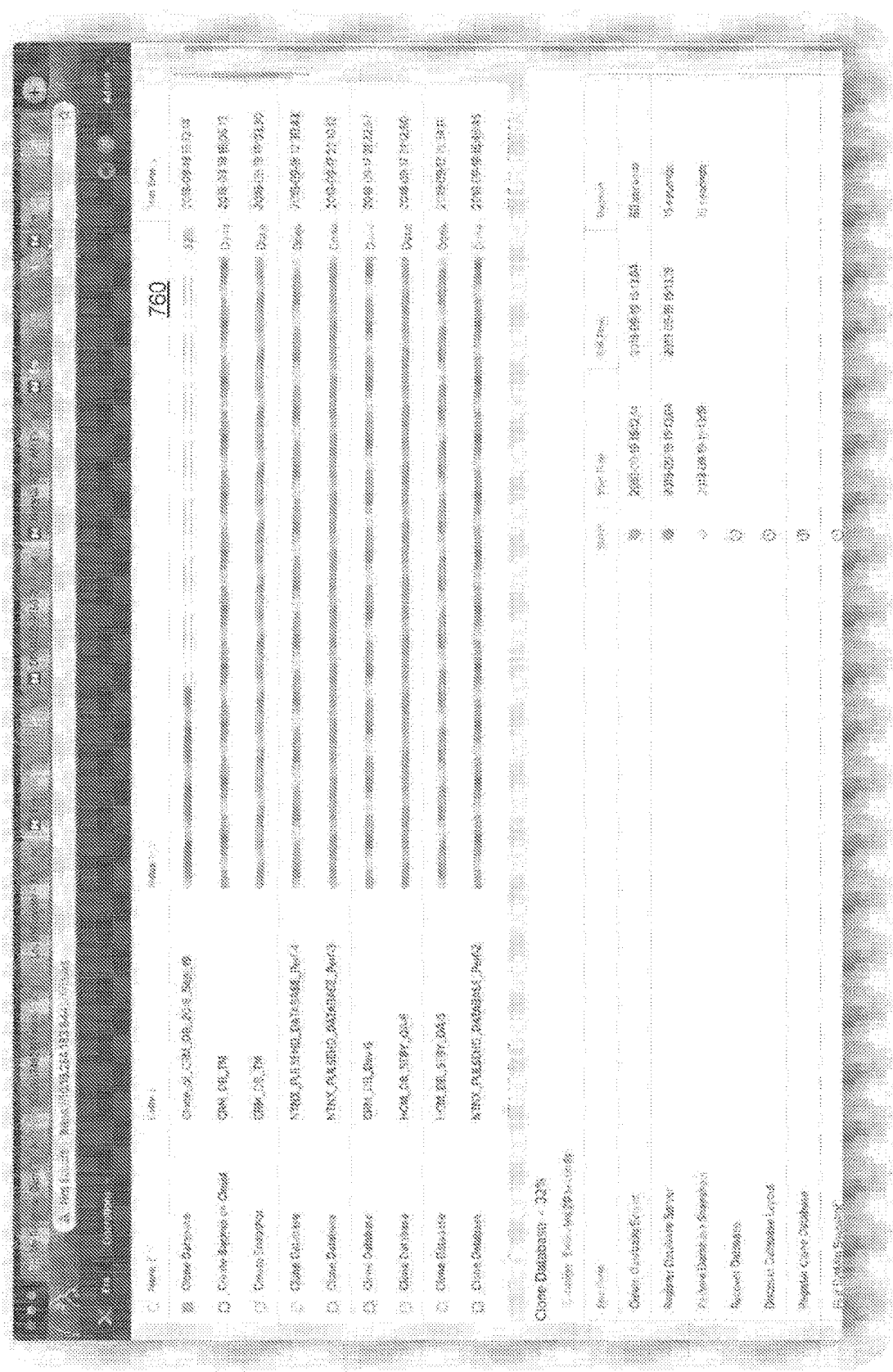

If the user selects the snapshot option 740D in FIG. 7B, the user interface 745 may look somewhat different and may present options to allow the user to select one or more available snapshots to create a clone from. Upon selecting the point in time or the available snapshot, the user may interact with a next button 745E to display user interface 750 of FIG. 7D. The user interface 750 allows the user to either create a new target database VM 750A on the target database storage (e.g., the target database storage 655) or select an existing target database VM 750B. To create a new target database VM, the database protection system instance may solicit the target database VM name and one or more profiles (e.g., software profile, compute profile, network profile, database parameter profile), and any other desired or required information from the user. In some embodiments, one or more profiles may be same as that of the source database VM, while in other embodiments, the one or more profiles may vary from those of the source database VM. If the user selects the existing target database VM 750B, the user interface 750 may display a list of previously created target database VMs for the source database. In some embodiments, multiple target database VMs may be created for a particular source database. Upon providing the target database VM information, the user may interact with a next button 750C to display a user interface 755 of FIG. 7E.

In the user interface 755, the user may specify details of the cloned database. For example, the database protection system instance may solicit a name 755A of the cloned database, a password 755B if desired, and any other information that is desired or needed. Upon interacting with a clone button 755C, the database protection system instance creates the clone of the source database based upon the inputs received from the user in FIGS. 7A-7D. Interacting with the clone button 755C may display a user interface 760 of FIG. 7F, which shows the status of the clone. The database protection system instance may retrieve the snapshot(s) and/or the transactional logs and create the clone therefrom. For the point in time option, the database protection system instance may use both snapshots and transactional logs to create the cloned database, while for the available snapshot option, the database protection system instance may use only the available snapshot. The database protection system instance may also create a new target database VM (if a new target database VM is selected by the user). Once the cloned database is created, the cloned database may be displayed within the dashboard 700. Thus, the dashboard 700 provides an easy and convenient mechanism to clone source databases.

Figure 8:
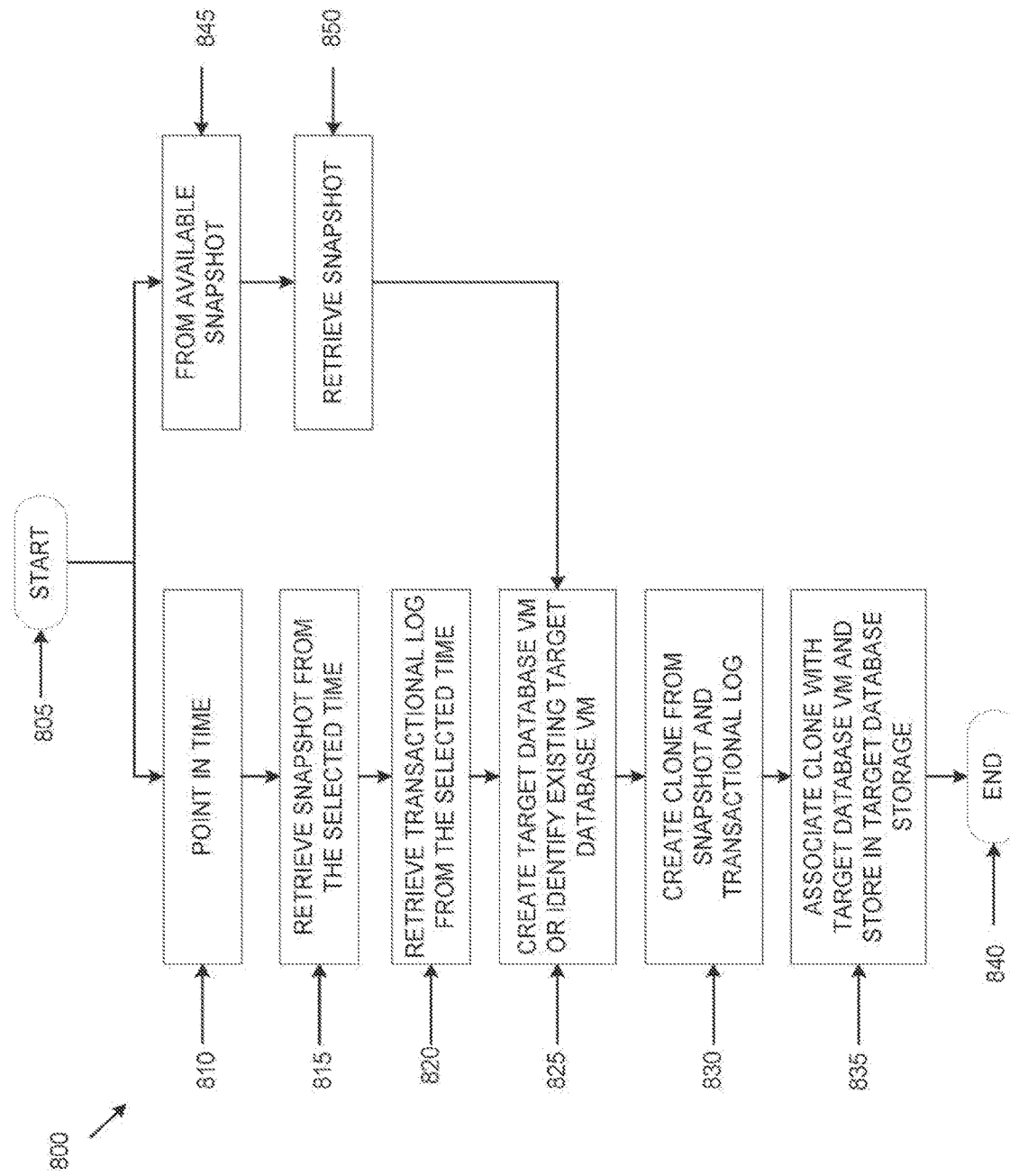
FIG. 8 is an example flowchart outlining operations for creating cloned databases using the database protection system of FIG. 6, in accordance with some embodiments of the present disclosure.

Turning now to FIG. 8 and referring to FIG. 8 in conjunction with FIGS. 6 and 7A-7F, an example flowchart outlining operations of a process 800 is shown, in accordance with some embodiments of the present disclosure. The process 800 may include additional, other, or different operations depending upon the embodiment. The process 800 may be used to create a cloned database from a source database. The process 800 may be implemented by the clone management systems 635 of the database protection system instances 630. The process 800 starts at operation 805 with the database protection system instances 630 receiving a user request for creating a clone. As discussed in FIG. 7A, the user may request creation of a clone of a source database via the dashboard 700. Upon receiving the user request, the database protection system instances 630 corresponding to the source database being clones is activated. The activated one of the database protection system instances 630 receives selection from the user of creating the clone from either a point in time or from an available snapshot. If the user selects the point in time option, the process 800 proceeds to operation 810. At the operation 810, the activated one of the database protection system instances 630 presents user interface, via the dashboard 700, to the user to receive selection of a specific time at which the clone is to be created. The clone is created based on the state of the source database at that specific time. At operation 815, the activated one of the database protection system instances 630 retrieves the snapshot corresponding to that specific time or the snapshot that is available closest to that specific time.

At operation 820, the activated one of the database protection system instances 630 retrieves any transactional logs that may be needed. For example, if the snapshot that is retrieved at the operation 815 is captured at the specific time selected by the user at the operation 810, then the source database may be cloned from the snapshot of the operation 815. However, if the snapshot of the operation 815 is created before or after the specific time selected by the user, then one or more transactional logs may exist between the time the snapshot is captured and the specific time. For example, if the specific time is 11:00 AM and the closest snapshot to 11:00 AM is from 10:00 AM, the database protection system instance 630 may determine if there are transactional logs available between 10:00 AM and 11:00 AM. The database protection system instance 630 may retrieve any transactional logs that may be available. If no transactional logs are available between 10:00 AM and 11:00 AM, the database protection system instance 630 may create the clone from the snapshot of 10:00 AM. Thus, at the operation 820, the activated one of the database protection system instances 630 determines if a transactional log is needed or exists, and retrieves those transactional log(s).

Additionally, at operation 825, the activated one of the database protection system instance 630 receives selection for a target database VM from the user. As indicated above, the user may either create a new target database VM or use an existing target database VM for storing the cloned database. If the activated one of the database protection system instances 630 receives selection for creating a new target database VM from the user, the database protection system instance may solicit information (e.g., name, profiles, etc.) from the user to create the target database VM. The target database VM may be associated with the target database storage. Alternatively, if the user desires to use an existing target database VM, the activated one of the database protection system instance 630 may present a list of existing target database VMs created previously for the source database. The user may select one of the existing target database VMs from the list. At operation 830, the activated one of the database protection system instances 630 creates the cloned database from the snapshot of the operation 815 and any transactional logs of the operation 820. The database protection system instances 630 stores the cloned database, at operation 835, on the target database VM, and the process 800 ends at operation 840.

If at the operation 805, the user selects the option of creating a clone from an available snapshot, the process 800 proceeds to operation 845. At the operation 845, the activated one of the database protection system instances 630 solicits the user to select the snapshot from which the clone is to be created. Upon receiving the user's selection of the available snapshot, at operation 850, the activated one of the database protection system instance 630 retrieves that snapshot. Before, after, or along with retrieving the snapshot, at the operation 825, the database protection system instance 630 may either create a new target database VM or identify an existing target database VM to use. At the operations 830 and 835, the database protection system instance 630 creates the clone of the source database and stores the cloned database on the target database VM. Again, the process 800 ends at the operation 840.

Returning back to FIG. 6, the cloned databases 660 of the source databases 650 are created from snapshots and transactional logs. Thus, to be able to create the cloned databases 660, snapshots and transactional logs are needed of the source databases 650. The snapshots and transactional logs may be captured via the snapshot/log capturing systems 640. The snapshot/log capturing systems 640 may be configured with the protection schedule and the SLA that are defined by the user when the source databases 650 are created or registered with the database system 600. The protection schedule defines, among other things, the frequency of capturing snapshots and transactional logs each day. Thus, based upon the protection schedule, the snapshot/log capturing systems 640 may instruct a data manager of the source databases 650 to capture snapshots and transactional logs automatically. As discussed above, an instance of a data manager may be associated with each source database that is created on the source database storage 645. For example, the source database 650A may be associated with a database manager 665A, the source database 650B may be associated with a data manager 665B, and the source database 650N may be associated with a database manager 665N. The database managers 665A-665N are collectively referred to herein as database managers 665. Although not shown, in some embodiments, the cloned databases 660 may each be associate with a database manager as well.

The database managers 665 are configured to capture the snapshots and the transactional logs upon instruction from the snapshot/log capturing systems 640. The database managers 665 may include an agent that captures the snapshots and the transactional logs based on the protection schedule received from the snapshot/log capturing systems 640. Thus, the database manager 665A may include an agent 670A, the database manager 665B may include an agent 670B, and the database manager 665N may include an agent 670N. The agents 670A-670N are collectively referred to herein as agents 670. Each of the agents 670 is an autonomous software program that is configured for performing one or more specific and approved operations. For example, each of the agents 670 may be configured to capture snapshots and transactional logs based upon the protection schedule, and store the captured snapshots and transactional logs in a repository associated therewith. The clone management systems 635 may retrieve the snapshots and transactional logs from the repositories when creating a clone of the source databases 650. For example, the agent 670A may be configured to store the captured snapshots and transactional logs in a repository 675A that is configured for the source database 650A, the agent 670B may be configured to store the captured snapshots and transactional logs in a repository 675B that is configured for the source database 650B, and the agent 670N may be configured to store the captured snapshots and transactional logs in a repository 675N that is configured for the source database 650N. The repositories 675A-675N are collectively referred to herein as repositories 675.

For example, if the protection schedule specifies capturing 2 snapshot every day and capturing a transactional log every 2 hours for the source database 650A, the agent 670A may capture 2 snapshots of the source database 650A and a transactional log every 2 hours such that in a 24-hour period, the agent captures 2 snapshots and 12 transactional logs. Further, if the continuous protection parameter in the SLA specifies a continuous protection of 30 days, the agent 670A may be configured to save all snapshots and transactional logs captured in the previous 30 days (not including the current day). Thereafter, the agent 670A may purge (e.g., delete) some of the snapshots and transactional logs based upon the protection parameters defined in the SLA level. For example, if the SLA level specifies a daily protection parameter of 30 days after the duration of the continuous protection parameter expires, the agent 670A may be configured to delete all but one snapshot that were captured before the previous 30 days, as well as delete all the transaction logs captured before the previous 30 days. The snapshot that is saved as the daily snapshot may be the snapshot that is closest to the daily snapshot time specified in the protection schedule. For example, if the time specified in the protection schedule is 11:00 AM for the daily snapshot, the snapshot that is captured at 11:00 AM or closest to 11:00 AM is saved and all other snapshots captured on that day are deleted. Thus, the agent 670A is configured to capture and manage snapshots and transactional logs.

Referring to FIGS. 9A-9G in conjunction with FIG. 6, an example flow diagram outlining operations of how an agent (e.g., the agents 670) of a database (e.g., the source databases 650) may capture, store, and purge snapshots and transactional logs based upon the protection schedule and protection parameters defined in the SLA level is shown, in accordance with some embodiments of the present disclosure. Simply for purposes of explanation, FIGS. 9A-9G show the flow for an SLA that requires a continuous protection of 7 days and a daily protection thereafter for 7 days. Thus, the SLA defines the continuous protection parameter as 7 days and the daily protection parameter as 7 days. Further, FIGS. 9A-9G are based on a protection schedule that specifies capturing 1 snapshot every day and 3 transactional logs every day. It is to be understood that the SLA definitions and the protection schedule above is only an example and not intended to be limiting in any way.

Figure 9A:
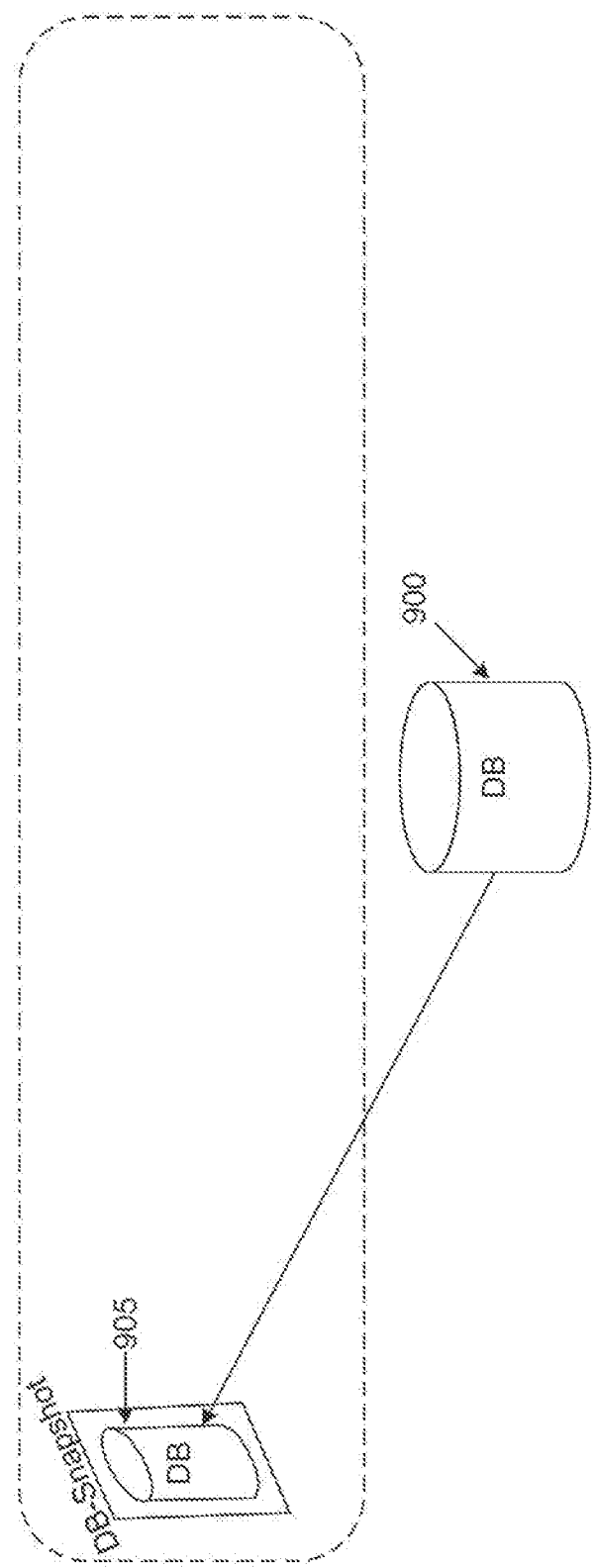
Figure 9C:
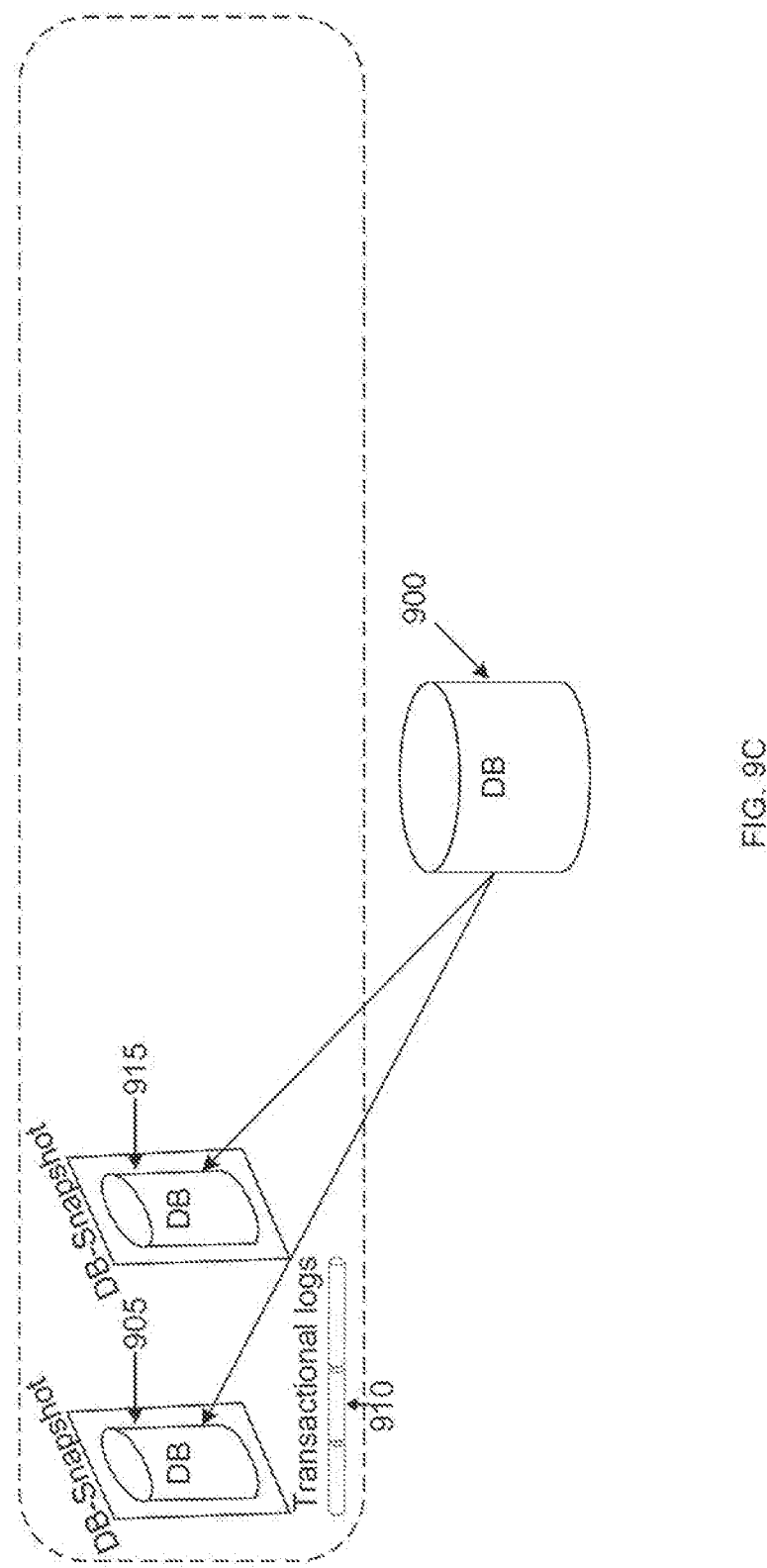
Figure 9D:
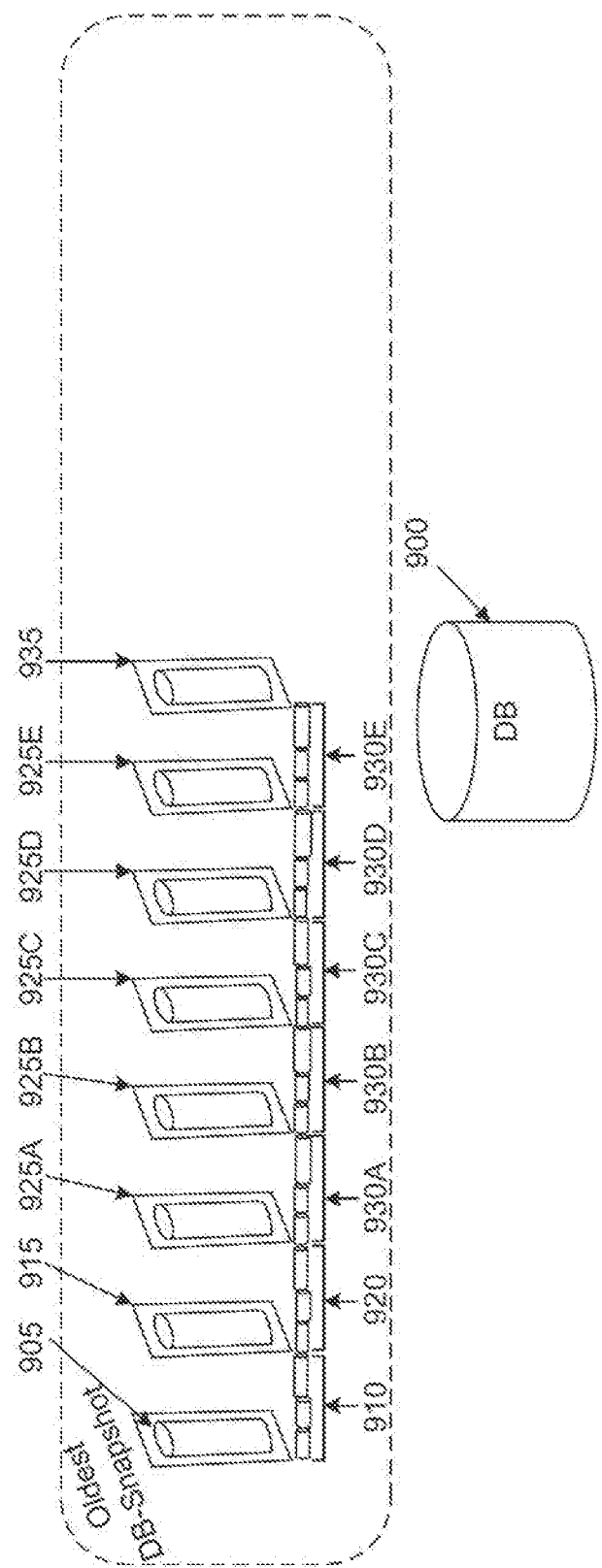

FIG. 9A shows the contents of a database 900 on a first day of the continuous 7 days. Since the protection schedule specifies capturing 1 snapshot every day, on the first day, the agent associated with the database 900 captures a snapshot 905. The time of the day at which the snapshot 905 is captured may either be defined in the protection schedule or may be pre-defined within the agent capturing the snapshot. Additionally, as shown in FIG. 9B, on the first day, the agent associated with the database 900 also captures 3 transactional logs (e.g., one transactional log every 8 hours) 910. On the second day, as shown in FIG. 9C, the agent associated with the database 900 captures another snapshot 915 and 3 transactional logs 920 shown in FIG. 9D. The agent associated with the database 900 continues to capture snapshots and transactional logs for 7 days to satisfy the continuous protection parameter and provide continuous protection for 7 days as defined in the SLA level. Thus, as shown in FIG. 9D, by the end of the seventh day, the agent associated with the database 900 has captured the snapshots 900, 915, snapshots 925A-925E, the transactional logs 910, 920, and 930A-930E. On the eighth and following days, the agent associated with the database 900 continues to capture snapshots (e.g., snapshot 935) and 3 transactional logs 940 shown in FIG. 9E.

Figure 9E:
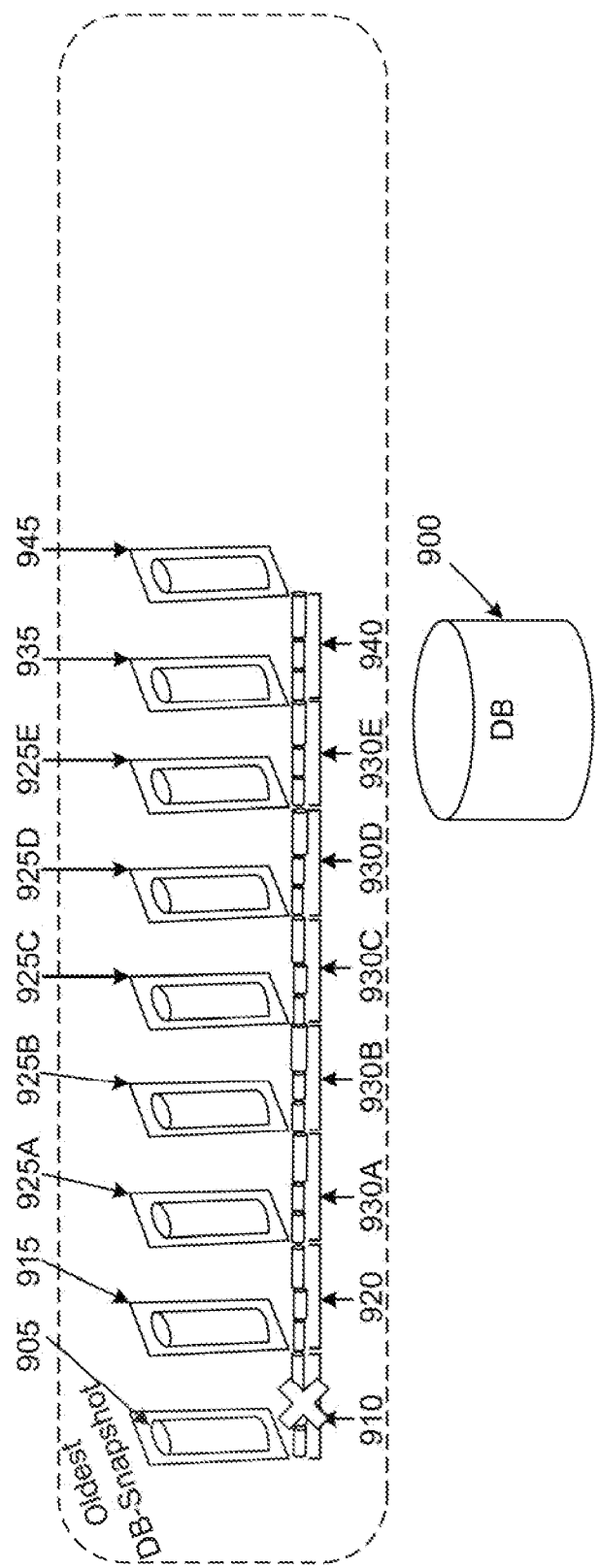
Figure 9F:
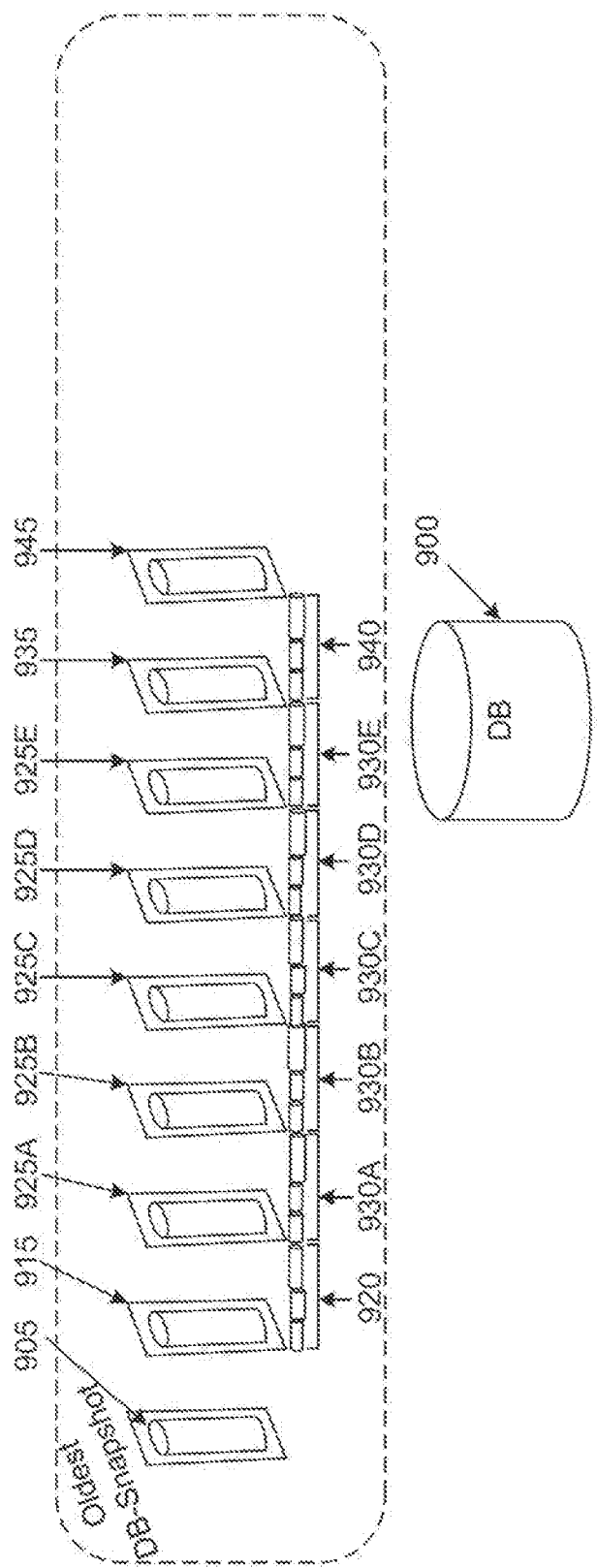

However, since the SLA requires 7 days of continuous protection, after the 7 days, the continuous protection is not required and the agent may purge some of the captured snapshots and transactional logs, again based on the definitions in the SLA. As indicated above, the SLA of FIGS. 9A-9G defines a daily protection parameter of 7 days for daily protection after the expiration of the 7 days of continuous protection. Thus, on the ninth day, the snapshot 905 captured on the first day is greater than 7 days old. Since only one snapshot is captured every day, the agent associated with the database 900 maintains the snapshot as the daily snapshot. If multiple snapshots are captured each day, the agent associated with the database 900 may delete all snapshots except one. Further, since the daily protection parameter provides guarantee of a daily snapshot, the agent may delete all of the transactional logs that were captured that day. Therefore, as shown in FIGS. 9E and 9F, on the ninth day, the snapshot 905 may continue to be stored as the daily snapshot but the transactional logs 910 may be deleted. Further, on the ninth day, the agent associated with the database 900 captures another snapshot 945 to continue to provide a continuous protection for the past 7 days.

Figure 9G:
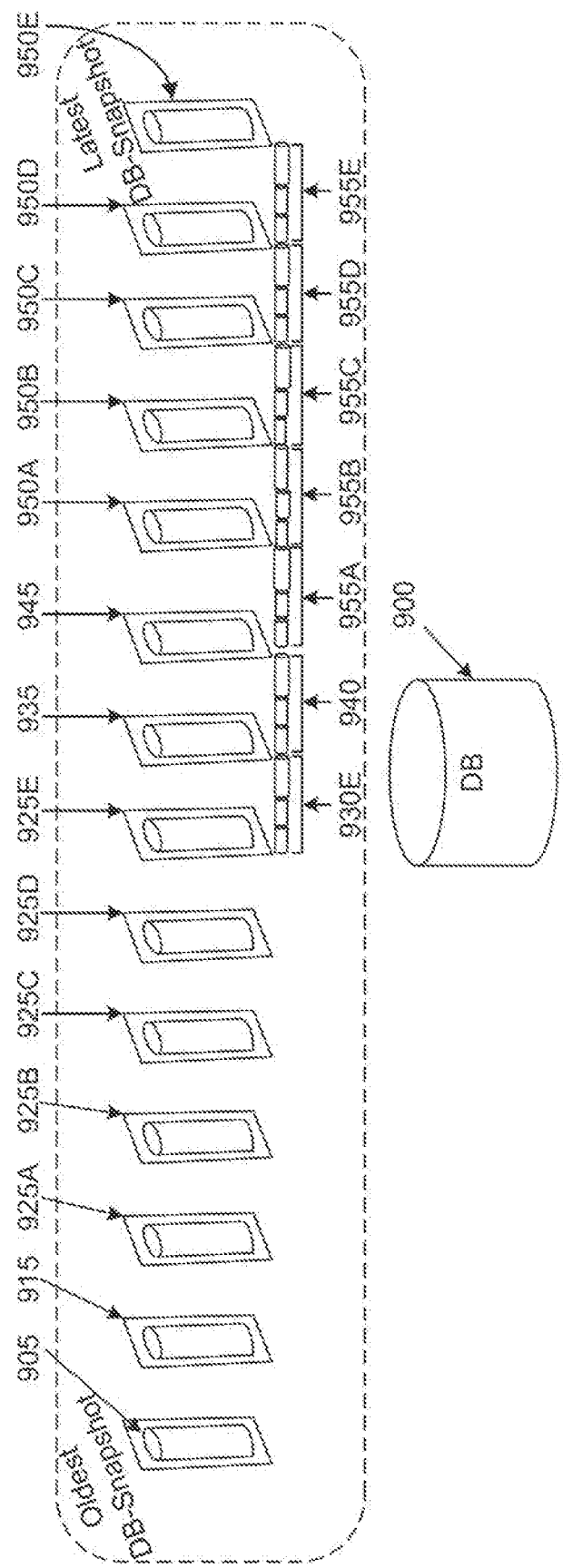

Similarly, on each day, from days 10-14, the agent associated with the database 900 continues to delete the transactional logs that are older than 7 days, and capture a new snapshot and 3 transactional logs (e.g., snapshots 950A-950E and transactional logs 955A-955E shown in FIG. 9G). Thus, the agent associated with the database 900 continues to capture snapshots and transactional logs based upon the SLA level and the protection schedule, and deletes some of the snapshots and transactional logs that are no longer required to satisfy the SLA level.

Snapshots of a source database may be captured by creating a snapshot of the source database VM and a snapshot of the source database itself. Specifically, a snapshot may be an image/copy of the location of the storage files associated with the virtual disks of the source database and an image/copy of the location of the configuration files associated with the source database VM. The virtual disk(s) on which the source database is stored may be composed of or divided into one or more memory blocks. The snapshot/log capturing systems 640 may capture images or copies of the memory blocks for capturing snapshots. A copy of the memory blocks may be made by identifying the memory pointer (e.g., location) assigned to each memory block and copying the memory pointer to a repository (e.g., the repositories 675). During a first snapshot of the memory blocks, the contents of all the memory blocks may be copied to the repositories 675. After the first snapshot is captured, transactional logs may be captured based upon the protection schedule to record all transactions or changes in the source database after the capture of the first snapshot. Capturing a transactional log may be referred to herein as a log catch up operation.

For example, say the protection schedule defines capturing 2 snapshots each day and 2 transactional logs between the 2 snapshot captures. If the source database includes 1000 memory blocks, the first snapshot creates copies of all the 1000 memory blocks. Capturing a snapshot involves pausing the source database such that no user operations are performed while the source database is being snapshotted, creating copies of the memory blocks (and other information such as the configuration file of the source database VM, etc.), and unpausing the source database. Since snapshots temporarily halt operation of the source database, taking frequent snapshots of the source database is not practical or desirable. However, to accurately capture the state of the source database in between two snapshot captures and allow creation of cloned databases to satisfy the SLA (e.g., the continuous protection parameter), transactional logs may be captured between two snapshot captures. The frequency of capturing transactional logs may be higher than the frequency of capturing the snapshots. Thus, for example and continuing the example above, if after capturing the first snapshot, 4 out of the 1000 memory blocks of the source database have changed (e.g., due to data being updated, new data being added, etc.), the agents 670 create a first transactional log based upon the protection schedule. The first transactional log may reflect that the 4 blocks have changed since the last snapshot capture. Specifically, the first transactional log may include memory pointers to the 4 memory blocks that have changed. Thus, instead of copying all of the 1000 memory blocks, the first transactional log only copies the changes since the last snapshot capture, thereby saving space and time. Similarly, based upon the protection schedule, the agents 670 may capture a second transactional log after the first transactional log. The second transactional log may determine which memory blocks have changes since the first snapshot capture.

For example, if the agents 670 determine that 6 memory blocks have changed since the first snapshot capture, the second transactional log may include memory pointers back to the first snapshot indicating which 6 of the memory blocks have changed. The 6 memory blocks that changed at the time of capturing the second transactional log may or may not include the 4 memory blocks that changed at the time of capturing the first transactional log. Thus, each transactional log that is captured identifies the memory blocks that have changed since the previous snapshot capture and include memory pointers to those changed memory blocks. When the source database is cloned, say to a state when the second transactional log is captured, the associated one of the clone management systems 635 may recreate the source database from the first snapshot and the second transactional log. Specifically, the associated one of the clone management systems 635 may determine (e.g., from the memory pointers in the second transactional log) which particular memory blocks have changed from the first snapshot. In the example above, the second transactional log includes memory pointers of the 6 memory blocks that have changed since the first snapshot capture. Thus, the agents 670 may create the cloned based on the 994 memory blocks from the first snapshot that have not changed plus the 6 memory blocks in the second transactional log that have changed. Thus, the cloned database reflects an accurate state of the source database at the time of the second transactional log capture.

Further, and continuing with the example above of capturing 2 snapshots and 2 transactional logs each day, the agents 670 may capture a second snapshot based upon the protection schedule. In some embodiments, the second snapshot may be a copy of all the memory blocks (e.g., all 1000 memory blocks in the example above) again and transactional logs that are captured after the second snapshot may identify changes in the memory blocks relative to the second snapshot. Thus, any changes made between the capture of the first snapshot and the capture of the second snapshot are reflected in the second snapshot. In other embodiments, the second snapshot may also be an incremental snapshot that reflects only which memory blocks have changed since the first snapshot capture. Thus, the second snapshot in such cases may take less time to create, as well as less space to store. The subsequent transactional logs may continue to make pointers to the first snapshot to reflect the memory blocks that change.

Advantageously, the snapshot and transactional log capturing efficiently only copies changes in the memory blocks. Furthermore, all transactions are recorded using transaction logs such that when a clone is created, the source database may be recovered based on both the snapshots and the transaction logs to any desired state. Further, since capturing a transactional log does not require pausing the source database, the transactional logs may be captured in background while the source database is operating, and the transactional logs may be captured at a greater frequency than the snapshots. To capture a transactional log, the agents 670 maintain a small staging disk. The staging disk may be part of the repositories 675 or may be separately provisioned from those repositories. The staging disk may be dedicated or shared amongst the various source databases 650 and may be used to temporarily store the transactional logs. The agents 670 may sweep (e.g., collects) the transactional logs from the source database to the staging disk based upon the protection schedule. From the staging disk, the agents 670 may start the log catch up operation to move the transactional logs from the staging disk to the repositories 675. Thus, based upon a combination of snapshots and transactional logs, the state of the source database may be effectively and accurately replicated. While the snapshots and transactional logs may be automatically captured based upon the protection schedule, in some embodiments, the database engine 605 may allow the users to manually capture snapshots and transactional logs. Such an operation may be particularly useful if the user desires a state that falls between the capture of two snapshots and transactional logs.

Figure 10:
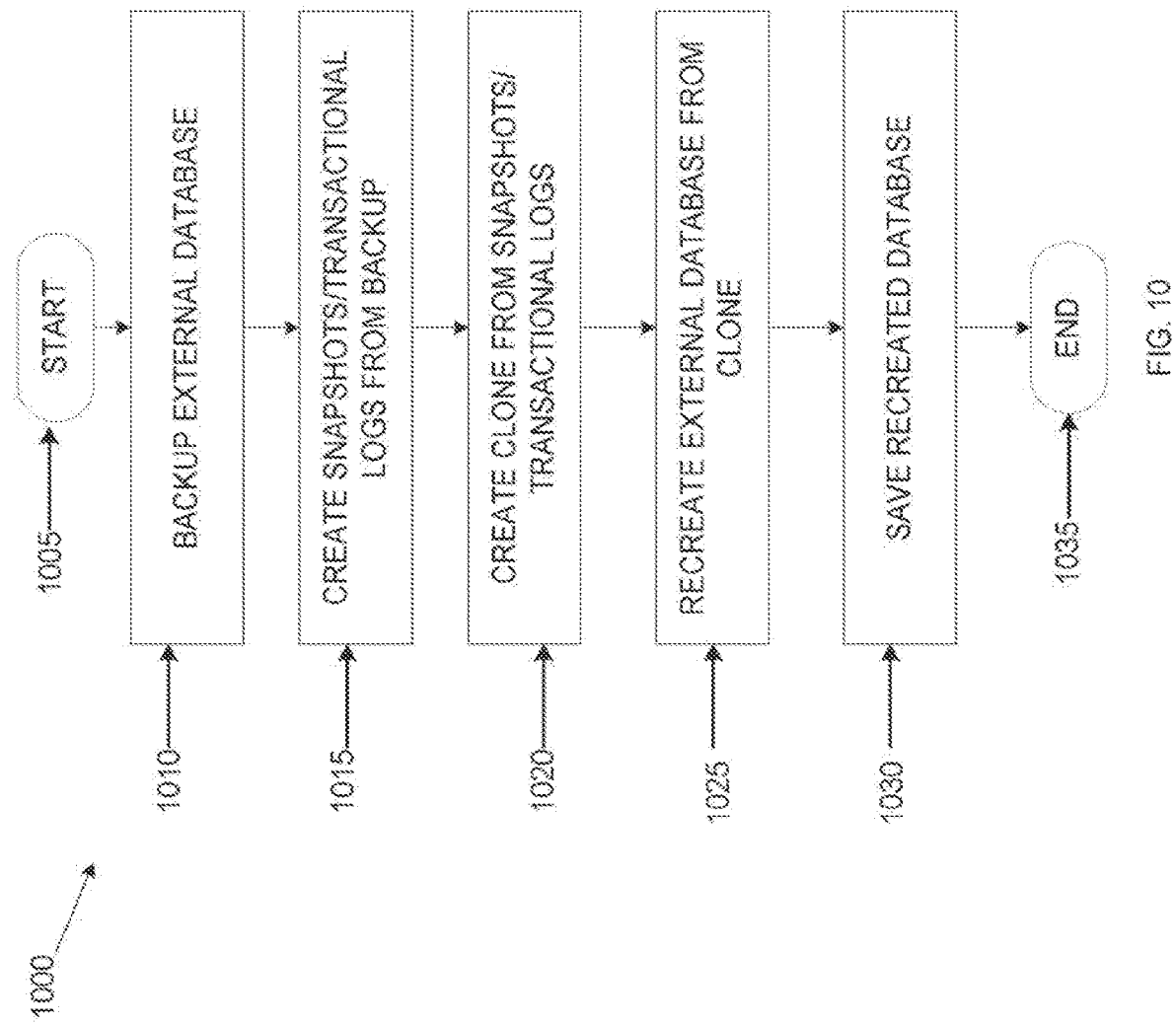
FIG. 10 is an example flowchart outlining operations for protecting an external database, in accordance with some embodiments of the present disclosure.

Referring still to FIG. 6, the database storage system 620 may also include an external database manager 680. The source databases 650 that are created within the database system 600 are already configured to be snapshotted. However, databases that were created outside of the database system 600 and registered with the database system may not have been configured to be snapshotted. Thus, such databases need to be reconfigured to be able be snapshotted and protected by the database system 600. The reconfiguration may be part of the registration process or performed after those databases have been registered. To reconfigure the externally created databases, a process 1000 of FIG. 10 may be used. Referring to FIG. 10 in conjunction with FIG. 6, a flowchart outlining the operations of the process 100 is shown, in accordance with some embodiments of the present disclosure. The process 1000 may include other, additional, or fewer operations depending upon the particular embodiment. The process 1000 may be implemented by the database engine 605.

The process 1000 starts at operation 1005 and at operation 1010, a complete back up of the external database is made by the external database manager 680. The complete backup includes a complete copy of the external database. In other words, the actual data of the database is copied when creating a back-up. Knowledge about the structure of the underlying storage (e.g., the virtual disks) of a database is not needed when a back-up is created. In contrast, snapshotting requires knowledge of the underlying storage (e.g., virtual disks) since no actual copy of the data is made. Rather, when a snapshot is captured, a copy of the location of the virtual disk where the data is stored is made. Thus, to configure the external database for capturing snapshots and transactional logs, the external database is backed up to a storage disk (e.g., virtual disk), the structure of which is known to the database engine 605. The back-up copy may be considered the source database for purposes of protection and may be part of the source database storage 645. Further, an instance of a database manager may be associated with the back-up copy to create clones from the back-up copy.

In some embodiments, the operation 1010 may be performed as part of the registration process when the external database is registered with the database system 600. In other embodiments, the operation 1010 may be performed after the registration process. Since the back-up of the external database is to a known structure of the storage disk, snapshots and transactional logs may be created from the back-up copy. Thus, at operation 1015, snapshots and transactional logs may be captured of the external database from the back-up copy. The process of capturing snapshots and transactional logs from the back-up copy is the same as that of a database created internally within the database system 600. The snapshots and transactional logs may be stored within the repositories 675 and clones may be created from those snapshots or a combination of snapshots and transactional logs.

Thus, at operation 1020, upon receiving a user request to create a clone of the external database, the database manager associated with the back-up copy of the external database may create a cloned database from the back-up copy. The clone creation process is same as discussed above. The cloned database may be stored within the target database storage 655. In some embodiments, the user may desire to store the external database outside of the database system 600 or on a system that is not compatible with the database system. Thus, at operation 1025, a user may request storing the cloned database to an external location. The database engine 605 and particularly the external database manager 680 may reconfigure the cloned database to a form that is compatible with the external location and at operation 1030, send the reconfigured database to the external location. The database engine 605 may continue to make snapshots and transactional logs of the back-up copy of the operation 1010 based upon the SLA and protection schedule defined for the external database during the registration process. When the user request of the operation 1020 is received, the database engine 605 may create the clone of the external database, reconfigure the cloned database, and send it to the external location. The process 1000 ends at operation 1035.

Thus, the database system of the present disclosure is a versatile system for creating and managing databases. A variety of operations may be performed on the databases associated with the database system using a user friendly and intuitive user interface.

It is to be understood that any examples used herein are simply for purposes of explanation and are not intended to be limiting in any way. It is also to be understood that any examples used herein are simply for purposes of explanation and are not intended to be limiting in any way. Further, although the present disclosure has been discussed with respect to memory usage, in other embodiments, the teachings of the present disclosure may be applied to adjust other resources, such as power, processing capacity, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. One or more non-transitory computer-readable media comprising computer- readable instructions stored thereon that when executed by one or more processors to provision a database cause the one or more processors to:
   receive a first input of a database engine for the database;
   receive a second input of a level of a Service Level Agreement (SLA) from a plurality of levels of the SLA to protect the database after provisioning;
   receive a third input of at least one time period to capture a snapshot, wherein the at least one time period is part of a protection schedule that further comprises a frequency of capturing the snapshot;
   receive a fourth input indicative of additional information associated with the database; and
   create the database based on the first input, the second input, the third input, and the fourth input.

2. The one or more non-transitory computer-readable media of claim 1, wherein the one or more processors further execute computer-readable instructions to receive a fifth input indicative of a location where the database is to be provisioned.

3. The one or more non-transitory computer-readable media of claim 2, wherein the location comprises a hyper-converged infrastructure system.

4. The one or more non-transitory computer-readable media of claim 2, wherein the location comprises a cloud.

5. The one or more non-transitory computer-readable media of claim 2, wherein the location comprises an on-premise system.

6. The one or more non-transitory computer-readable media of claim 1, wherein the one or more processors further execute computer-readable instructions to determine an amount of storage for the database based on a fifth input.

7. The one or more non-transitory computer-readable media of claim 1, wherein the additional information comprises a name for the database.

8. The one or more non-transitory computer-readable media of claim 1, wherein the additional information comprises at least one of a network profile, a software profile, a compute profile, or a database parameter profile for the database.

9. The one or more non-transitory computer-readable media of claim 1, wherein the one or more processors further execute computer-readable instructions to receive a fifth input indicative of a number of vCPUs and memory for provisioning the database.

10. The one or more non-transitory computer-readable media of claim 1, wherein the database is associated with at least one of a direct attached storage or a network attached storage.

11. The one or more non-transitory computer-readable media of claim 1, wherein the additional information comprises a database description for the database.

12. The one or more non-transitory computer-readable media of claim 1, wherein each of the plurality of levels of the SLA defines one or more of a first duration for a continuous protection of the database, a second duration of protecting the database using a daily snapshot, a third duration of protecting the database using a weekly snapshot, a fourth duration of protecting the database using a monthly snapshot, and a fifth duration of protecting the database using a quarterly snapshot.

13. The one or more non-transitory computer-readable media of claim 1, wherein the at least one time period comprises one or more of a time of day, a day of a week, a day of a month, or a group of months.

14. A system comprising:
one or more memories having computer-readable instructions stored thereon to provision a database; and
one or more processors that execute the computer-readable instructions to:
receive a first input of a database engine for the database;
receive a second input of a level of a Service Level Agreement (SLA) from a plurality of levels of the SLA to protect the database after provisioning;
receive a third input of at least one time period to capture a snapshot, wherein the at least one time period is part of a protection schedule that further comprises a frequency of capturing the snapshot;
receive a fourth input indicative of additional information associated with the database; and
create the database based on the first input, the second input, the third input, and the fourth input.

15. The system of claim 14, wherein the one or more processors further execute computer-readable instructions to receive a fifth input indicative of a location where the database is to be provisioned.

16. The system of claim 15, wherein the location comprises a hyperconverged infrastructure system.

17. The system of claim 15, wherein the location comprises a cloud.

18. The system of claim 15, wherein the location comprises an on-premise system.

19. The system of claim 14, wherein the one or more processors further execute computer-readable instructions to determine an amount of storage for the database based on a fifth input.

20. The system of claim 14, wherein the additional information comprises a name for the database.

21. The system of claim 14, wherein the additional information comprises at least one of a network profile, a software profile, a compute profile, or a database parameter profile for the database.

22. The system of claim 14, wherein the one or more processors further execute computer-readable instructions to receive a fifth input indicative of a number of vCPUs and memory for provisioning the database.

23. The system of claim 14, wherein the database is associated with at least one of a direct attached storage or a network attached storage.

24. The system of claim 14, wherein the additional information comprises a database description for the database.

25. The system of claim 14, wherein each of the plurality of levels of the SLA defines one or more of a first duration for a continuous protection of the database, a second duration of protecting the database using a daily snapshot, a third duration of protecting the database using a weekly snapshot, a fourth duration of protecting the database using a monthly snapshot, and a fifth duration of protecting the database using a quarterly snapshot.

26. The system of claim 14, wherein the at least one time period comprises one or more of a time of day, a day of a week, a day of a month, or a group of months.

27. A method comprising:
receiving a first input of a database engine for provisioning a database;
receiving a second input of a level of a Service Level Agreement (SLA) from a plurality of levels of the SLA for protecting the database after provisioning;
receiving a third input of at least one time period for capturing a snapshot, wherein the at least one time period is part of a protection schedule that further comprises a frequency of capturing the snapshot;
receiving a fourth input indicative of additional information associated with the database; and
creating the database based on the first input, the second input, the third input, and the fourth input.

28. The method of claim 27, further comprising receiving a fifth input indicative of a location where the database is to be provisioned.

29. The method of claim 28, wherein the location comprises a hyperconverged infrastructure system.

30. The method of claim 28, wherein the location comprises a cloud.

31. The method of claim 28, wherein the location comprises an on-premise system.

32. The method of claim 27, further comprising determining an amount of storage for the database based on a fifth input.

33. The method of claim 27, wherein the additional information comprises a name for the database.

34. The method of claim 27, wherein the additional information comprises at least one of a network profile, a software profile, a compute profile, or a database parameter profile for the database.

35. The method of claim 27, further comprising receiving a fifth input indicative of a number of vCPUs and memory for provisioning the database.

36. The method of claim 27, wherein the database is associated with at least one of a direct attached storage or a network attached storage.

37. The method of claim 27, wherein the additional information comprises a database description for the database.

38. The method of claim 27, wherein each of the plurality of levels of the SLA defines one or more of a first duration for a continuous protection of the database, a second duration of protecting the database using a daily snapshot, a third duration of protecting the database using a weekly snapshot, a fourth duration of protecting the database using a monthly snapshot, and a fifth duration of protecting the database using a quarterly snapshot.

39. The method of claim 27, wherein the at least one time period comprises one or more of a time of day, a day of a week, a day of a month, or a group of months.

* * * * *